| ORDER REGISTER | | | | | | |
|---|---|---|---|---|---|---|
| 48  37 | 36  31 | 30  25 | 24  13 | 12 11 10 | 9 8 | 1 |
| 1 | STORE ADDRESS 3 | STORE ADDRESS 2 | STORE ADDRESS 1 | ↑ | ↑ | M ADDRESS |
| 2 | | STORE ADDRESS 2 | STORE ADDRESS 1 | STORE SELECTION CODE | INDEX REGISTER CODE | M ADDRESS |
| 3 | SUBSECTION AMEND CODE | STORE ADDRESS 2 | STORE ADDRESS 1 | | | M ADDRESS |
| 4 | JUMP CONSTANT | STORE ADDRESS 2 | STORE ADDRESS 1 | | | M ADDRESS |
| 5 | STORE ADDRESS 2 | OPERATION CODE | ITERATION COUNT | STORE ADDRESS 1 | | M ADDRESS |
| 6 | SUBSECTION AMEND CODE | OPERATION CODE | ITERATION COUNT | STORE ADDRESS 1 | ↓ | ↓ M ADDRESS |

*Fig. 2.*

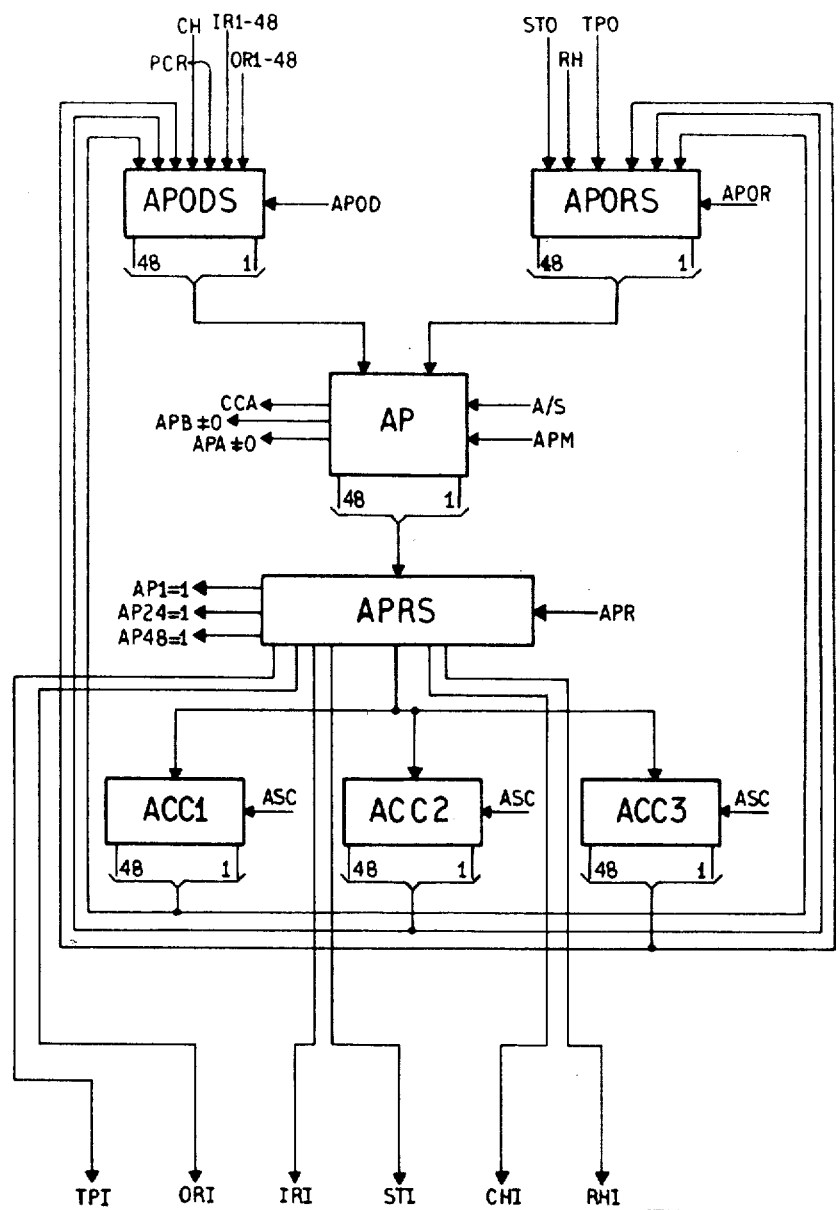

Fig. 7A
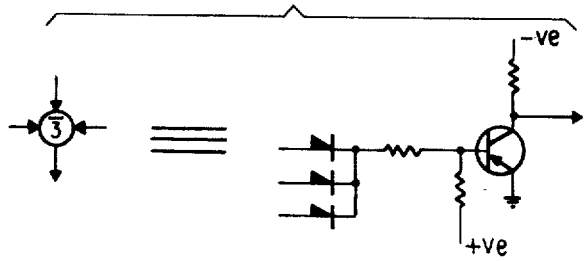
Fig. 7B
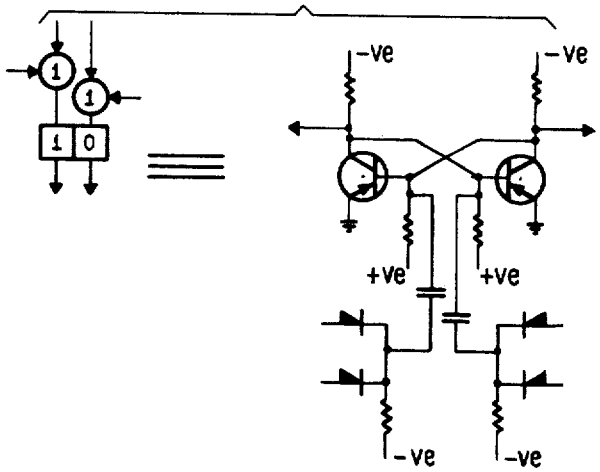
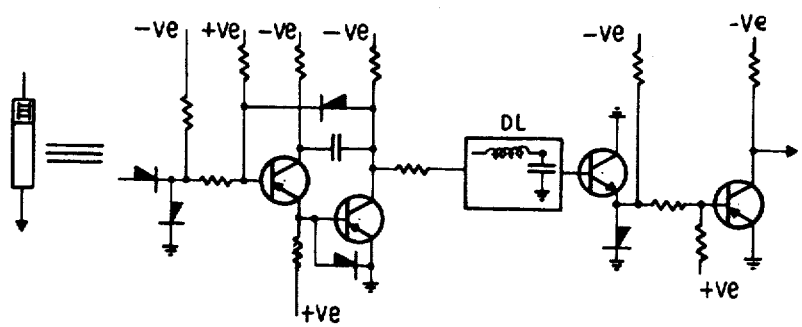
Fig. 7C

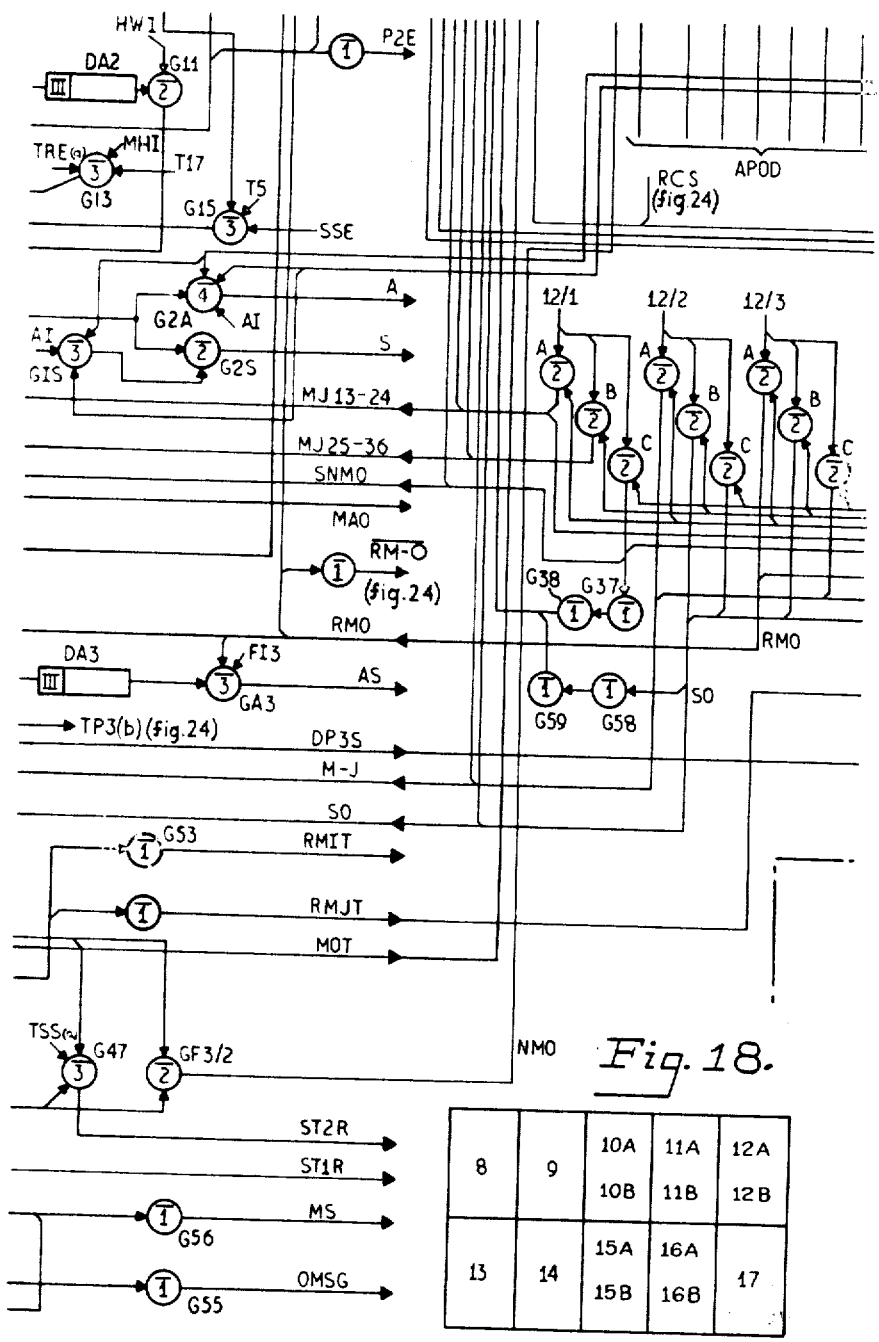

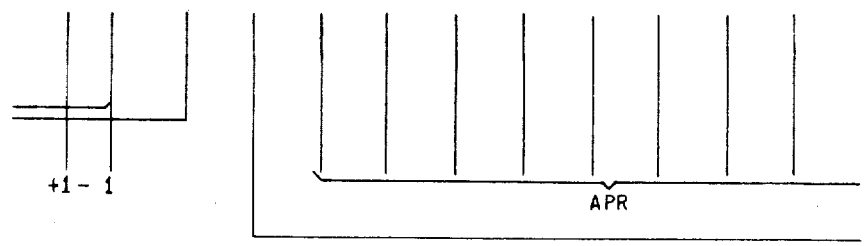
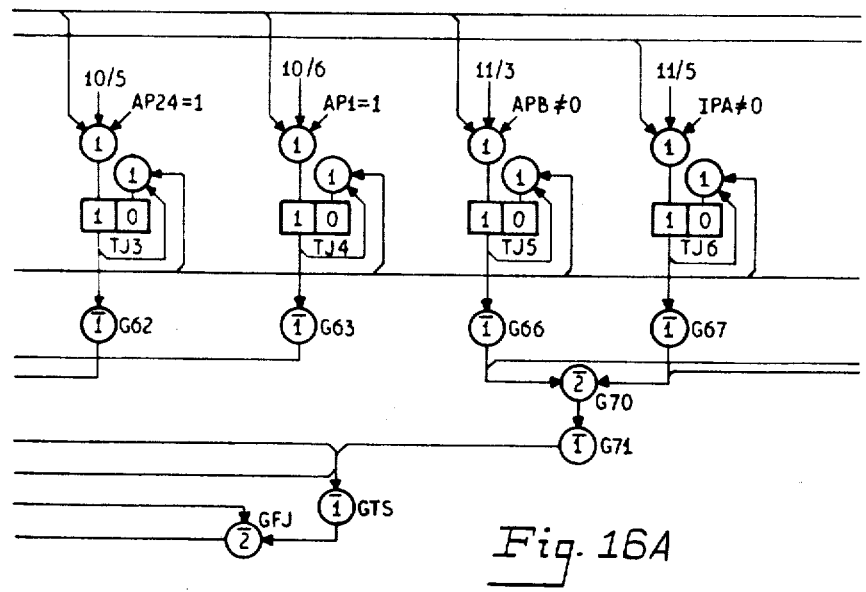
Fig. 16A
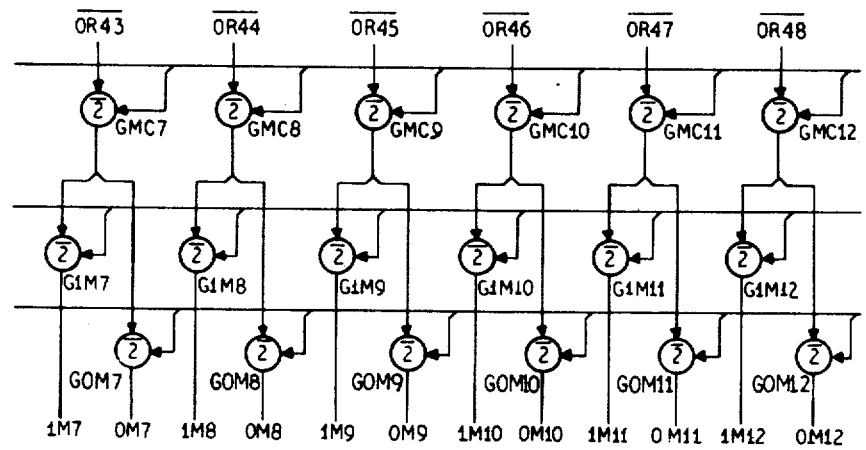
Fig. 16B

United States Patent Office 3,404,378
Patented Oct. 1, 1968

3,404,378
COMPUTERS
Ronald Threadgold, David Hartley, Hamish Vernon Bell, George Edward Lynch, John Christopher Bines, and Orran Terence Pate, Liverpool, England, assignors to Automatic Telephone & Electric Company Limited, Liverpool, England, a British company
Filed Oct. 29, 1965, Ser. No. 505,638
17 Claims. (Cl. 340—172.5)

ABSTRACT OF THE DISCLOSURE

An asynchronous stored-programme data processing device has a main data processing store and a micro-programme store. A main programme order word is read from the main store into an order register and a coded instruction in the order word is used by the micro-programme store to generate the first of a series of micro-orders forming a micro-programme. Three groups of micro-instruction leads are provided and a micro-order consists of a plurality of instruction leads in each group. The first group of leads controls through a control unit an index processor, the second group controls through the control unit an arithmetic unit, and the third controls through the control unit and the index processor either the changing of the coded instruction in the order word to enable the micro-programme store to generate the next order word in the series or at the end of the series to read the next main programme order word from the main store.

---

The present invention relates to stored programme data processing devices and is more particularly concerned with large capacity, high speed, parallel asynchronous devices.

One of the problems in connection with stored programme data processing devices is the provision of satisfactory arrangements which enable the processing device to undertake additional manipulations. Usually the control unit of the processing device is designed to enable the device to undertake a number of manipulations for instance the arithmetical processes of addition, subtraction, multiplication, division and so on and when a demand is made to the control for one of these processes, the control unit initiates and controls the appropriate routine. There may, however, be occasions when the processing device is required to undertake a manipulation for which a routine does not exist and in such a case it is necessary to redesign the control unit so that the required routine is included.

The main object of the present invention is to provide a data processing device in which this relative inflexibility is avoided.

A further object of the invention is to provide improved arrangements for effecting the various manipulations required.

According to the invention, a main programme order is broken down into a plurality of micro-orders each of which enables one functional unit to perform only a single function and each micro-order is effective in three stages or phases of which the first exercises control over all the operations which may be performed by the addressing unit, the second exercises control over all the operations which may be performed by the processing unit while the third defines the next step in the current micro-programme or the exit from that micro-programme into a subsequent micro-programme.

According to a feature of the invention, phase overlap is possible as between phases 1 and 2 and/or phases 2 and 3.

These and further features of the invention will be more readily understood with reference to the following description which should be read in conjunction with the drawings accompanying the provisional specification.

Figure 1:
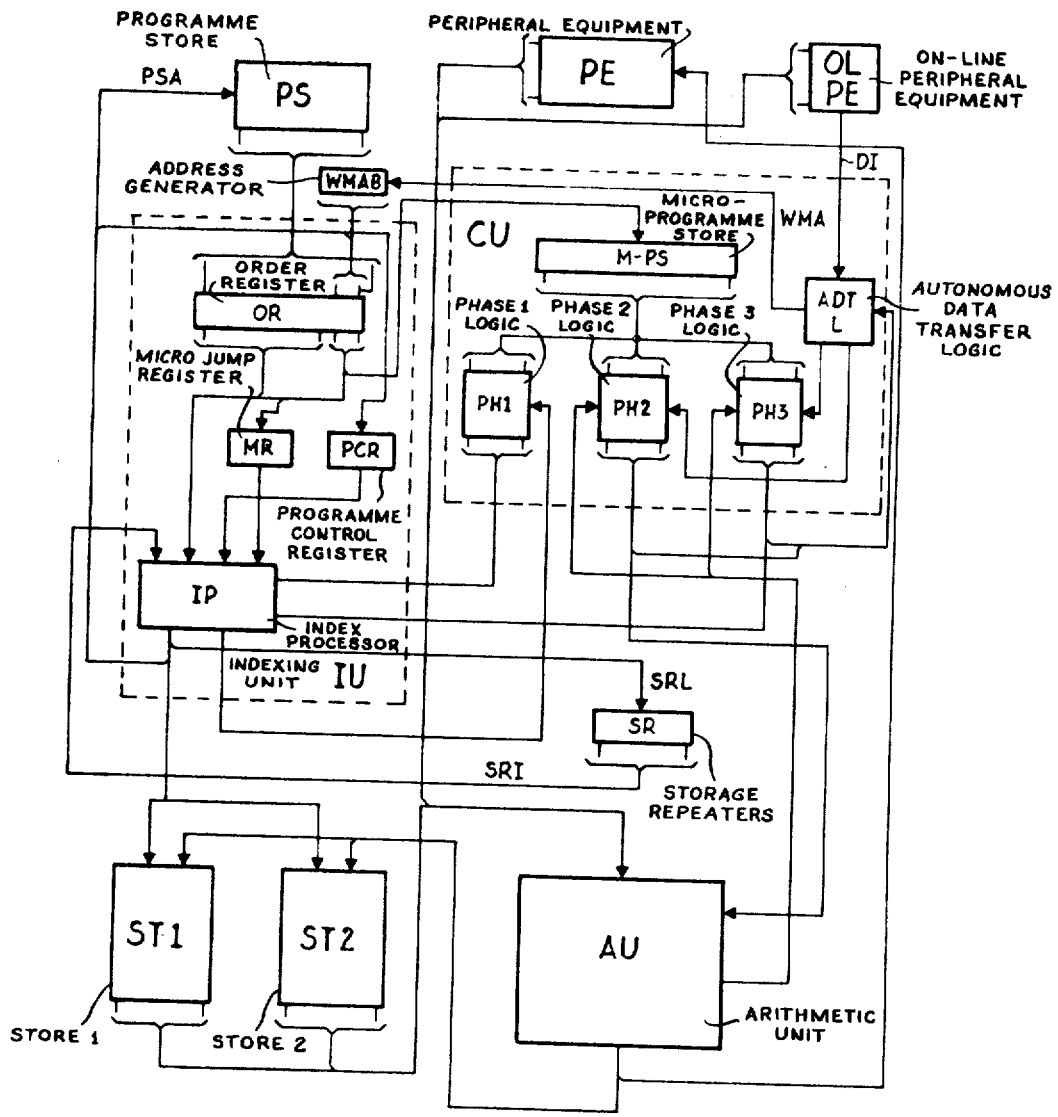
Figure 3:
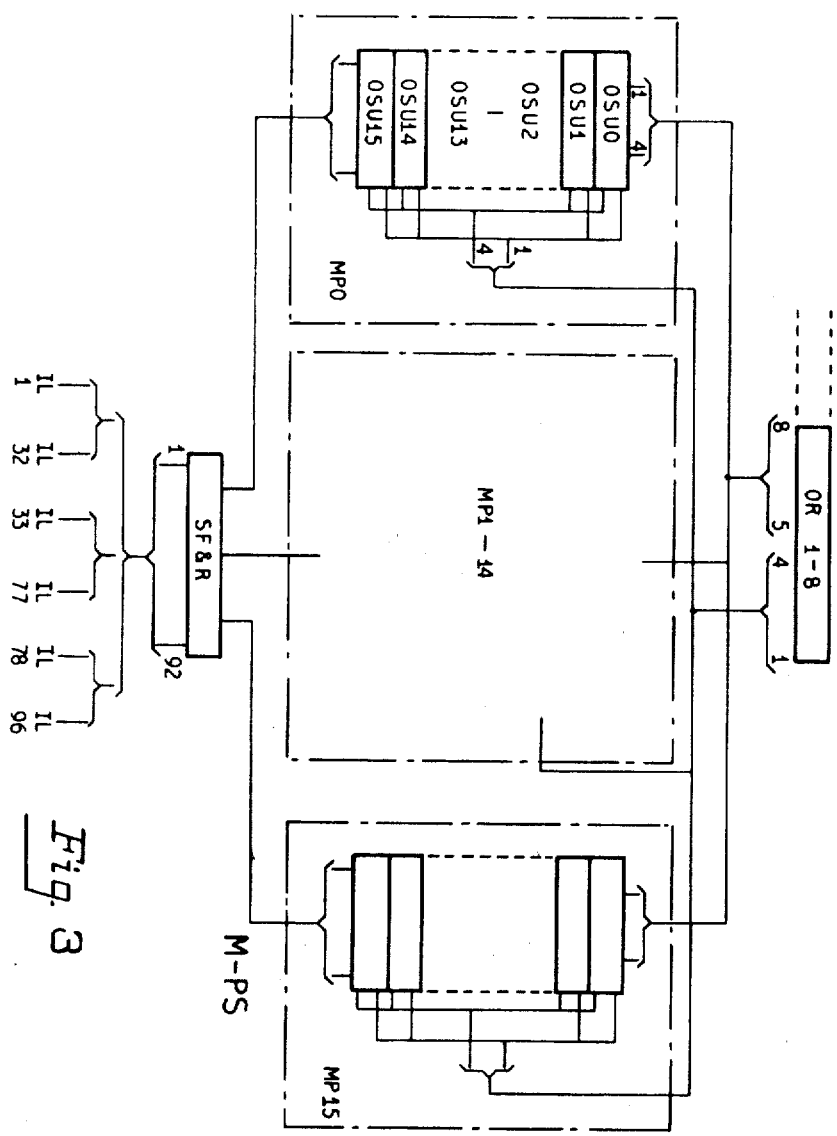
Figure 4:
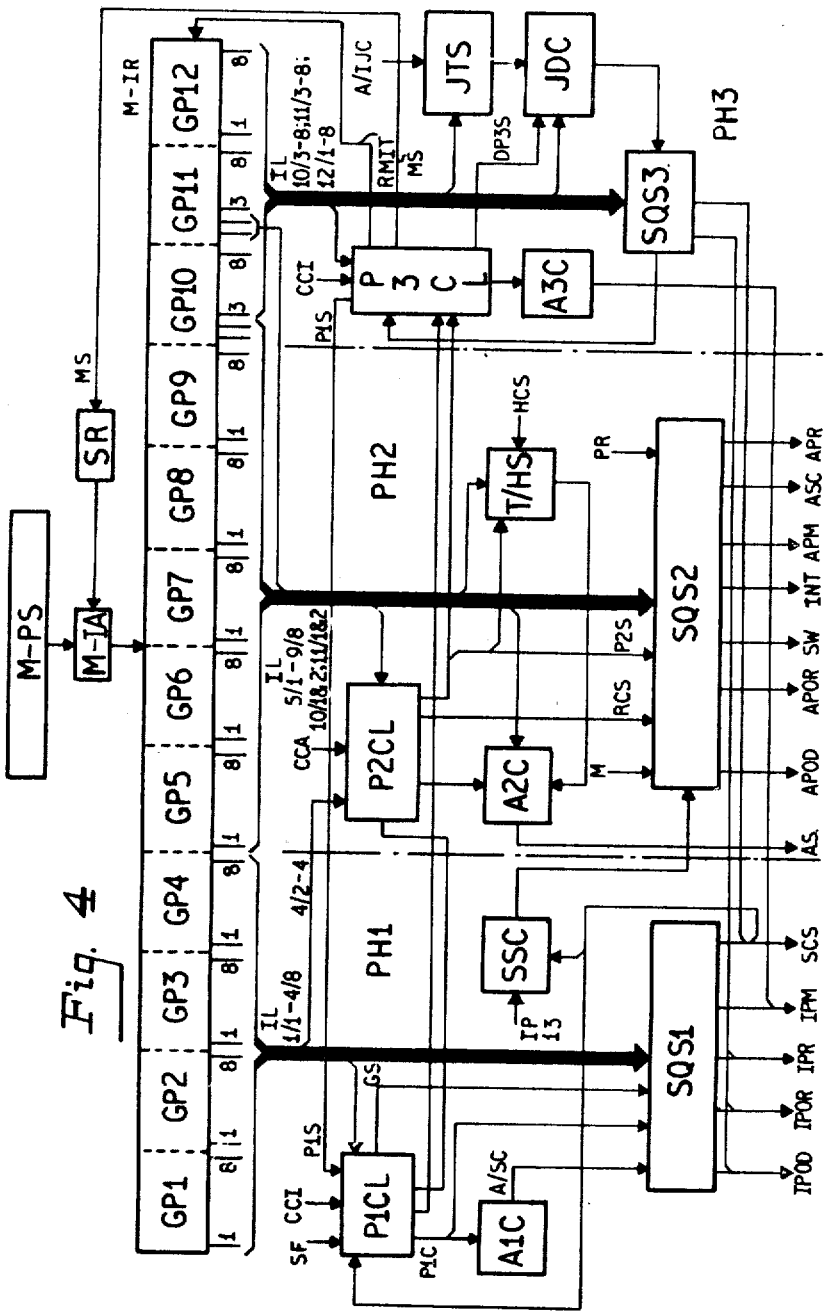
Figure 5:
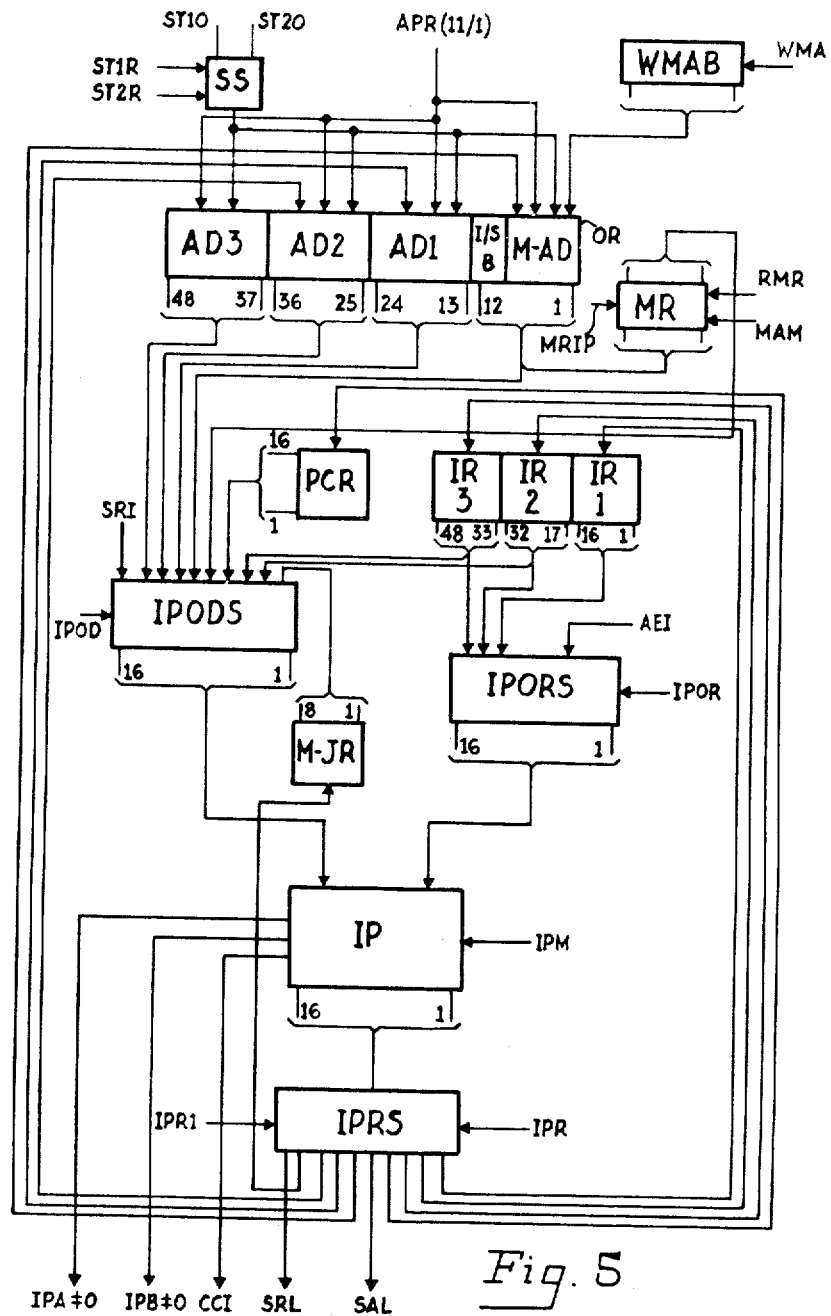
Figure 19A:
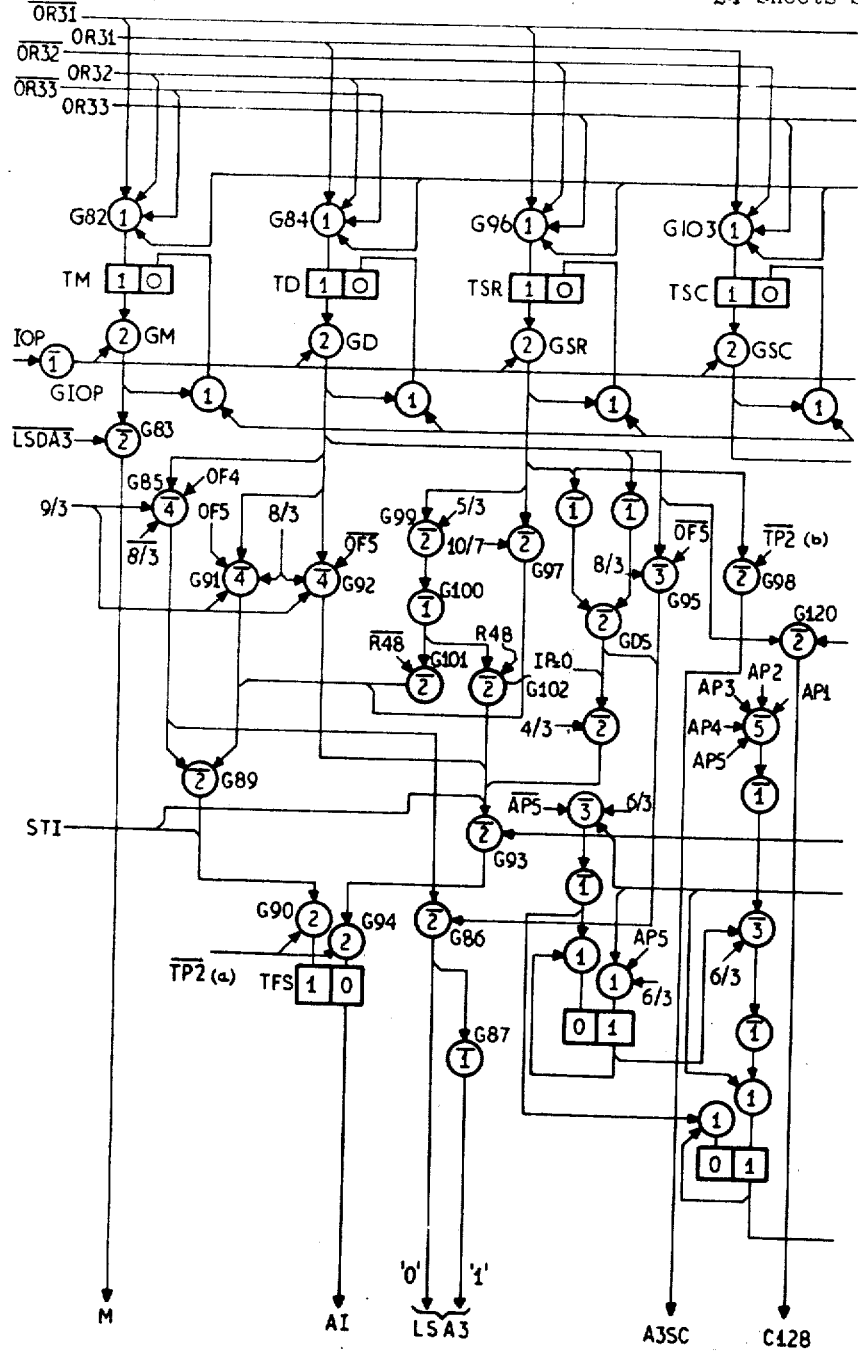
Figure 19B:
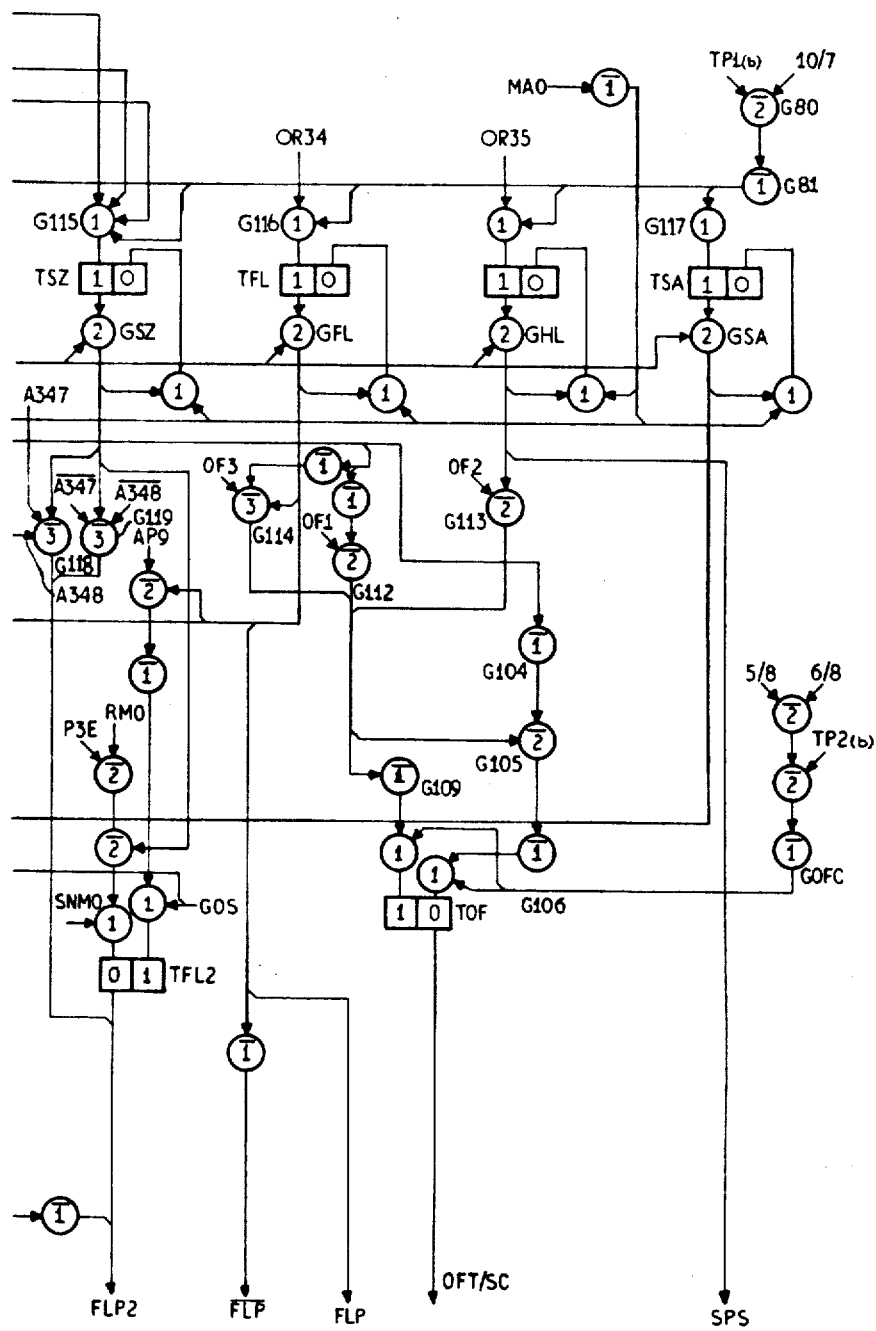
Figure 20:
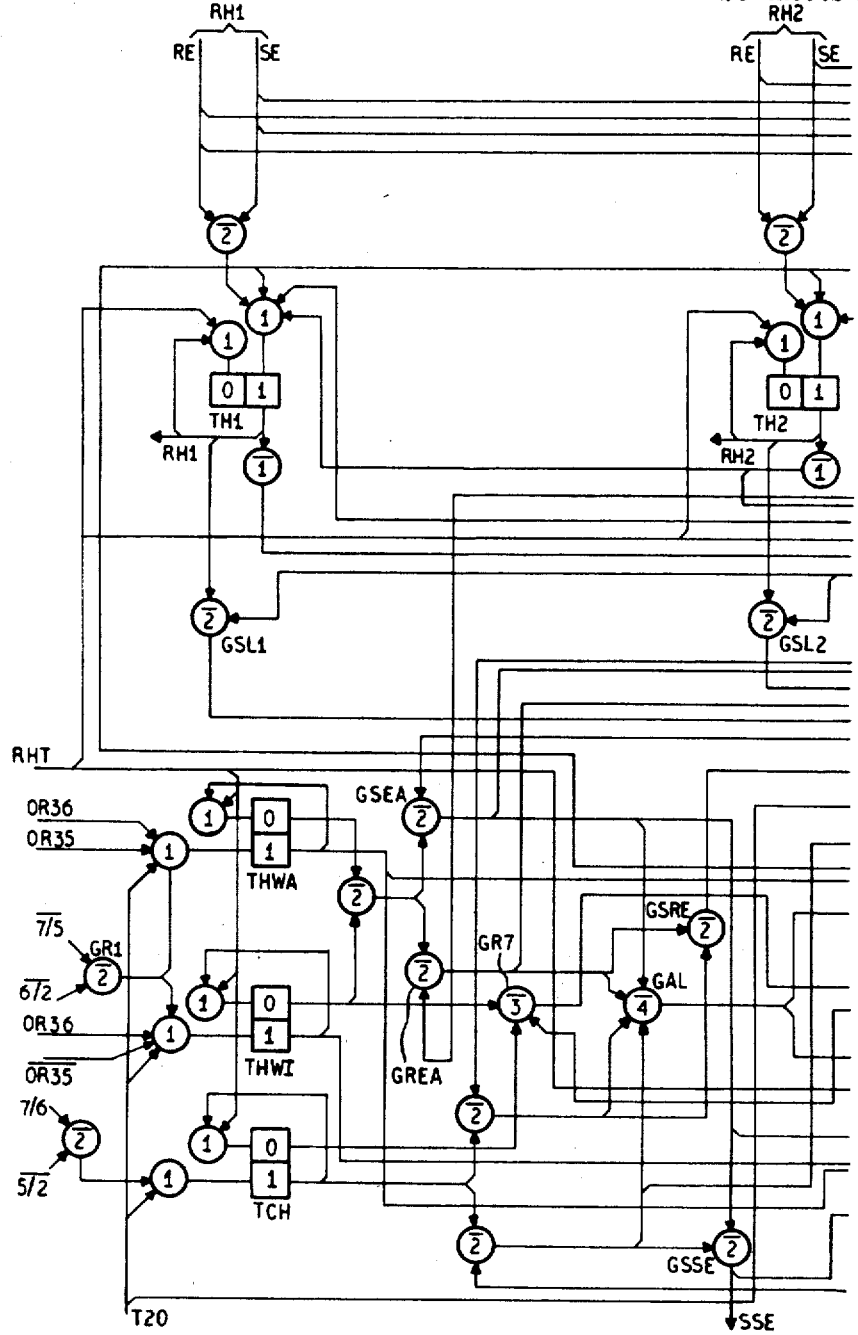
Figure 21:
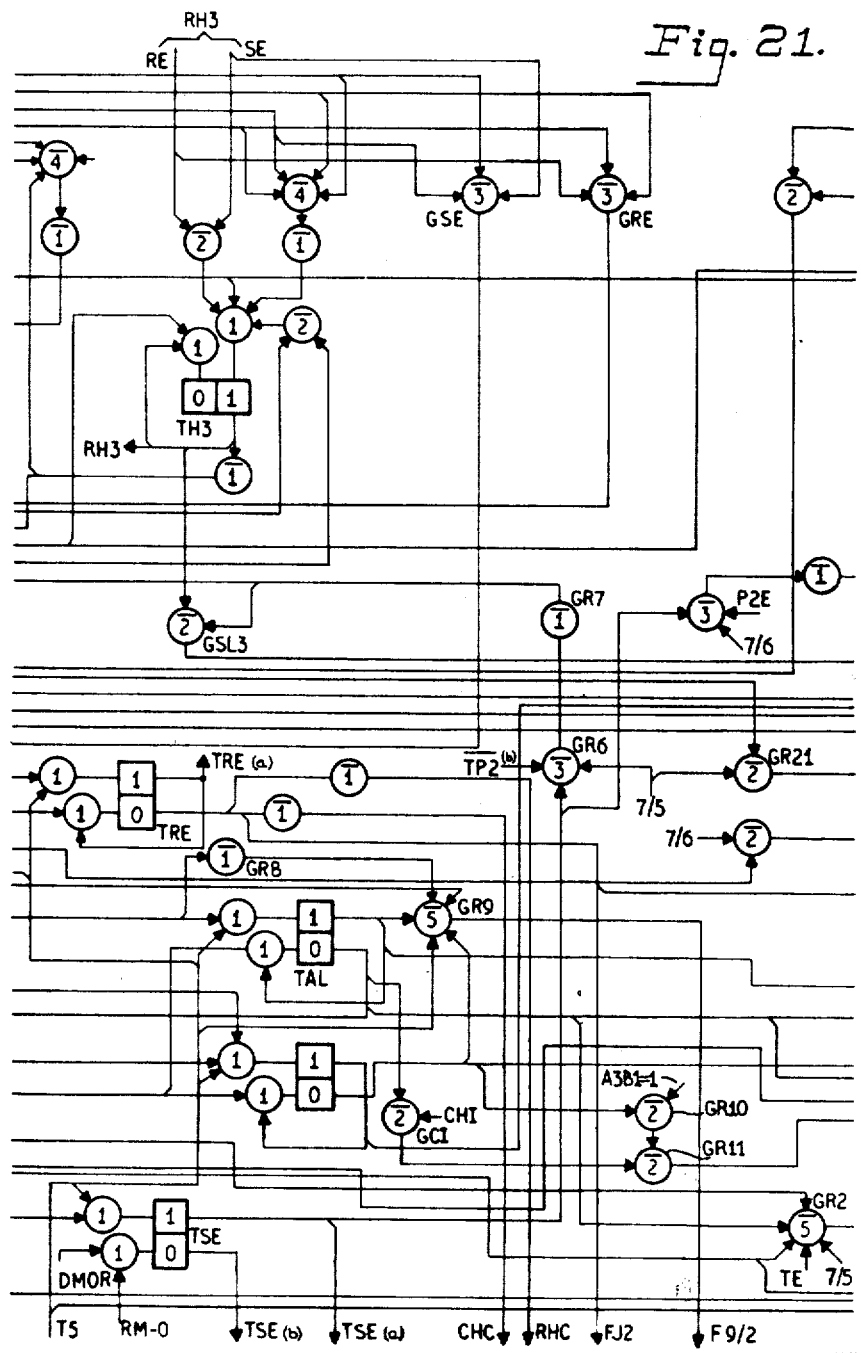
Figure 22:
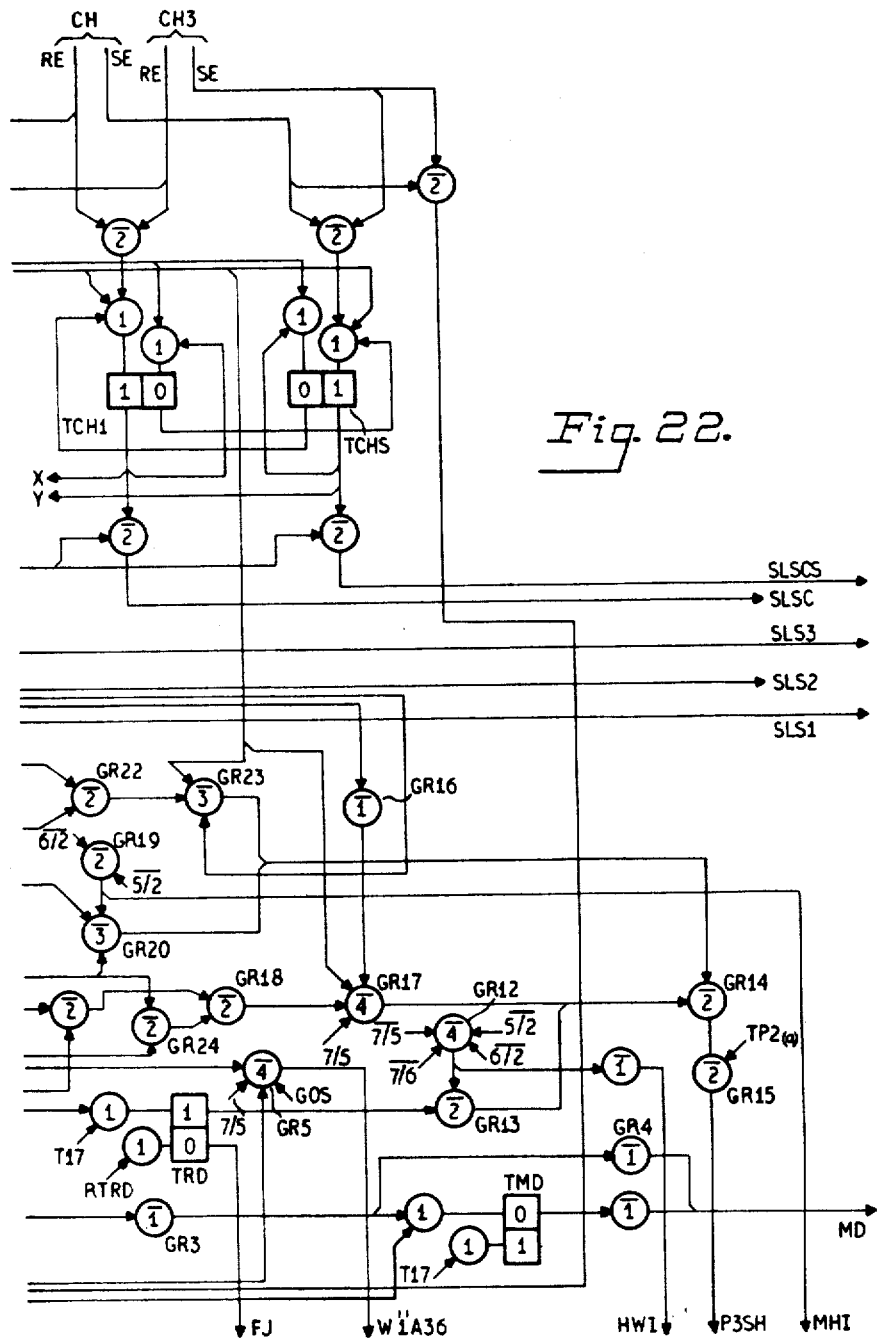
Figure 23A:
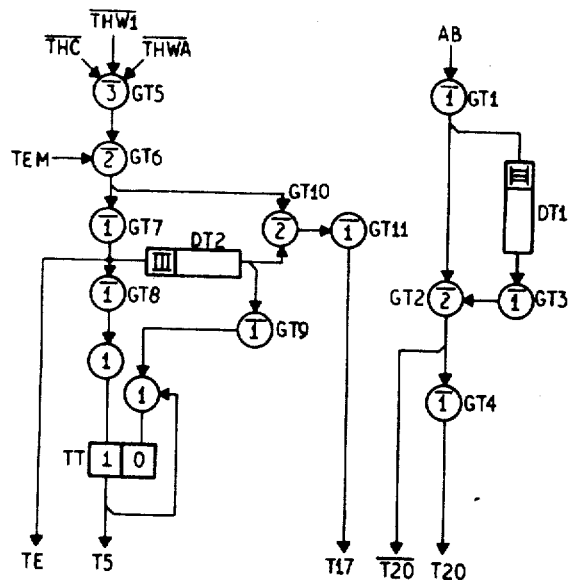
Figure 23B:
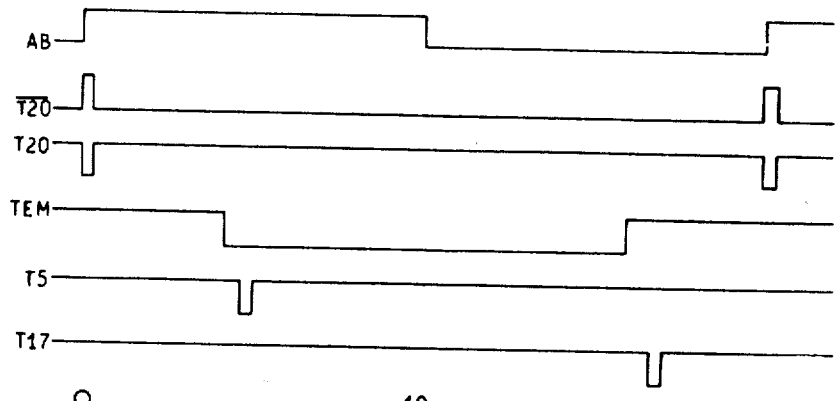
Figure 24:
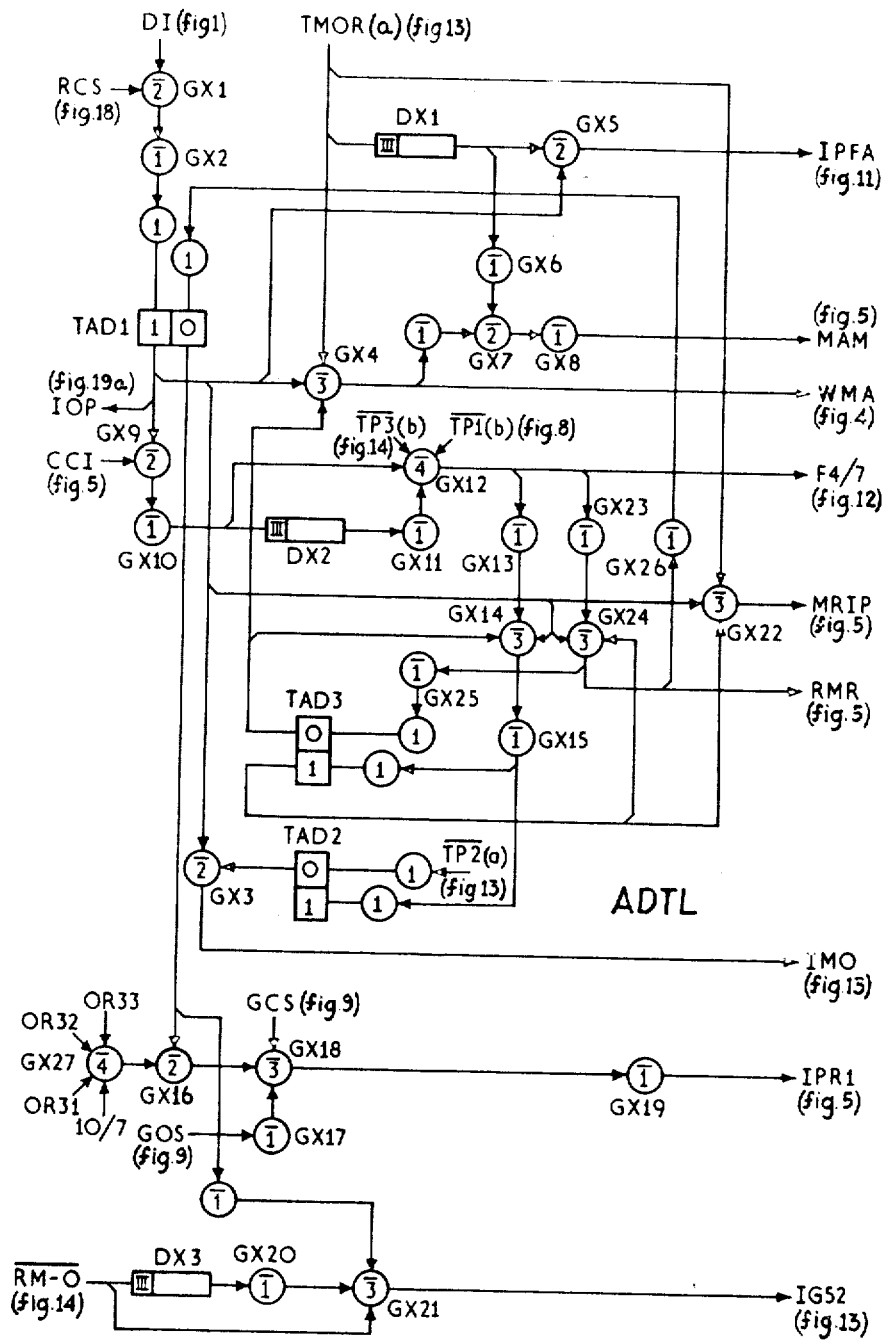

Of the drawings:
FIG. 1 shows an overall block diagram of the device according to the invention,
FIG. 2 shows the various formats available for the order register,
FIG. 3 shows a block diagram of the micro-programme store,
FIG. 4 shows a block diagram of the control unit,
FIG. 5 shows a block diagram of the index unit,
FIG. 6 shows a block diagram of the arithmetic unit,
FIGS. 7A, 7B and 7C show the circuit diagrams of various elements used in the computer,
FIGS. 8, 9, 10A, 10B, 11A, 11B, 12A, 12B, 13, 14, 15A, 15B, 16A, 16B and 17 show the logic arrangements for the control unit,
FIG. 18 shows how FIGS. 8–17 should be placed to form the complete unit,
FIGS. 19A and 19B show additional control logic for complete arithmetic operations,
FIGS. 20–22 show the highway control logic while
FIGS. 23A and 23B show the timing logic circuits and charts for the highway control logic.
FIG. 24 shows the logic circuits for the autonomous data transfer operation.

*Table of contents*

| | Column |
|---|---|
| I. General Description | 2 |
| II. Control Unit | 11 |
| III. Index Unit | 13 |
| IV. Arithmetic Unit | 14 |
| V. Phase Control Logic | 15 |
| VI. Additional Control Unit Logic | 25 |
| VII. M. Multiplication | 25 |
| VIII. D. Division | 28 |
| IX. SR. Square Root | 32 |
| X. O. Overflow | 34 |
| XI. SZ Standardisation | 35 |
| XII. FL Floating point arithmetic | 38 |
| XIII. 1FLA Floating point addition | 38 |
| XIV. FLM Floating point multiplication | 49 |
| XV. FLD Floating point division | 51 |
| XVI. MG Merging | 54 |
| XVII. R Rotation | 54 |
| XVIII. H. Highway operation | 54 |
| XIX. RH—Random data highway operation | 54 |
| XX. RHO—Computer originated random data highway operation | 54 |
| XXI. BRHO Computer-originated 24 bit section highway transfers | 60 |
| XXII. RHI Other equipment originated random data highway operation | 61 |
| XXIII. CH Clock highway operation | 62 |
| XXIV. I Interrupts | 62 |
| XXV. PO. Peripheral equipment operation | 63 |
| XXVI. ADT Autonomous data transfer operation | 64 |

I. GENERAL DESCRIPTION

FIG. 1 shows the overall block diagram for the computer and it will be seen from this diagram that the computer is divided into five main sections. These sections deal individually with: (i) storage (ST1 and ST2), (ii) arithmetic AU, (iii) indexing IU, (iv) control CU and (v) external peripheral equipment PE. The computer is operated completely in the parallel transmission mode and is fully asynchronous. It operates according to the fixed word process and deals with fractional data numbers, i.e., data numbers for use in processing are less than a decimal value of 1 in magnitude.

Any process performed by the computer is controlled by a stored programme which in turn controls a micro-programme store M–PS, in FIG. 1, situated in the control unit CU. Operations are carried out according to sequential-order-control principles, the current programme order store address being held in register PCR in the index unit IU.

On the completion of an order the next order in the programme must be read from the programme store (not shown) and this is performed by adding 1 to the contents of register PCR and using this newly formed programme order number to address the programme store over leads PSA. The order read from the programme store at the specified address is read over leads PS into the order register OR in the index unit IU.

The order word consists of a forty-eight bit word divided into four sections of twelve bits each. The various formats of the order word are shown in FIG. 2. The computer is capable of operating in either 1, 2 or 3 address form and each section of the order word is assigned a significance according to the address form required. From FIG. 2 it can be seen that the second section of the order word, bits 13–24, always indicates the first store address at which the data required for the particular process is located, in either store ST1 or ST2 in FIG. 1. Which of these two stores is required is indicated by the value of bits in the first section.

The first section, bits 1–12, is used to specify the M address, and comprises bits 1–8 the significance of which will be dealt with later, together with store selection, bits 11 and 12 and an index register selection code for index flexibility, bits 9 and 10. The two stores shown in FIG. 1 may both be used in a given process and bit 11 is used to define which of these two stores the first store address, order word bits 13–24, refers to. If bit 11 is a "0" store ST1 is used while a "1" in bit 11 indicates store ST2. Bit 12 is used in conjunction with the second store address similar arrangements being applied.

The second store address may be specified by either bits 25–36 or bits 37–48 according to the required order word format. On one and certain two address orders dealing with complex, half length and floating point operations bits 25–36 of the order word may be used to store an operation code, bits 31–36, the various significances being shown in the following table.

| OR bits | 33 | 32 | 31 |
|---|---|---|---|
| Spare | 0 | 0 | 0 |
| Spare | 0 | 0 | 1 |
| Multiply | 0 | 1 | 0 |
| Divide | 0 | 1 | 1 |
| Square root | 1 | 0 | 0 |
| Size comp | 1 | 0 | 1 |
| Standardise | 1 | 1 | 0 |
| Spare | 1 | 1 | 1 |

Bit 34 when 1 indicates floating point arithmetic is required, bit 35 when 1 indicates half length arithmetic is required or together with bit 36 may indicate active or idle computer conditions for highway messages.

The remaining bits of this section in this case (i.e., bits 25–30) are used to specify the iteration count for an arithmetic process indicating the number of operations required, up to a maximum of 64, for a complex arithmetic operation.

Bits 37–48 of the order register are used to specify subsection amend codes "0" indicating "do not amend" and "1" indicating "amend" for each of the twelve data word subsections (each subsection being four bits long) and a jump constant code on one and two address orders as well as the third store address on three address and the second store address on two address orders.

Referring now to FIG. 1 again, a broad outline of the operation of the computer will be given. A main programme order is commenced by reading out the order word in the programme store (not shown) at the address defined by the current programme order register PCR after the completion of the previous order and when one is added to the contents of register PCR. The output of the index processing equipment IP in the index unit IU is used for this purpose and the programme store is addressed over leads PSA. The order word is passed from the programme store to the order register OR in the index unit IU. Bits 1–8 of the order register, specifying the M address, are passed to the micro-programme store M–PS. This store M–PS is a diode store and is disclosed in our copending application No. 18,155, 1964.

An outline of the micro-programme store M–PS will be given with reference to FIG. 3. The eight bits forming the M address are split into two sections, bits 1–4 and bits 5–8. Bits 5–8 are used to select one-out-of-sixteen micro-programme units MP0–MP15 and bits 1–4 are used to select 1-out-of-16 order selection units OSU0–OSU15 in the selected micro-programme units. Each of the order selection units provides twelve outputs arranged, in a plug and socket translation field having an output register, SF & R, to provide one output in each of twelve groups of eight outputs thus providing a 12-out-of-96 selection arrangement. These outputs are used to control the operations of the index unit IU and the arithmetic unit AU.

The computer is organised on a three phase basis, with phase overlap, arranged to be fully cycled for each micro-order. Of these phases; phase 1 is the indexing phase; phase 2 is the processing phase and phase 3 the selection of the next micro or main order phase. The outputs from the micro-programme store M–PS translation field and register equipment SF & R are split into three sections each accommodating a number of groups of micro-instruction leads IL1–IL96. Each section of micro-instruction leads is used to control the logic used to produce the control signals for each phase. Micro-instruction leads IL1–32 are used to control phase 1 and these leads form groups one to four of the micro-instruction groups providing four outputs or micro-instructions one in each group, for the control of the index unit IU (FIG. 1) for any one selected micro-order. Micro-instruction leads IL33–IL77 are used to control phase 2 and these leads form groups five to nine together with two leads of each of groups ten and eleven of the micro-instruction groups and will provide either five, six or seven micro-instructions, depending on the need for the group ten and eleven micro-instructions, to control the arithmetic unit AU (FIG. 1) for any selected micro-order. The remaining section of micro-instruction leads IL78–96 are used to control phase 3 and these leads form the rest of groups 10 and 11 and the whole of group 12 of the micro-instruction groups for the control of the index unit IU. A brief outline of the use of each group of micro-instructions will be given under the phase headings in which they are used.

*Phase 1.*—Group 1 of the micro-instructions is arranged to control the transfer of data from the current programme register PCR (FIG. 1), the order register OR and the micro-jump register (not shown in FIG. 1) to the index processer in the index processing equipment IP.

Group 2 of the micro-instructions is arranged to control the internal transfer of data from the index registers in the index processing equipment IP to the index processor for use, for example, in address modification of the order word.

Group 3 of the micro-instructions is arranged to control the transfer of the output of the index processer to the order, index and current programme registers after indexer processing (address modification and select next main order operations).

Group 4 of the micro-instructions is arranged to control the transfer of data at the output of the index processer in the index processing unit IP to control the operation of the data stores ST1 and ST2. This addressing arrangement is used to set up the store ready for the transfer of the required data to the arithmetic unit. This group of micro-instructions also includes micro-instructions for the control of the transfer of the output of the index processer to the M-address section of the order register for next micro-order selection or to the micro-jump register on jump routines.

This completes the assessment of the phase 1 micro-instructions and all these conditions will be handled in the control unit CU phase 1 section logic PH1 in FIG. 1.

To explain the use of the above phase 1 micro-instructions and the phase 2 and 3 micro-instructions, it will be assumed that a simple three-address addition process is required and the two accumulators (not shown in FIG. 1) in the arithmetic unit are zeroised. The need for the later assumption will be self evident later in the description. The main order read from the programme store will be as shown in 1 of FIG. 2 where store address 1 will define the store location of the data to be used as the operator (addend), store address 2 will define the store location of the data to be used as the operand (augend) and store address 3 will define the store location required to store the result (sum). The M address is used to specify the first address in the micro-programme store of the series of micro-orders used in the three address addition micro-routines and it will be assumed that this address is 0/1 in decimal form or 0000/0001 in binary form.

(1) *Main order (i.e., first micro-order).*—When the main order has been read into the order register OR (FIG. 1) the M address is used to select the order selection unit OSU1 in micro-programme unit MP0 (shown in FIG. 3). This order selection unit provides twelve outputs, one in each of the micro-instruction groups, and, by means of the translation field in SF & R, significant outputs will be experienced in groups 1 and 4 in the phase 1 micro-instruction groups. The micro-instruction in group 1 will specify a transfer of order register OR bits 13–24 together with bit 11 (the store selection bit) to one input of the index processer in he index processing equipment IP. An addition process takes place causing nought to be added to order register OR bits 13–24 in the index processer and, when this operation is successfully complete, the group 4 micro-instruction specifies a transfer of the index processer output (i.e., store address 1) to the selected store (either ST1–ST2 decided by the value of bit 11) causing a read/write operation to take place. The store equipment used may conveniently be according to our copending application No. 38,767, 1963. The above operations causes the data stored at the address defined by order register bits 13–24 to be fed into the store output register and re-written back into the addressed location. The completion of this store operation is indicated to the control unit CU and this condition, active in phase 1 control logic PH1, ends the phase 1 operation.

(1a) *Phase 2.*—The groups of micro-instructions used in this phase are as follows.

Group 5 of the micro-instructions is arranged to control the transfer of data from the arithmetic accumulators (not shown in FIG. 1), the order register OR and the index registers in the index processing equipment IP to one input (operand) of the arithmetic processer in the arithmetic unit. The arithmetic processer may conveniently be an adder/subtractor of the type disclosed in our copending application 18,156, 1964. Micro-instructions are also provided in this group for the control of transfers of information from certain of the peripheral equipments PE to the arithmetic unit AU.

Group 6 of the micro-instructions is arranged to control the transfer of data from the arithmetic accumulators, either of the two data stores ST1–ST2, other equipments in the peripheral equipments PE to the other input (operator) of the arithmetic processer in the arithmetic unit AU.

Group 7 of the micro-instructions is arranged to control the distribution of the data from the output of the arithmetic processer to peripheral equipment PE. Micro-instructions in this group also control the process of the arithmetic processer (i.e., ADD, SUBTRACT, Add & +1, Sub & −1) and the sub-section amend process.

Group 8 of the micro-instructions is arranged to control the transfer to data from the output of the arithmetic processer to the accumulators in the arithmetic unit AU.

Group 9 provides micro-instructions for the control of shifts in one of the accumulators, controls the transfer of processed data to the stores (e.g., resultant writeback) and provides additional accumulator input control to Group 8.

Group 10 provides micro-instructions for the control of both phase 2 and 3. The phase 2 micro-instructions are arranged to control the transfer of the arithmetic processer output to the order register OR and a shift transfer between accumulators in the arithmetic unit.

Group 11 like group 10 micro-instructions provide control of both phase 2 and 3. The phase 2 micro-instructions are arranged to control the merging facilities of 1 or 0 on an arithmetic processer output transfer to any of the registers in the system.

The use of the above groups of micro-instructions on the assumed three address addition process in phase 2 will now be explained. The selected order selection unit OSU in micro-programme unit MP0 (FIG. 3) will cause significant outputs in groups 6, 7 and 8. The group 6 micro-instruction causes the transfer of the selected store output to the operator input of the arithmetic processer. The group 7 micro-instruction will cause an addition process to take place in the arithmetic processer effectively causing nought to be added to the output of the selected store. The group 8 micro-order causes the output of the arithmetic processer to be transferred to one of the accumulators in the arithmetic unit. The successful completion of this transfer is indicated to the control unit CU and this condition, active in phase 2 control logic PH2, ends the phase 2 operation.

(1b) *Phase 3.*—The groups of micro-instructions used in this phase are as follows:

Group 10 which provides, together with group 11, a number of jump test conditions for the arithmetic and index unit process results.

Group 12 which provides micro-jump, main jump and select next main and micro-order micro-instructions which are all dependent on the results of the groups 10 and 11 tests.

In the assumed three address addition process, significant outputs will be experienced in group 12 only in this phase causing the selection of the next micro-order. This process is performed by transferring the M address in order register OR bits 1–8 to the index processing equipment IP (FIG. 1) in the index unit IU adding 1 to this M address and returning it to order register OR bits 1–8. The completion of this operation is indicated to the control unit CU and this condition, active in phase 3 control logic PH3, ends the phase 3 operation.

The three phases of operation of the computer have resulted in the transfer of the data stored at the order-register store address 1 to an arithmetic accumulator. The original micro-order is now modified to a decimal form of 0/2 or in binary form 0000/0010, thus preparing the computer for the execution of the second micro-order of the micro-programme routine required to perform the selected programme main order.

(2) *Second micro-order.*—This micro-order is required to control (a) the transfer of the second store address data to the arithmetic processer, (b) the addition of the operand and operator and the temporary storage of the result.

The end of phase three of the first micro-order automatically starts phase 1 of the second micro-order. The phase 3 micro-order 1 modified M-address causes twelve outputs from order selection unit OSU2 (FIG. 3) in micro-programme unit MP0 which after translation in the translation field and register unit SF & R cause significant outputs in the various phase 1, 2 and 3 micro-instruction groups to control the required operations.

(2a) *Phase 1.*—In this phase significant outputs will be experienced in groups 1 and 4. The micro-instruction in group 1 will cause an output signal from the phase 1 control logic PH1 (FIG. 1) which will control the transfer of the store address 2 from the order register OR bits 25–36 to the input of the index processer in the index processing equipment IP. An addition process will take place adding nought to the store address 2. The micro-instruction in group 4 will cause a read/rewrite operation to take place in the store, either ST1 or ST2 selected by the value of the store select bit in order register OR bit 12 at the address specified by the output of the index processing equipment IP. The completion of the store read/write operation is indicated to the control unit CU phase 1 control logic PH1 causing the end of the phase 1 operation.

2(b) *Phase 2.*—In this phase significant outputs will be experienced in micro-instruction groups 5, 6, 7 and 8. The micro-instruction in group 5 controls the transfer of the data (operand) in the accumulator in the arithmetic unit AU to the operand input of the arithmetitc processer. The micro-instruction in group 6 controls the transfer of the output of the selected store, either ST1 or ST2 according to the value of bit 12 of the order register OR, to the operator input of the arithmetic processor in the arithmetic unit. The group 7 micro-instruction controls the addition of the two sets of data (i.e., addend and augend) and the group 8 micro-instruction controls the transfer of the output of the arithmetic processor (i.e., the sum) to a specified accumulator in the arithmetic unit AU. When this process is complete a signal is sent to the control unit CU phase 2 control logic PH2 causing the end of phase 2 and the start of phase 3.

2(c) *Phase 3.*—In this phase a significant output will be experienced in group 12 only causing the selection of the next micro-order. This process is performed as shown above for the first micro-order causing one to be added, in the index processer, to the M address and returning this new third micro-order to the order register OR bits 1–8. The completion of this operation is indicated to the control unit CU causing the end of phase 3 signal to be produced by the phase 3 control logic PH3.

The three phases of operation of the computer under the control of the second micro-order have resulted in the addition of the data specified by the order word store addresses 1 and 2 and the storage of the sum in a particular accumulator in the arithmetic unit AU. The second micro-order is modified to a decimal form of 0/3 or in binary form 0000/0011, thus preparing the computer for the execution of the third micro-order of the micro-programme routine required to perform the selected programme main order.

(3) *Third micro-order.*—This micro-order is required to control the "write-back" to store of the resultant (sum) and to select the next main order in the current programme.

The end of phase 3 of the second micro-order automatically starts phase 1 of the third micro-order. The new M-address in the order register OR bits 1–8 causes the usual twelve outputs from order selection unit OSU3 (FIG. 3) in micro-programme unit MP0 which after translation in the strapping field and register SF & R cause significant outputs in the various phase 1, 2 and 3 micro-instruction groups to control the required operations.

3(a) *Phase 1.*—In this phase significant outputs will be experienced in micro-instruction groups 1 and 4. The micro-instruction in group 1 will cause an output signal from the phase 1 control logic PH1 (FIG. 1) which will control the transfer of the store address 3 from the order register OR bits 37–48 to the input of the index processer in the index processing equipment IP. An addition process will take place adding nought to the store address 3. The micro-instruction in group 4 will cause a set address operation to take place in the store, either ST1 or ST2, selected by the value of the store select bit in order register OR bit 11 (i.e., that bit used to specify the store for store address 1) using the output of the index processer. The completion of the set address operation is indicated to the control unit CU and a phase 1 complete indication is produced by phase 1 control logic PH1.

3(b) *Phase 2.*—In this phase significant outputs will be experienced in micro-instruction groups 5, 7 and 9. The micro-instruction in group 5 controls the transfer of the output of the specific accumulator storing the resultant data word formed in the previous micro-order routine to one of the inputs to the arithmetic processer in the arithmetic unit AU. The group 7 micro-instruction controls the addition of nought to the resultant and the group 9 micro-instruction controls the write operation of the store after the phase 1 "set address" operation. Thus the output of the arithmetic processer (i.e., the sum) is transferred to the store and into the location specified by the order word store address 3. The completion of this store operation is used to end the phase 2 operation in PH2 and start the phase 3 operation.

3(c) *Phase 3.*—In this phase a significant output will be experienced in group 12 only causing the selection of the next main order. This process is performed by transferring the contents of the current programme order register PCR to the index processer, adding 1 to this and using the output of the index processer, in the index processing equipment IP, to address the programme store PS over leads PSA in FIG. 1. This causes the next main order in the programme to be read into the order register. Register PCR is thus used as the programme order counter. The next main order word will contain the M address required to start the next micro-programme routine. If a three address addition process is again reguired the same M address will be specified as that which started the described micro-programme routine. Other processes will have other starting M addresses.

From the above it can be seen that each main order of the programme is performed by using a micro-programme consisting of a number of sequentially stored micro-orders. The micro-programmes are stored in the micro-programme store and a sequential order control arrangement, using the M address section of the order register OR as the current micro-programme micro-order counter and register, is employed.

The significance of the assumption made at the start of the above description on the 3 address addition process will now be apparent as the accumulators in the arithmetic unit will be storing the data found in the store address 1 and the resultant. A micro-order will be used at the start of a micro-programme to clear these accumulators if required. This and the actual operations performed are in the hands of the programmer and therefore all the micro-routines shown in this specification are only typical examples.

The operations performed by each micro-order in a micro-programme is determined by the translation field in SF & R (FIG. 3) as each of the 256 order selectors in the system simply provide twelve outputs, one for each of the twelve groups of 96 micro-instructions. The significance of each micro-instruction within each group for any selected micro-order is defined by the translation field and is manipulated to provide control signals for the arithmetic and index units by the phase control logic units PH1–3.

The translation field consists of a plug and socket arrangement as shown in our copending application No. 18,155, 1964 thus allowing any micro-instructions to be interrelated to form any desired micro-order and, if required allowing a very simple method of altering any micro-order and extending the size of the store.

The arrangement of eight micro-instructions per group allows a simple fault checking arrangement to be provided. As each order selector unit provides twelve outputs, one for each group of micro-instructions, a detector of the type disclosed in our copending application No. 5,886, 1963 may be used to monitor each group of micro-instructions, any group having more or less than one output out of eight will cause a fault indication. All the micro-instruction groups have their last or eighth output idle thus allowing a one-out-of-eight arrangement even if none of the micro-instructions in that group are required for a specific micro-order.

The actual significance of each micro-instruction within each group is shown in the three tables below, one for each phase.

| Class | Function | From | Bits | To | Bits |
|---|---|---|---|---|---|
| Group 1: | | | | | |
| 1 | Data Transfer | PCR | 1-16 | Index Processor Operand | 1-16 |
| 2 | | Order Reg | 13-24, 11 | | 1-13 |
| 3 | | do | 25-36, 12 | | 1-13 |
| 4 | | do | 37-48, 12 | | 1-13 |
| 5 | | Micro-Jump Reg. 1-8; Order Reg. 9-12 | 1-12 | | 1-12 |
| 6 | | Order Reg | 1-12 | | 1-12 |
| 7 | ±1 | (Used with any Group 2 Order.) | | | 1-12 |
| 8 | Idle. | | | | |
| Group 2: | | | | | |
| 1 | Data Transfer | Any External Input | 1-16 | Operator | 1-16 |
| 2 | | Index Reg | 1-16 | Operand | 1-16 |
| 3 | | do | 17-32 | do | 1-16 |
| 4 | | do | 1-16 | Operator | Index Processor | 1-16 |
| 5 | | do | 17-32 | do | 1-16 |
| 6 | | do | 33-48 | do | 1-16 |
| 7 | ±1 | (Used with any Group 1 Order.) | | | |
| 8 | Idle. | | | | |
| Group 3: | | | | | |
| 1 | Subtract | (Used with any group 4 order.) | | | |
| 2 | Data Transfer | Index Processer | | 1-16 PCR | 1-16 |
| 3 | | | | 1-12 Order Reg | 13-24 |
| 4 | | | | 1-12 do | 25-36 |
| 5 | | | | 1-16 Index Reg | 1-16 |
| 6 | | | | 1-16 do | 17-32 |
| 7 | | | | 1-16 do | 33-48 |
| 8 | Idle. | | | | |
| Group 4: | | | | | |
| 1 | Subtract | (Used with any Group 3 Order.) | | | |
| 2 | Store Read | Used in conjunction with a transfer from Processer Output to the Store. | | | |
| 3 | Read/Rewrite | | | | |
| 4 | Set Address | | | | |
| 5 | Data Transfer | Index Processer | | 1-12 Order Reg | 37-48 |
| 6 | | | | 1-8 Micro-Jump Reg | 1-8 |
| 7 | | | | 1-12 Order Reg. & Check Reg | 1-12--1-8 |
| 8 | Idle. | | | | |

TABLE 1 (PHASE 1)

| Class | Function | From | Bits | To | Bits |
|---|---|---|---|---|---|
| Group 5: | | | | | |
| 1 | Data Transfer | Main Index Register | 49-60 | Operand | 13-48 |
| 2 | | Any Clock H'way | 1-36 | do | 13-48 |
| 3 | | Accumulator 1 | 1-48 | do | 1-48 |
| 4 | | Accumulator 2 | 1-48 | do | Arithmetic Processer | 1-48 |
| 5 | | Accumulator 3 | 1-48 | do | 1-48 |
| 6 | | Order Reg | 1-48 | do | 1-48 |
| 7 | | Index Reg | 1-48 | do | 1-48 |
| 8 | Idle. | | | | |
| Group 6: | | | | | |
| 1 | Data Transfer | Any Store | 1-48 | Operator | 1-48 |
| 2 | | Any Random H'way | 1-48 | do | 13-48 |
| 3 | | Any Tape | 1-12 | do | Arithmetic Processer | 1-12 |
| 4 | | Accumulator 1 | 1-48 | do | 1-48 |
| 5 | | Accumulator 2 | 1-48 | do | 1-48 |
| 6 | | Accumulator 3 | 1-48 | do | 1-48 |
| 7 | Interrupt. | | | | |
| 8 | Idle. | | | | |
| Group 7: | | | | | |
| 1 | Add & +1 | Add if none of these | | Control Arithmetic Processer. | |
| 2 | Sub & −1 | | | | |
| 3 | Subtract | | | | |
| 4 | Subsecs.—Don't Amend | Arith. Processer | | x1 to any Reg. | |
| 5 | Data Transfer | Arithmetic Processer Output | 13-48 | Highway (Random) | 1-36 |
| 6 | | | 1-48 | Clock H/W | 13-48 |
| 7 | | | 1-12 | Tape (Paper or Mag.). | |
| 8 | Idle. | | | | |
| Group 8: | | | | | |
| 1 | Data Transfer | Processer | 1-48 | x1 ACC. 1 | 1-48 |
| 2 | | do | 1-48 | x½ ACC. 1 | 1-48 |
| 3 | | do | 1-48 | x2 ACC. 1 | 1-48 |
| 4 | | do | 1-48 | $x2^4$ ACC. 1 | 1-48 |
| 5 | | do | 1-48 | Index Reg | 1-48 |
| 6 | | do | 1-48 | x1 ACC. 2 | 1-48 |
| 7 | | do | 1-48 | x½ ACC. 2 | 1-48 |
| 8 | Idle. | | | | |
| Group 9: | | | | | |
| 1 | Write | Processer | 1-48 | Stores | 1-48 |
| 2 | Right Shift | Accumulator 3. | | | |
| 3 | Left Shift | | | | |
| 4 | Data Transfer | Processer | 1-48 | x2 ACC. 2 | 1-48 |
| 5 | | do | 1-48 | $x2^4$ ACC. 2 | 1-48 |
| 6 | | do | 1-48 | x1 ACC. 3 | 1-48 |
| 7 | Rotation ACC. 3 $x2^{24}$ | | 1-48 | | 1-48 |
| 8 | Idle. | | | | |
| Group 10: | | | | | |
| 1 | Data Transfer | Processer | 1-48 | Order Reg | 1-48 |
| 2 | Left Shift $x2^2$ | Accumulator 2 | | Accumulator 1. | |
| Group 11: | | | | | |
| 1 | Merge "1"s | Arithmetic Processer | | x1 To any Reg. | |
| 2 | Merge "0"s | | | | |

TABLE 2 (PHASE 2)

| Class | Function |
|---|---|
| Group 10: | |
| 3 | Index Processor Bits 7-16≠0. |
| 4 | Arithmetic Processor Bits 1-24≠0. |
| 5 | Arithmetic Processor Bits 24 is Negative. |
| 6 | AP Bit 1=1. |
| 7 | Select Arithmetic. |
| 8 | Idle. |
| Group 11: | |
| 3 | Arithmetic Processor Bits 25-48≠0. |
| 4 | Overflow/Size Comparison. |
| 5 | Index Processor Bits 1-6≠0. |
| 6 | Index Processor Negative. |
| 7 | Arithmetic Processor Bit 48 is Negative. |
| 8 | Idle. |

JUMP CONDITIONS SPECIFIED IN GROUPS 10 AND 11

| Class | If Fulfilled | If Unfulfilled | If Nonspecified |
|---|---|---|---|
| Group 12: | | | |
| 1 | Main Jump to O.R. 13-24 | Main Jump to O.R. 25-36 | Select next Main Order. |
| 2 | Micro-Jump to MJR 1-8 | Step on to next Micro-Order | Step on to next Micro-Order. |
| 3 | Repeat Micro-Order | do | Optional Stop and Micro-Jump to MJR 1-8. |
| 4 | do | Select next Main Order | |
| 5 | Jump to O.R. 13-24 | Step on | |
| 6 | Step on to next Micro Order | Select next Main Order | |
| 7 | Micro-Jump to MJR 1-8 | do | |
| 8 | Select next Main Order | Step on to next Micro-Order | |

In the above tables reference is made to random and clock data highways. These highways are used to provide links between the peripheral equipment PE and the computer. The random data highway system is the subject of our copending application No. 21,877, 1963 and the use of these and the clock highways will be explained later with reference to FIGS. 20–22 showing the control logic required.

II. CONTROL UNIT

With reference now to FIG. 4 an outline description of the operation of the control unit will be given. When the micro-programme store M–PS is addressed by the M-address, stored in the order register OR bits 1–8, the selected micro-instruction in each of the twelve groups of micro-instructions is passed, via the micro-instruction amplifiers M–IA, to the micro-instruction register M–IR. The micro-instruction amplifiers are strobed by the strobe repeaters SR under the control of signal MS. The significance of the micro-programme strobe signal MS will be seen later.

The micro-instruction register may conveniently consist of 96 bistable toggle circuits, one toggle for each possible micro-instruction. The toggles in the micro-instruction register M–IR are set to conditions appropriate to the micro-instructions read from the micro-programme store M–PS. At this time, a signal P1S is passed from the phase 3 control logic P3CL to the phase 1 control logic P1CL indicating that the previous micro-order operation is complete and the next micro-order of the current or next main order may start.

(1) *Start phase 1.*—The phase one control logic P1CL generates a signal P1C which is used to control the gates in the sequence unit SQS1 to gate out the selected micro-instructions which control the application of data to the index processer input gates. These micro-instructions are in groups 1 and 2 and they produce signals which are indicated by leads IPOD, the operand input gate control signals, and leads IPOR, the operator input gate control signals. Signal P1C is also applied to the phase 1 add control circuit A1C. This add control circuit generates a signal A/SC which is delayed for a period sufficient to allow the set up of the index processer input gates. Signal A/SC is applied to the sequence switch SQS1 and is used to produce an add or subtract signal according to the idle or selected state of micro-instructions 3/1 or 4/1. The add and subtract signals are grouped under leads IPM in FIG. 4. The generation of one of these IPM, or index processer manipulation, signals initiates the required operation of the index processer.

The control logic now waits until the index processer has completed its operation indicated by carry-complete signal CCI. When the phase 1 control logic P1CL receives the CCI signal, a signal of defined duration is produced on lead GS to open the index processer resultant transfer gates which are fed by micro-instruction 3/2 to 3/7 and 4/2 to 4/7. Micro-instructions 4/2, 4/3 and 4/4 deal with the transfer of the index processer resultant to store while the other micro-instructions in groups 3 and 4 deal with the transfer of the resultant to the index, order or micro-jump registers. The latter group of signals, producing signals within the group designated IPR, allow the end of the phase 1 to take place. However, if a store operation is required (micro-instructions 4/2–4/4) signals will be produced within the group designated SCS and phase 1 cannot be completed until the store has completed the required operation. The presence of one of the store control signals SCS causes the inhibiting of the end of phase 1 signal and operates the store selection circuit SSC. This circuit is fed with bit 13 of the output of the index processer. This bit will be either bit 11 or 12 of the order register according to which of the three store address bits of the order register are currently being used. If the index processer bit 13 is a "zero," store 1 is required to provide the data for phase 2 and if it is a "one," store 2 is required. Which store is required is remembered by the store selection circuit SSC.

When the store operation is complete a signal SF is generated by the store to indicate that fact and the phase 1 control logic is reset indicating the end of phase 1.

(2) *Start phase 2.*—Phase 2 may be started in response to the start of phase 1, if no store operations are required in phase 1, or, if this is not so (i.e., one of micro-instructions 4/2–4 is selected), at the end of phase 1.

When the phase 2 control logic P2CL finds that phase 2 may start, start signal P2S is produced which allows the protection of the arithmetic processor input gate control signals under the control of the selected micro-instruction in groups 5 and 6. These signals APOD and APOR are under the control of the tape/highway synchronisation circuit T/HS which is used to synchronise the asynchronous computer to the synchronous tape or highway (i.e., peripheral) equipment. This synchronisation circuit is fed with the peripheral clock signals over leads HCS and the APOD and APOR signals in the sequence switch SQS2 are controlled by the peripheral equipment ready signals on leads PR.

The tape/highway synch. circuit T/HS also controls the add/subtract control circuit A2C together with the phase 1 control logic P2CL to produce an add or subtract signal according to the required operation of the arithmetic processer as specified by one or none of micro-instructions 7/1–3. The add or subtract signal A/S is again delayed by the add control circuit A2C to allow the set up of the data at the arithmetic processor input gates. The generation of one of signals A/S initiates the operation of the arithmetic processor.

The phase 2 control logic now waits until the arithmetic processer has completed its operation. This condition is indicated to the phase 2 control logic P2CL by a carry complete signal on lead CCA. The reception of signal CCA allows the generation of signal RCS by phase 2 control logic P2CL and this signal causes the generation of one of the arithmetic resultant control signals APR, one of the subsection control signals ASC including merging, one of the interrupt signals INT or the store write signal SW according to the micro-instructions in groups 7, 8, 9, 10 and 11. The generation of signal CCA also initiates, within the phase 2 control logic, the end of phase 2.

(3) *Start Phase 3.*—Phase 3 may be started at the start of phase 2, if no jump tests associated with the arithmetic processor outputs are specified in micro-instruction groups 10 and 11 and if the store is not required in phase 1 (i.e., micro-instructions 6/1 and 9/2 are not required), or when phase 2 ends if the aforementioned conditions arise. In any event phase 3 cannot start until phase 1 is complete.

When the phase 3 control logic P3CL finds that phase 3 may start a signal DP3S is produced to allow the results of the jump decisions, taken under the control of the jump test staticisor JTS, to control the sequence switch SQS3. The jump test staticisor is set up according to the results of the jump tests, defined by the group 10 and 11 micro-instructions, made in phases 1 and 2. The results of the tests control the production of various signals from the sequence switch SQS3 to perform the selection of the next main or micro-order as required according to the group 12 micro-instructions. The signals generated by the sequence switch SQS3 and the phase 3 control logic cause "forced" phase 1 micro-instructions to be generated to control the operation of the index processor.

The completion of the operation of the index processor is signalled to the phase 3 control logic by the carry complete signal CCI and this signal is effective in causing the reset of the micro-instruction register M–IR (signal RMIT). The control logic P3CL also produces signal MS to strobe in the new set of micro-instructions and signal P1S to start phase 1 again for the new order.

The operation of the actual logic required will be explained later with reference to FIGS. 8–17.

III. INDEX UNIT

A description of the index unit will now be given with reference to FIG. 5. The index unit consists of a forty-eight bit order register OR, the significances of which are shown in FIG. 2, three sixteen bit index registers IR1, IR2 and IR3, two processor input switches, IPODS for the index processor operand inputs and IPORS for the operator inputs, an index processor IP, an eight bit micro-jump register M–JR, a sixteen bit current programme order store PCR which may be considered as a fourth index register IRA and an index processor resultant switch IPRS.

The functions performed by the index unit are dependent upon the selected micro-instructions in groups 1–4 and the "forced" phase 3 micro-instructions. It will be seen from FIG. 5 that it is possible to use the contents of the index register, IR1, IR2, or IR3, to add to the store addresses specified by the order register for the normal address modification operation. The order register addresses use the operand switch IPODS while the index registers use the operator switch IPORS. This latter switch has an additional input AEI which is used to supply the operator input from any external source when micro-instruction 2/1 is selected. Each switch may conveniently consist of eight sets of sixteen gates (making 128 gates in all) each set of gates being separately controlled by the micro-instructions selected, one of the IPOD or IPOR signals, from the phase 1 section of the control unit. The index processor consists of an adder/subtracter circuit controlled by signals IPM from the phase 1 section of the control unit (these signals being add, subtract and +1) and this processer may conveniently be of the type disclosed in our copending No. 18,156, 1964.

The output of the index processer IP is distributed to the selected micro-instruction defined destination by the resultant switch IPRS. This switch is controlled by signals from the phase 1 section of the control logic and may be of similar configuration to switches IPODS and IPORS. The output SAL indicates the output of the index processer which may be used to address one of the system stores. Three outputs from the index processor are also provided for use in the control unit, signal CCI indicating the "carry complete" condition, signals $IPA \neq 0$ indicating that bits 1–8 of the index processor output are not equal to zero and $IPB \neq 0$ indicating that bits 9–16 of the index processor resultant are not equal to zero.

It will be noticed that the various sections of the order register are accessed by some of the outputs of the index processer, however, inputs to the order register are also provided from the output of the two stores together with the output of the arithmetic processer, leads APR (11/1) indicate this access path used when micro-instruction 11/1 is selected. The latter access path is used in a select next main order operation and signals ST1R or ST2R generated in phase 3, control which store output is used.

The various operations of the index unit will be and have been referred to throughout other sections of this description.

IV. ARITHMETIC UNIT

A description of the arithmetic unit will now be given with reference to FIG. 6. The arithmetic unit consists of two input switches, APODS for the operand inputs and APORS for the operator inputs, an arithmetic processor AP, a resultant switch APRS and three accumulators, ACC1, ACC2 and ACC3. The input switches APODS and APORS may be of similar configuration to those used for the index processor input switches IPODS and IPORS shown in FIG. 5. The operand switch is capable of allowing access from output data sources: the clock highway CH, the current programme order store PCR, the index registers (IR1, IR2 and IR3 combined), the order register or one of the three accumulators ACC1, ACC2 and ACC3, to the arithmetic processer AP. Which of these sources is used for the operand data for any particular computation is defined by the micro-instruction selected in group 6 causing a particular signal on one of leads APOD. The operator switch is capable of allowing access for output from one of the following six sources: one of the stores ST0, the random data highway RH, one of the tape or card readers TP0 or one of the accumulators. Which of these sources is used is defined by one of signals APOR generated by the control unit in phase 2.

The arithmetic processer AP is a forty-eight bit adder of similar configuration to the index processor. The operations of the processer AP are controlled by the phase 2 logic generated signals A/S (add or subtract) and signals APM according to the required operation as dictated by the selected micro-instructions (7/1, 7/2 or 7/3). The arithmetic processer AP resultant output is fed to a resultant switch APRS which is used to direct the resultant to the required destination according to the selected micro-instruction. The resultant switch and the arithmetic processer also provide the signals for use in the control unit phase 3 jump test operations (signals $APA \neq 0$, $APB \neq 0$, $AP1 = 1$, $AP24 = 1$, $AP48 = 1$ and the arithmetic processer provides the end of operation signal (carry-complete) on lead CCA. The resultant switch APRS is capable of directing the resultant to the index registers (signals IRI), the index processer (signals IPI), the order register (ORI), the stores (STI) and the random (RHI) or clock (CHI) highways together with any of the three accumulators. The connection to the accumulators may be direct or with inherent right or left shifts and employing over-write techniques. The shift connections are made by simply "slipping" the wiring from the resultant switch to the accumulator input gates and the micro-instruction selected shift is effected by activating one of signals ASC. Merging and subsection amendment is also provided on each accumulator.

The various operations of the arithmetic unit have been and will be referred to throughout other sections of this description.

A description of the logic required to perform the control unit functions will now be given with reference to FIGS. 8–17. These figures should be arranged as shown in FIG. 18. In the following description certain shorthand expressions are used and in these expressions normal logic significance is given to toggles and signals while in the case of gates, the following appertains.

Underlined gate references indicate that the associated gates are closed giving a negative output while those not underlined are considered to be open giving a positive output. Thus in the case of expression 13, for example, $$G1S - \underline{G9}.\overline{10/1}.\overline{4/2}.\overline{4/3}.\overline{4/4}.\overline{8/5} - GLO - TP2$$

this indicates that gate GLO is opened giving a positive output to set toggle TP2 when gate G1S is opened causing gate G9 to close and when signals 10/1, 4/2, 4/3, 4/4 and 8/5 are all absent. It should be noted that the expressions are simply indicative of signal paths and are not Boolean expressions. All toggles shown in FIGS. 8–17 are of the cross-coupled type set by a positive input edge. Associated with each side of each toggle is a positive OR input gate. The actual circuit diagrams of the elements used in FIGS. 8–17 are shown in FIG. 7. FIG. 7A shows a NAND gate which produces a positive (or 0 volt) output indicating a "0" when all inputs are "1" and a negative or "1" state output when at least one input is "0." FIG. 7B shows a toggle arrangement which when it is set provides a negative or "1" state output from its set or 1 side and a positive or "0" state output from its reset or 0 side. When the toggle arrangement is reset, it provides a positive or "0" state output from its set or 1 side and a negative or "1" state output from its reset or 0 side. In order to clarify the numbered expressions further, a toggle reference will be following either by (a) or (b) indicating that the output concerned is from the set or reset side respectively. Thus the reference TP1(b) indicates a positive output from the reset side of toggle TP1, while reference $\overline{TP1(a)}$ indicates a negative output from the set side of toggle TP1. FIG. 7C shows a delay line DL which is provided with impedance matching and amplification circuits at each end. No phase reversal is experienced over the delay circuit and in the following description a negative output from the delay device is considered as a "1" state output while a positive output is considered as a "0" state output and is indicated in the expressions by a bar under the delay device reference.

V. PHASE CONTROL LOGIC

As mentioned above with reference to FIG. 4, the start of phase 1 may be initiated by the end of phase 3. Phase 1 may also be started by a repeat micro-order condition from phase 3 or by a start-up pulse from the start-up key SK shown in FIG. 8.

A *TP1 set, start phase 1*.—The setting of toggle TP1 (FIG. 8) allows the generation of the phase 1 control signal P1C.

$$TP1b - \underline{GP1C} - P1C \tag{1}$$

This P1C signal is used to close the gates G1/1–G1/7 and G2/1–G2/7 producing signals to gate the outputs of the index register, order register, micro-jump register or any external input into the operand and operator input gates respectively of the index processer.

The "1" state output from gate GP1C is delayed by delay line DA1 to produce the "add/subtract control" signal A/SC to the index processer. This delay is introduced to allow the index processer input gates time to settle down before the ADD or SUBTRACT signal is generated to initiate the operation of the index processer.

The control unit now waits for the completion of the operation of the index processer. This is indicated by a negative signal on lead CCI and this signal is derived from the combination of the SC signals in unit CC in our copending application No. 18,156, 1964.

$$TP1a.CCI - G1 - \underline{G2} \tag{2}$$

The "1" state output from gate G2 is used to produce a "gate opening" signal GOS for gates G3/2–G3/7 and G4/2–4/7 which control the transfer of the output of the index processer to its required destination specified by the micro-instruction.

The index processer resultant transfer gates are open for a duration defined by either delay line DP1 or, if a store is used (i.e. micro-instructions 4/2, 4/3 or 4/4), the operation complete signal from the relevant store.

A(1) *Store not used in phase 1*.—In this case the positive output from gate G1 is delayed by delay line DP1. The output from this delay line causes the generation of the gate closing signal GCS and the resetting of toggle TP1 (indicating the end of phase 1)

$$G1 - \underline{DP1}.\underline{G11} - \underline{G3} - G4 - GCS \tag{3}$$
$$- GRP1 \tag{4}$$
$$- \underline{G3}.\underline{G5} - G1R - \overline{TP1} \tag{5}$$

The output from gate GRP1 is used to set toggle TP2 and thus start the phase 2 operations.

A(2) *Store used in phase 1*.—In this case one of the store control micro-instructions 4/2–4 will be present and thus one of the store control leads, SR, SR/R and SSA which indicate "store read," "store read/rewrite," and "store set address" respectively, will be in the "0" state. The three store control leads are taken to gate GSU which will be closed by the "0" condition. The closure of this gate causes the resetting of the store finish toggle TSF.

$$SR + SR/R + SSA - \underline{GSU}.TP1a - G6 - \overline{TSF} \tag{6}$$

The reset condition of the store finish toggle is used to "inhibit" the output of the delay line DP1 to prevent the reset of toggle TP1, the opening of the resultant control gates and the start of phase 2 (see expressions 3, 4 and 5 above) before the completion of the required phase 1 store operation.

$$\overline{TSF(c)}.\overline{F11} - G7 - G5 - \underline{G4,G1R} \text{ and } \underline{GRP1} \tag{7}$$

At the same time as the store finish toggle is reset, the store selection toggle TSS is either set or reset according to the state of the output bits 13 of the index processer. As mentioned previously bits 11 and 12 of the order word are used as store selection bits, bit 11 for address 1 and bit 12 for addresses 2 and 3. Thus toggle TSS is set when gate GSSL is closed and a one is present at the bit 13 output of the index processer. Thus the set condition of toggle TSS indicates store 2 is to be used to find the order specified address while the reset condition of toggle TSS indicates that store 1 is to be used.

When the required store operation is complete this is indicated to the control unit as either a "read finish" signal RF or an "address set-up" signal ASU and the store finish toggle TSF is set. Both sets of signals for each of the two stores ST1 and ST2 are shown. Taking the "set address" function first, before the store operation is complete, gate GSS is held closed as both ASU leads are in the "1" state.

$$SSA.\overline{ASU}(ST1).\overline{ASU}(ST2) - GSF3 - \underline{GSS} \qquad (8)$$

At this time both gates GSF1 and GSF2 will be closed by the "0" state output from gate G8 due to the non-selected (or "1" state) condition of both SR and SR/R. When the "0" state "address set-up" condition is generated, the selected store finish toggle TSF is set as follows.

$$ASU(ST1) + ASU(ST2) - \underline{GSF3.GS} - \overline{GSS} - TSF \qquad (9)$$

It is now assumed that a "store read" or "store read/rewrite" operation is required. When the store is idle the "read finish" leads RF are in the "0" state; when the store is taken into use these leads are switched to the "1" state and when the read process is complete these leads return to the "0" state. This is explained in our co-pending application No. 38,767, 1963. It is, therefore, necessary to detect the positive-going edge of the signal on the relevant RF lead to define the read finish signal.

When the store is taken into use gate GSS is held closed by either gate GSF1 or GSF2 (following expression for GSF1 only).

$$SR + SR/R - \underline{G8.\overline{RF}}(ST1) - GSF1 - \underline{GSS} \qquad (10)$$

Gate GSF2 will be held closed by the "0" state signal on RF (ST2).

When the read process is complete, the signal on lead RF (ST1) changes to the "0" state closing gate GSF1 and thus allowing toggle TSF to be set.

When toggle TSF is set the inhibit condition for the reset of toggle TP1 is removed and toggle TP2 is, therefore, set to start phase 2.

A(3) *Phase 1 idle.*—In this case micro instructions 1/8, 2/8, 3/8 and 4/8 will be present at the output of the micro-programme store. Toggle TP1 is reset when the output of gate G1S or GS becomes negative.

$$1/8.2/8:3/8.4/8.\underline{G1S} - G11 - \underline{G3.G5} - G1R - \overline{TP1} \qquad (11)$$

From the above it can be seen that, if phase 1 is idle on a start-up operation, phase 2 will commence as soon as gate GS is closed by the delayed start up output from delay DST. On start phase 1 after phase 3, phase 1 will be started when toggle TMOR (FIG. 13) is set.

A(4) *Phase 1 fault.*—The phase 1 complete indication is inhibited by a micro-instruction fault condition as a "0" condition is experienced under fault conditions on lead FI1.

$$FI1 - \underline{G7} - G5 \qquad (12)$$

The "0" state output from gate G5 has the same results as that shown above in expression 7.

B *Start phase 2.*—Toggle TP2 is set to start phase 2 by the resetting of toggle TP1 or, under certain conditions, by the output of gate G1S in parallel with toggle TP1. This latter path for the setting of toggle TP2 allows phase 1 and phase 2 to be run in parallel.

B(1) *Phase 1 and phase 2 run in parallel.*—Toggle TP2 is set by the output from gate G1S when no store operations are required in phase 1 (i.e., micro-instructions 4/2, 4/3 and 4/4 are not selected). The store signals inhibit the setting of this toggle preventing any phase 2 process requiring the store until the store is ready. The overlap facility is achieved as follows.

$$G1S - \underline{G9.\overline{10}/1.\overline{4}/2.\overline{4}/3.\overline{4}/4.\overline{8}/5} - GLO - TP2 \qquad (13)$$

The inclusion of the 10/1 and 8/5 unselected micro-instructions in the above expression prevents phase 1 and 2 overlap taking place on these two micro-instructions as they are concerned with transfers of the output of the arithmetic processor, to the order and index registers respectively which may, of course, be used for the current phase 1 operations and cannot be modified until phase 1 is complete.

B(2) *Toggle TP2 set (no peripheral equipment to be used).*—The set output from toggle TP2 drives the add/subtract delay line DA2 assuming that micro-instructions 6/3 (any tape output to the arithmetic processor operand input) is not selected. The output from delay line DA2 opens gate G11. Gate G11 is inhibited by a "0" condition on lead HWI in any highway is to be used to provide the arithmetic processor input. The output from gate G11 causes the generation of the add or subtract signal to the arithmetic processer as follows.

$$G11 - \underline{G12.\overline{7}/2.\overline{7}/3.\overline{AI}} - G2A - A \quad (\text{Add}) \qquad (14)$$

$$-\underline{G12.GIS} - G2S - S \quad (\text{Subtract}) \qquad (15)$$

The add signal may be inhibited by a "0" condition on lead AI from the arithmetic processor. The subtract signal is inhibited when micro-instruction 7/2 and 7/3 are absent (i.e., when the subtract micro-instructions are not specified) and when the inhibit add signal from the arithmetic processor is absent on lead AI. In the above cases gate GIS is opened thus inhibiting gate G2S.

The control unit now waits for the completion of the operation of the arithmetic processor. The completion of this operation is indicated by a "1" state signal on lead CCA and this signal is derived from the combination of the SC signals in unit CC in our copending application No. 18,156, 1964 as for the index processor mentioned above. The sensing of the carry completion signal allows the generation of the signals which are used to control the transfer of the output of the arithmetic processor to the micro-instruction defined destinations. The operation of this logic will be described later.

B(3) *Toggle TP2 set (highway required to provide input to AP).*—In this case either of the micro-instructions 5/2 or 6/2 will be selected and as a consequence a "1" state signal is present on lead MIH to gate G13 (FIG. 14) in the "highway synchronisation" circuit which includes toggle THC. The opening of this gate causes the closure of gate G14 and the setting of toggle THC at the trailing edge of the T17 pulse which is negative-going. The inclusion of the timing pulse T17 ensures synchronisation of the control unit with the synchronous highway system and the production of this and other highway control signals will be understood when FIGS. 20-22 are described.

The setting of toggle THC causes the closure of gate G12 allowing the generation of the add or subtract signal as shown in expressions 14 and 15 above.

B(4) *Toggle TP2 set (highway required for arithmetic process resultant).*—In this case either of the micro-instructions 7/5 or 7/6 will be selected and the "highway synchronisation" circuit is again used, entry being via gate G15 from gate G16 to set toggle THC on the trailing edge of the T5 pulse to this gate, the inclusion of the timing pulse T5 again ensuring synchronisation of the control unit and the synchronous highway system. The setting of toggle THC causes the closure of gate G12 allowing the generation of the add or subtract signal as shown in expressions 14 and 15 above.

B(5) *Toggle TP2 set (any tape required for AP input).*—In this case the "set" output from toggle TP2 is inhibited by the opened gate G19 which will be opened as toggle TP2A is reset and micro-instruction 6/3 is selected. The auxiliary toggle TP2A is used to control the generation of the add/subtract signals and this toggle is set when the card reader (CRCR) or tape reader (TRCR) character ready signal is produced.

$$\left.\begin{array}{l}6/3.TRCR - G17\\6/3.CRCR - G18\end{array}\right\} TP2A \qquad (16)$$

The reset output of toggle TP2A, which will be in the "0" state since this toggle is set, closes gate G19. The "1" state output from gate G19 drives the add/substract delay line DA2 in the same manner as outlined in section B(1a).

B(6) *Carry complete.*—After the generation of the add or subtract signals the control unit waits for the carry complete signal (a "1" state signal on lead CCA). The carry complete signal causes the opening of the resultant transfer micro-instruction control gates G7/5–7/7, G8/1–8/7, 9/1–9/7 and 10/1–10/2 by the production of signal RCS.

$$CCA.\overline{G21}-G20-\overline{GRCS}-RCS \quad (17)$$

Signal RCS is produced for a duration defined by delay line DRP2 on all phase 2 operations not using highway, tape or store (write) equipment. In the latter case signal RCS is extended until these equipments are ready. The end of the RCS signal in the first case is controlled by part of the end of phase 2 logic which eventually causes the reset of toggle TP2 and toggle TPA2 if this toggle had been set (see expression 16 above).

$$CCA.TP2(a)-G22-DRP2-\overline{G23A}.\overline{TP2}-$$
$$G21-\overline{G20}.\overline{TP2}-GRCS-\overline{RCS} \quad (18)$$

The "0" state output from gate G21 causes the eventual reset of toggles TP2 and TP2A as follows:

$$G21-\overline{G2R}-G2R1-\overline{TP2}$$
$$-\overline{G2R}.6/3-G23-G2RA-\overline{TP2A}$$

When the resultant of the phase 2 arithmetic process is to be transferred to store, highway or tape the reset of the two toggles TP2 and TP2A is inhibited at gate G21 by the output of gate G24.

This gate is opened when the highway or store to highway or tape processes are required and is closed only when these various equipments are synchronised with the control unit.

B(6a) *Store "write" operation required.*—In this case micro-instruction 9/1 will be selected making the termination of the RCS signal dependent upon the "write finish" signal WF from the selected store. The write finish signal lead WF is normally at a "1" condition when the write facility is not being used. As soon as the write facility is required, the write finish signal lead assumes a "0" condition which persists until the write operation is complete, at which time the write finish signal lead returns to the "1" state. Thus the logic is required to operate the "0" to "1" state going edge of the write finish signal.

The termination of the RCS signal is inhibited by the closure of gate GSW (FIG. 9) as follows.

$$\left.\begin{array}{l}9/1-\overline{GSW}\\WF(\overline{ST1})+WF(\overline{ST2})\\-\overline{GSF4}\end{array}\right\}-G24-\overline{GRCS}-RCS \quad (21)$$

When the store write operation is complete gate GSF4 is opened causing the removal of the inhibit on toggle TP2 reset logic and the termination of the RCS signal.

$$GSF4-\overline{G24}.\overline{G23}-G21-\overline{G2R}-G2R1-\overline{TP2} \quad (22)$$
$$-G21-\overline{G20}.\overline{G24}-GRCS-\overline{RCS} \quad (23)$$

B(6b) *Highway required to receive resultant.*—In this case one of micro-instructions 7/5 or 7/6 will be selected and gate G16 will be closed allowing the setting of the highway synchronisation toggle as shown in section B(3) above. The closed condition of gate G16 makes gate G25 dependent upon the highway timing pulse T20 as signal TSE from the highway control logic FIGS. 20–22, to be described later, is in the "1" state allowing gate G24 to close and thereby ending the generation of the RC5 signal as shown in expressions 22 and 23 above.

B(6c) *Use of store and read out to highway or tape.*—When one of micro-instructions 7/5, 7/6 or 7/7 is selected with micro-instruction 9/1, the output of the arithmetic processer is written into the store and fed to one of the highways or the tape, and in this case the normal "write finish" signal must be prevented from ending the RCS signal and phase 2. In these cases one of gates G26–G28 are opened inhibiting gates GSW and GSF4 and making the end of signal RCS dependent upon gate G25 for the highway transfers and gate G30 for the tape transfer. The tape and card punch equipments are provided with buffer stores and signals TR or CR are switched to the "0" state when the relevant buffer has been set up. Either of these signals closes gate G29 allowing gate G30 to open.

B(7) *End of phase 2.*—The end of phase 2 is indicated by the resetting of toggle TP2, and toggle TP2A if it has been used. The output from gate G22 which is used to reset toggles TP2 and TP2A, if phase 2 is not idle, is also used to reset toggle THC if this toggle has been set.

The reset condition of toggle TP2 is used to start phase 3, if phase 2 has not been idle and if phase 2 is idle the output of gate G12 is used. Toggle TP2 is reset immediately if phase 2 is idle by gate G12.

$$5/8.6/8.7/8.8/8.9/8.TP2(a)-G12-\overline{TP2} \quad (24)$$

C *Start phase 3.*—Toggle TP3 is set to start phase 3 by the opening of gate G3S.

$$\overline{TP1}(b).\overline{G21}-G3S-TP3 \quad (25)$$

This toggle may also be set to run phase 2 and phase 3 in parallel when gate G31 is opened. This gate is opened if none of the jump control micro-instructions in group 10 and 11, which specify the use of the arithmetic processer output bits to define the jump, are selected and when toggle TP1 is reset (indicating the end of phase 1) and toggle TP2 is set (indicating the start of phase 2).

$$10/8+10/7+10/3+10/2-\overline{G32} \quad (26)$$
$$\overline{11/3}-\overline{G33} \quad (27)$$
$$\overline{11/7}-\overline{G34} \quad (28)$$
$$\overline{G32}.\overline{G33}.\overline{G34}.\overline{TP1}(b).TP2(a)-G31-TP3 \quad (29)$$

From the above expressions it can be seen that phase overlap between phase 2 and phase 3 may not be performed when any of micro-instructions 10/1, 10/4, 10/5, 10/6, 11/3, or 11/7 are selected. The term TP1(b) is also included in both expressions 25 and 29 for the setting of toggle TP3 showing the phase 3 may not be started until phase 1 is complete. This provision is required as phase 1 is used for indexing processes and phase 3 is used to modify data held in the indexing equipment.

When toggle TP3 is set its "1" state output is applied to delay line DP3 which after a suitable delay produces a signal DP3S which is used to control the generation of the selection of the next micro or main order according to the results of the jump tests performed by toggles TJ1–8 in accordance with the jump conditions specified by the selected micro-instructions in groups 10 and 11.

C1 *No jump specified.*—In this case, gate GNJ (FIG. 15) will be opened by the "1" state signal from delay line DP3.

$$10/1+10/2+10/7+10/8-\overline{G10I} \quad (30)$$
$$11/1+11/2+11/8-\overline{G11I} \quad (31)$$
$$DP3S.\overline{G10I}.\overline{G11I}-GNJ \quad (32)$$

The group ten and eleven micro-instructions used in the above expression are not concerned with jump tests and, therefore, the presence of one of these micro-instructions in each group allows the opening of the "no-jump designated" gate GNJ. The opening of this gate controls the production on the "select next main or micro-order" signals in accordance with the selected group 12 micro-instructions.

C1(a) *Micro-instruction 12/1 specified.*—In this case gate G12/1C will be opened (this gate is designated "C" only for ease of drawing presentation and is fed by micro-instruction 12/1) by the "1" state output from gate G35 and a signal on lead SNMO is generated.

$$GNJ - \underline{G35}.12/1 - G12/1C - SNMO \quad (33)$$

With reference to the table of micro-instructions previously shown it will be appreciated that a group 12/1 micro-instruction selected with no jump specified causes a selection of the next main order to be made. The control unit is required in this case to cause the contents of the current programme order register, bits 1–16 to be transferred to the operand input of the index processer (micro-instruction 1/1) and +1 to be presented to the operator input of the index processer. The output from gate G12/1C via lead SNMO is used to provide an "0" state output at the output of gate G1/1, effectively causing the generation of micro-instruction 1/1, and to close gate G36. The "0" state signal on lead SNMO also causes the forced generation of micro-instruction 2/7 via gates G37 and G38.

The forced generation of micro-instructions 1/1 and 2/7 causes one to be added in the index processer to the contents of the current programme order register, bits 1–16, which is used to store the current main order address location number. The index processer add signal AS is generated by gate GA3 which is opened by the output from delay line DA3 if there is no fault detected in the phase 3 micro-instruction.

When the addition process is complete, a "carry complete" signal CCI from the index processer will be experienced allowing the "forced" generation of micro-instructions 3/2 and 4/3. This causes a read/rewrite operation to take place at the store address specified by the output of the index processer (i.e., current main order address+1).

$$CCI.TP3(a) - G39 - \underline{G40}.\underline{G36} - G42 - SR/R \quad (34)$$

The "1" state output of gate G40 is inhibited by gate G43 if the phase 2 operation for the current micro-order entails a store write operation.

$$6/1 + 9/1 - \underline{G44}.TP2(a) - G43 - \underline{G42} \quad (35)$$

This inhibit condition will persist until the phase 2 operation is complete, indicated by the reset of toggle TP2, when gate G43 is closed.

The generation of the SR/R (store read/rewrite signal) causes the addressing of the relevant store, defined by the value of bit 13 of the index processer output, at the store location defined by the index processer. Signal SR/R also causes the store selection toggle TSS to set when store ST1 is required (index processer bit 13 "1") and reset when the store ST2 is required (index processer bit 13 "0") as well as resetting the store finish toggle TSF (FIG. 8) in the phase 1 logic as shown in section A(2) expression 6.

The reset condition of toggle TSF is used to open gate G45 in the phase 3 logic which then effectively takes over from the phase 3 control toggle TP3 ensuring that the control signals ST1R and ST2R are still inhibited. These signals are used later to open the required one of the order register input gates which are connected directly to the store output.

When the read process of the store read/rewrite process is complete indicated by signal RF, toggle TSF will be set in the manner shown in expression 10. The setting of this toggle causes the closure of gate G45. The "1" state output so produced from gate G45 is used to open the required gate which controls the order register input gates together with the "forced" micro-instruction 3/2 control gate GF3/2 at the end of the delay produced by delay line DMR2.

$$\underline{G45}.\underline{GMR}.\overline{TSS(b)} - G46 - ST1R \quad (36)$$

$$\underline{GMR}.\underline{G45}.TSS(a) - G47 - ST2R \quad (37)$$

$$G45.GMR - GF3/2 - NMO \quad (38)$$

Signal NMO causes a "forced" 3/2 micro-instruction to be generated allowing the output of the index processer to be transferred to the current programme order register, bits 1–16.

At this stage the processes carried out in phase 3 are to transfer the contents of the current main order register (current programme order register, bits 1–16) to the index processer (forced micro-instruction 2/7 from gate G38), address the store at the index processer output store location (forced micro-instruction 4/3 from gate G42), read the output of the store into the order register (signals ST1R and ST2R) and to transfer the output of the index processer to the current main order register (forced micro-instruction 3/2 signal NMO). Signals NMO, ST1R or ST2R are present for a period defined by delay line DMR.

When delay line DMR delivers the delayed "1" state output from gate G45, gates G46, G47 and GF3/2 are all closed.

$$DMR.FI3.\overline{TP2}(b) - GMR - \underline{G46}\overline{ST1R} \quad (39)$$
$$-\underline{G47} - \overline{ST2R} \quad (40)$$
$$-\underline{GF3/2} - \overline{NMO} \quad (41)$$

The "0" state output from the carry complete gate G39 (see expression 34) is also applied to gate G48, however, gate G60 will be open at this time thus inhibiting the action of the delay line DCC. Gate G50 will therefore be closed.

From the above expressions it can be seen that the output from delay line DMR is applied to a three input gate GMR which includes the terms FI3 and $\overline{TP2}$. Thus this gate will only be opened when phase 2 is complete and no fault indication is produced by the linear fault detectors associated with micro-instruction groups 10, 11 and 12.

The delayed "1" state output from DMR also closes gate G49 allowing the opening of gate G52 as gate G51 is held closed by gate G60, the generation of the M unit strobe (signal MS), the open M unit selector gates signal OMSG in the micro-programme unit, the reset of the phase 3 toggle, the reset of the micro-instruction toggles (signal RMIT) and the start of phase 1 of the newly selected main order.

$$\underline{G51}.\underline{G49}.\underline{DST} - G52 - TMOR \quad (42)$$
$$-\overline{TP3} \quad (43)$$
$$-\underline{G53} - RMIT \quad (44)$$
$$TMOR(a) - G54 - G55 - OMSG \quad (45)$$
$$-DMOR - \underline{G56} - MS \quad (46)$$
$$-GOR - \overline{TMOR} \quad (47)$$
$$DMOR - P1S - G57 - DSP1 - G1S - TP1 \quad (48)$$

The use of delay line DSP1 ensures that the micro-instruction toggles in the micro-programme unit will have settled down before phase 1 is started and the use of delay line DMOR ensures that the strobe pulse MS for the micro-programme unit occurs after the micro-programme unit selector gates are open (opened by signal OMSG).

The reset of toggle TP3 ends the phase 3 operation and the setting of toggle TP1 starts the phase 1 operation of the new main programme order.

C1(b) *Micro-instruction 12/2 specified*.—In this case gate G12/2C will be opened (this gate is designated C only in the drawing similar to gate G12/1C already described) by the "1" state output from gate G35 (due to the opening of the no jump specified gate GNJ) and a signal is generated on lead SO.

$$GNJ - \underline{G35}.12/2 - G12/2C - SO \quad (49)$$

With reference to the table of micro-instructions previously shown, it will be appreciated that a group 12/2 micro-instruction selected with no jump specified causes a selection of the next micro-order in the micro-programme specified by the current main order. The control unit is required in this case simply to add one to the M address in the order register bits 1–12. This operation is performed by generating forced micro-instructions 1/6, 2/7 and 4/7.

Forced micro-instruction 1/6 is generated directly by signal SO and 2/7 is generated via gates G58 and G59.

The "0" state signal SO also closes gate G60 allowing the "0" state output from the carry complete gate G39, produced when the M address +1 operation is complete, to cause the generation of a forced micro-instruction 4/7 via signal MOT to transfer the output of the index processor (M address +1) to the order register bits 1–12 to form the next M-address.

$$G39 - \overline{G48.G50} - \overline{GMOT} - MOT \quad (50)$$
$$\overline{G51} - \overline{G52} \quad (51)$$

Signal MOT will exist for a duration defined by the delay line DCC.

$$\overline{DCC}.F13.\overline{TP2}(b) - G50 - \overline{GMOT} - \overline{MOT} \quad (52)$$

The opening of gate G50 also allows the closing of gate G51 and hence the opening of gate G52 and the setting of toggle TMOR as shown in expression 42 above. The operation of the reset of the logic of phase 3 is identical with that shown in section C1(a) expressions 43–48.

C1(c) *Micro-instruction 12/3 specified*.—In this case gate G12/3C will be opened (this gate is designated C only in the drawings as were G12/2C) by the "0" state output from gate GNJ and a signal is generated on lead M–J.

$$GNJ - \overline{G35}.12/3 - G12/3C - M-J \quad (53)$$

With reference to the table of micro-instruction shown previously it will be seen that a group 12/3 micro-instruction selected with no jump specified causes a micro-jump to the M address held in the micro-jump register to take place. In practice this M address may be the address of the micro-order required to stop the computer. The micro-instruction 12/3, when no jump is specified, may be used as an optional stop micro-instruction. The micro-jump is performed simply by transferring the micro-jump register contents to the order register M-address bits 1–8 via the index processor. This is achieved by generating a forced 1/5 micro-instruction (directly by signal M–J) and a forced 4/7 micro-instruction in the same manner as detailed above for the selection of the next micro-order. Gate G60 is closed by signal M–J not signal SO.

C2 *Jump specified and fulfilled*.—In this case one or more of the eight jump toggles will be set as the micro-instruction jump test specified by micro-instruction groups 10 and 11 will have been successful. The actual tests are carried out as far as micro-instructions 10/3, 11/5 and 11/6 are concerned in phase 1 under the control of the gate opening signal GOS and the gate closing signal GCS at the time the output of the index processor is transferred. Micro-instructions 10/4, 10/5, 10/6, 11/3 and 11/7 all deal with tests on the output of the arithmetic processor and are carried out under the control of signal RCS at the time the output of the arithmetic processor is transfered, the setting of any of toggles TJ1–4 indicating a fulfilled jump condition, causes the opening of the jump fulfilled gate GFJ.

$$\left.\begin{array}{l} TJ1(a) - G61 \\ TJ2(b) - \\ TJ3(a) - G62 \\ TJ4(a) - G63 \end{array}\right\} - \overline{G64} - G65 - \overline{GT3} - GFJ \quad (54)$$

The setting of any of toggles TJ5–TJ8, indicating a fulfilled jump condition, also causes the opening of the jump fulfilled gate GFJ, together with the setting of the overflow/size comparison toggle if micro-instruction 11/4 is selected. The latter jump fulfilled case opens gate G74.

$$\left.\begin{array}{l} TJ5(a) - G66 \\ TJ6(a) - G67 \\ TJ7(a) - G68 \\ TJ8(a) - G69 \end{array}\right\} - \overline{G70} - G71 - \overline{GT8} - GFJ \quad (55)$$

The opening of the jump fulfilled gate GFJ controls the selection of the next main or micro order according to the selected group 12 micro-instruction.

C2(a) *Main order jump to OR13–24*.—This condition will be realised when a fulfilled jump is experienced and a group 12/1 micro-instruction or a group 12/5 micro-instruction is selected. Either gate G12/1A or gate G12/5A will be opened by the jump fulfilled gate GFJ via gate GF and the signal MJ13–24 generated. This signal directly generates a forced micro-instruction 1/2 which causes the address held in the order register, bits 13–24, together with the store selection bit 11 to be transferred to the index processor. Signal MJ13–24 also closes gate G36 causing the same effects as shown in expression 34. The rest of the operation of phase 3 is the same as that detailed above in section C1(a) from expression 34 onwards except that no forced 2/7 micro-instruction is generated and the forced micro-instruction 1/2 is generated instead of a forced 1/1 instruction.

C2(b) *Micro-jump to MJR 1–8*.—This condition will be realised when a fulfilled jump is experienced and a group 12/2 or a 12/7 micro-instruction is selected. The operation of the control unit logic is identical to that described in section C1(c) above signal M–J being generated by the opening of either gate G12/2 or gate G12/7A.

C2(c) *Repeat Micro-order*.—This condition will be realised when a fulfilled jump is experienced and a group 12/3 or 12/4 micro-instruction is selected. Either gate G12/3A or G12/4A will be opened and the signal RMO will be generated by gate GFJ. Signal RMO causes the reset of toggle TP3 to end phase 3 and the set of toggle TP1 to start phase 1 without modification to the order register.

$$RMO - \overline{G72} - \overline{G73} - \overline{TP3} \quad (56)$$
$$-TP1 \quad (57)$$

Signal RMO also inhibits the generation of the add signal AS to the index processor by holding gate GA3 closed.

C2(d) *Step on to next micro-order*.—The sensing of a fulfilled jump and the selection of micro-instruction 12/6 causes signal SO to be generated allowing one to be added to the current M address as shown in section C1(b).

C2(e) *Select next main order*.—The sensing of a fulfilled jump and the selection of micro-instruction 12/8 causes signal SNMO to be generated allowing one to be added to the current main order number in the current main order register, bits 1–16. The operation of the control logic when the signal SNMO is generated is the same as that shown in section C1(a).

C3 *Jump specified and unfulfilled*.—In this case none of the jump toggles will be set and gate GUJ will be opened.

$$G10l + G11l - \overline{G73} \quad (58)$$

$$\left.\begin{array}{l} \overline{TJ1}(a) - G61 \\ \overline{TJ2}(b) - \\ \overline{TJ3}(a) - G62 \\ \overline{TJ4}(a) - G63 \end{array}\right\} - G64 - G65 \quad (59)$$

$$\left.\begin{array}{l} \overline{TJ5}(a) - G66 \\ \overline{TJ6}(a) - G67 \\ \overline{TJ7}(a) - G68 \\ \overline{TJ8}(a) - G69 \\ G74 - \overline{G11/4} \end{array}\right\} - G70 - \overline{G71} \quad (60)$$

$$\overline{G73}.\overline{G65}.\overline{G71}.DP3S - GUJ$$

The opening of gate GUJ allows the opening of one of eight group twelve jump unfulfilled gates designated B in the drawing. The operation of the logic has been described previously for all of the signals produced by the group 12 micro-instruction controlled gates except for that produced by gate G12/1B. The opening of this gate produces a signal MJ 25–36 and this causes a forced 1/3 micro-instruction to be generated causing the transfer of the contents of order register bits 25–36 and bit 12 to the index processor. Signal MJ 25–36 also closes gate G36 causing the transfer of the output of the index processer to the current programme order register bits 1–16 and the addressing of the store as shown for select next main order in section C1(a).

VI. ADDITIONAL CONTROL UNIT LOGIC

With reference to FIGS. 19a and 19b which should be placed side by side with FIG. 19a on the left, a description of the operation of the additional logic required to perform various arithmetic operations will now be given. The operation and the need for this additional logic will be more easily understood if it is described in conjunction with a typical micro-programme for the arithmetic operation under consideration. The additional logic is taken into use at the end of phase 1 under the control of the bit significance assigned to order register bits 25–36, as shown with reference to FIG. 2, when a selection of the 10/7 micro-instruction (select arithmetic) is made. The following sections will show typical micro-programmes for each arithmetic operation using the additional logic.

VII. M. MULTIPLICATION

A typical main order for a simple fixed point, full length arithmetic multiplication operation will be of the following form when read from the programme store into the order register.

O.R. bits 1–8—M-address of first micro-order in the micro-programme allocated in the micro-programme store.
Bits 9 and 10—Indexing bits.
Bit 11—Store selection bit for Store address A.
Bit 12—Store selection bit for Store address B.
Bits 13–24—Store Address A (the store address of the data to be used to form the multiplicand).
Bits 25–30—Iteration count.
Bits 31–33—The multiplication code (010).
Bits 34–36—All 0's.
Bits 37–48—Store Address B (The store address of the data to be used to form the multiplier).

The operation specified by the above main-order is multiply Store A by Store B and place resultant in a specified accumulator (e.g., ACC1).

The first micro-order of the micro-programme is defined by the M-address section of the order word and, for example, this may have a decimal value of 50. The micro-order word store in the micro-programme store at address location 50 is arranged to select the following micro-instructions one in each of groups 1–12.

M1 Micro-order 50

Micro-programme store output at address 50:
```
Phase 1 _____ 4883
Phase 2 _____ 81818
Phase 3 _____   882
```

M1(a) *Phase 1 operation.*—The selected micro-instructions 1/4 and 4/3 cause the Multiplier address (held in order register OR, bits 37–48) to address the relevant store using the index processer.

M1(b) *Phase 2 operation.*—The selected micro-instructions 6/1 and 8/1 cause the output of the store addressed in phase 1 (i.e., the multiplier) to be read into accumulator 1.

M1(c) *Phase 3 operation.*—The selected micro-instruction 12/2, with no jump condition specified by micro-instructions in groups 10 and 11, causes a "step on to the next micro-order" operation to take place.

M2 Micro-order 51

Micro programme store output at address 51:
```
Phase 1 _____  2883
Phase 2 _____ 81868
Phase 3 _____   882
```

M2(a) *Phase 1 operation.*—Micro-instructions 1/2 and 4/3 cause the Multiplicand address (O.R. bits 13–24) to be used to address the relevant store using the index processer.

M2(b) *Phase 2.*—Micro-instructions 6/1 and 8/6 control the transfer of the data read from the phase 1 addressed store to accumulator 2 using the arithmetic processer. At the end of this phase, therefore the multiplicand is in accumulator 2.

M2(a) *Phase 3.*—A "step on to the next micro-order" operation is performed in this phase.

M3 Micro-order 52

Micro-programme store output at address 52:
```
Phase 1 _____  3741
Phase 2 _____ 38886
Phase 3 _____   882
```

M3(a) *Phase 1.*—The selected micro-instructions 1/3, 2/7, 3/4 and 4/1 cause one to be subtracted from the iteration count in order register bits OR 25–30 using the index processer.

M3(b) *Phase 2.*—Micro-instructions 5/3 and 9/6 control the transfer of the data to be used as a multiplier to accumulator 3 from accumulator 1 using the arithmetic processer.

M3(c) *Phase 3.*—Step on to next micro-order.

M4 Micro-order 53

Micro-programme store output at address 53:
```
Phase 1 _____  8888
Phase 2 _____ 88818
Phase 3 _____   882
```

M4(a) *Phase 1.*—The selection of micro-instructions 1/8, 2/8, 3/8 and 4/8 indicates a "phase 1 idle" condition.

M4(b) *Phase 2.*—The selection of micro-instruction 8/1 only, effectively zeroises accumulator 1 as the arithmetic processer is not used in this phase and, therefore, its output must be all 0's.

M4(c) *Phase 3.*—Step on.

M5 Micro-order 54

Micro-programme store output at address 54:
```
Phase 1 _____  3741
Phase 2 _____ 35822
Phase 3 _____   753
```

M5(a) *Phase 1.*—The micro-instructions selected are the same as those produced for phase 1 for micro-order 52 causing the iteration count to be reduced by 1. At the end of this phase, indicated by the reset of toggle TP1 in FIG. 8, the additional logic shown in FIG. 19 is taken into use as micro-instruction 10/7 is selected. Toggle TM in FIG. 19A will be set, by the positive going edge from gate G81 to indicate that the arithmetic operation required is multiplication.

$$TP1(b) - \overline{G80} - G81 - G82 - TM \qquad (A1)$$

The inclusion of the order register bits 31–33, having the significance, 010 on gate G82 allows the positive going edge of the output of gate G81 to set toggle TM only. All other toggle control gates will have at least one input in the "0" state thus masking the effect of gate G81.

M5(b) *Phase 2.*—Micro-instruction 5/3 and 6/5 are selected in this phase to control the transfer of the contents of accumulators 1 and 2 to the arithmetic processer operand and operator switches respectively. However, micro-instructions 6/4, 6/5 and 6/6 are gated with an M signal in FIG. 10 and the control of the arithmetic processor operator switch by these signals is dependent upon signal M. In the multiplication operation the multiplicand is added to the partial product to form the next partial product after a right shift transfer controlled by micro-instruction 8/2, if the least significant digit of the multiplier, in accumulator 3, is a "1." If the least significant digit in accumulator 3 is "0" then the partial product only is right shifted to form the next partial product. The production of the "1" state signal M is, therefore dependent upon the value of the least significant bit of accumulator 3. Gate G83 is opened when toggle TM (multiply) is set and if the least significant digit of accumulator 3 is "0," signal $\overline{LSDA3}$ is produced thus inhibiting the generation of signal M.

Micro-instruction 9/2 causes a right shift to take place in accumulator 3 after the new partial product, formed by the partial product plus nought or the multiplicand, has been transferred with an inherent right shift to accumulator 1.

M5(c) *Phase 3*.—A test for the iteration count equal to zero is made, if it is zero the micro-programme steps on the next micro-order, if it is not equal to zero (i.e., multiplication operation is not yet complete) a repeat micro-order operation is performed.

The above micro-order 54 operations will be repeated until the iteration count reaches zero. Thus the multiplication process is performed (a) by adding the multiplicand or nought to the multiplier to form the partial product according to the value of the least significant digit value of the multiplier, (b) by left shifting the partial product and right shifting the multiplier (c) by adding the multiplicand or nought to the partial product to form a new partial product according to the value of the next least significant digit of the multiplier, repeating (b) and (c) until the iteration count reaches zero. When the iteration count reaches zero micro-order 55 is performed.

M6 *Micro-order 55*

Micro-programme store output at address 55:
| Phase | 1 | 8888 |
|---|---|---|
| Phase | 2 | 35314 |
| Phase | 3 | 876 |

M6(a) *Phase 1*.—Idle.

M6(b) *Phase 2*.—Micro-instructions 5/3 and 6/5 are again generated and, as toggle TM in FIG. 19A is still set, the effectiveness of micro-instruction 6/5 is again dependent upon the least significant digit of accumulator 3. This bit will be the sign bit of the multiplier as the iteration count was sensed to be zero at the end of the previous micro-order and the iteration count was reduced by one at the end of micro-order 54. If the multiplier is positive (i.e., L.S.D. of ACC3=0) the partial product formed in accumulator 1 forms the product of the operation, however, if the multiplier is negative (i.e., L.S.D. of ACC3=1) the multiplicand has been added in an extra time and must be subtracted from the partial product to form the actual product. This operation is performed under the control of the least significant digit of accumulator 3 and the 7/3 micro-instructions (Subtract). The result of the operation is transferred to accumulator 1, under the control of micro-instruction 8/1, and also to accumulator 2 after a left shift under the control of micro-instruction 9/4. The significance of this latter operation will be understood with reference to the following micro-order.

M6(c) *Phase 3*.—A test for the arithmetic processor, bit 48=1, is made i.e., to ascertain if the resultant of the previous operation (the multiplication process product) is negative, under the control of micro-instructions 11/7. If the product is negative the control produces a step-on to the next micro-order operation under the control of toggle TJ8 in FIG. 17. This toggle will be (a) set if the product is negative and gate G12/6A will be opened, as micro-instruction 12/6 is selected, causing a step-on (SO) operation, or (b) reset if the product is positive and gate G12/6B will be opened causing a select next main order (SNMO) operation.

M7 *Micro-order 56*

Micro-programme store output at address 56:
| Phase 1 | 8888 |
|---|---|
| Phase 2 | 48888 |
| Phase 3 | 438 |

M7(a) *Phase 1*.—Idle.

M7(b) *Phase 2*.—Micro-instruction 5/4 transfers the contents of accumulator 2 to the arithmetic processor operand input and an addition of accumulator 2+0 takes place. This operation is performed simply to allow a test for zero in accumulator 2 to take place as specified by the phase 3 micro-instructions. The purpose of micro-order 56 and the following micro-order 57 is to test to see if the product formed in accumulator 1 is one in bit 48 followed by all 0's. This will be formed when −1 is multiplied by −1. Obviously this is not the true result and a compensation must be made.

M7(c) *Phase 3*.—The test for the output of the arithmetic processer=0 is specified by micro-instructions 10/4 and 11/3. If the arithmetic processer output is equal to zero, toggles TJ2 and TJ5 in FIGS. 15A and 16A will be reset and gate G12/8B will be opened causing a step on to next micro-order operation to be performed. However, if the arithmetic processor output is not equal to zero either toggle TJ2 or TJ5 or both will be set causing gate G12/8A to open and a select next main order operation will be performed.

M8 *Micro-order 57*

Micro-programme store output at address 57:
| Phase 1 | 8888 |
|---|---|
| Phase 2 | 38218 |
| Phase 3 | 881 |

M8(a) *Phase 1*.—Idle.

M8(b) *Phase 2*.—Micro-instructions 5/3 and 7/2 cause one to be subtracted from the product formed in accumulator 1 and the result of this process to be returned to accumulator 1 (micro-instruction 8/1). This operation causes +1 to be formed which is the true product of $-1X-1$.

M8(c) *Phase 3*.—Micro-instructions 12/1 causes a select next main order operation to be performed.

Micro-order 57 ends the multiplication routine and the selection of the next main order from this and any of the micro-orders in the micro-programme routine resets the multiplication toggle TM in FIG. 19A and may, for example, cause the entry into a micro-programme routine to write the product of the multiplication operation from accumulator 1 back to store. Obviously the product in accumulator 1 may be used as an operator or operand in some other operation controlled by another micro-programme according to the programmers requirements.

VIII. D. DIVISION

A typical main order for a simple fixed point, full length arithmetic division operation will be of the following form when read from the programme store into the order register.

O.R. Bits. 1–8—M address of first micro-order of the micro-programme routine allocated to division in the micro-programme store.

Bits. 9 and 10—Indexing bits.

Bit 11—Store selection bit for store address A.

Bit 12—Store selection bit for store address B.

Bits 13–24—Store address A (the store address of the data to be used as the divisor).

Bits 25–30—Iteration count.

Bits 31–33—The division code (110).

Bits 34–36—All 0's.
Bits 37–48—Store address B (the store address of the data to be used as the dividend).

The operation specified by the above main order is to divide the data stored at store address B by the data stored at store address A. The resultant (quotient) is to be placed in some specified accumulator (e.g., accumulator 1).

The first micro-order of the micro-programme is defined by the M-address section of the order word and for example may have a decimal value of 20. The first two micro-orders in the micro-programme routine are concerned purely with getting the operands from store as shown, for micro-orders 50 and 51, in the previous section on multiplication. Thus the following description will start from micro-order 22 assuming that the store address B data is held in accumulator 1 and the store address A data is held in accumulator 2.

D1 Micro-order 22

Micro-programme store output at address 22:
```
Phase 1 ------------------------------- 8888
Phase 2 ------------------------------- 38818
Phase 3 -------------------------------   436
```

D1(a) *Phase 1 operation.*—Idle.

D1(b) *Phase 2 operation.*—Micro-instructions 5/3 and 8/1 control the transfer of the contents of accumulator 1 (the dividend) to be circulated through the arithmetic processer back to accumulator 1 allowing a test for zero to be made in accordance with the selected phase 3 micro-instructions.

D1(c) *Phase 3.*—Micro-instructions 10/4 and 11/3 cause a test for zero to be made on the output of the arithmetic processer (the dividend). If the dividend is not equal to zero either or both toggles TJ2 and TJ5 in FIGS. 15A and 16A will be set causing a fulfilled jump condition to be produced which, under control of selected micro-instruction 12/6 allows the opening of gate G12/6A and the generation of a step on to next micro-order (SO) condition. If the dividend is equal to zero both toggles TJ2 and TJ5 will remain set allowing gate G12/6B to be opened and a select next main order (SNMO) operation to be performed as the division process is redundant.

D2 Micro-order 23

Micro-programme store output at address 23:
```
Phase 1 ------------------------------- 8888
Phase 2 ------------------------------- 88886
Phase 3 -------------------------------   882
```

D2(a) *Phase 1.*—Idle.

D2(b) *Phase 2.*—The selection of micro-instruction 9/6 causes the output of the arithmetic processer to be transferred to accumulator 3. This operation ensures that the contents of accumulator 3 is zero.

D2(c) *Phase 3.*—Step on to next micro-order.

D3 Micro-order 24

Micro-programme store output at address 24:
```
Phase 1 ------------------------------- 8888
Phase 2 ------------------------------- 35883
Phase 3 -------------------------------   782
```

D3(a) *Phase 1.*—Idle. The reset condition of toggle TP1, in FIG. 8, allows the additional logic, shown in FIGS. 19A and 19B, to be taken into use as the phase 3 micro-instruction 10/7 has been selected by the present micro-order. Toggle TD, in FIG. 19A, will be set by the positive-going edge at the output of gate G81 to indicate that the arithmetic operation required is division.

$$TP1(b)-\overline{G80}-G81-G84-TD \quad (B1)$$

The inclusion of the order register bits 110 on gate G84 allows the positive going edge of the output of gate G81 to set toggle TD only. All other toggle control gates will have at least one input in the "0" state thus masking the effect of gate G81.

D3(b) *Phase 2.*—Micro-instructions 5/3 and 6/5 control respectively the transfer of the contents of accumulator 1 (the dividend) and accumulator 2 (the divisor) to the arithmetic processer operand and operator input switches. Within these switches arrangements are provided to perform certain simple logical functions with respect to the most significant digits of the input information. The most significant digits are compared and a "1" state signal OF4 is produced, for use in FIG. 19A, if these two digits are the same (i.e., both 0's or 1's).

Signal OF4 is used in FIG. 19A to cause "1" to be written into the least significant digit of accumulator 3 if the dividend and divisor most significant bits are the same and to cause "0" to be written into the least significant digit of accumulator 3 if they differ.

$$OF4.9/3.\overline{8/3}.TD(a)-G85-\underline{G86}-G87-LSA3 \text{ "1"} \quad (B2)$$

Access to gate G86 is achieved as gate GDS is held closed by the inverted output from toggle TD.

$$\overline{OF4}.-\underline{G85}-G86-LSA3 \text{ "0"} \quad (B3)$$

Leads LSA3 "1" and LSA3 "0" are connected to the input gates for the toggle allocated to the least significant digit of accumulator 3 and a positive-going signal produced by micro instruction 9/3 (left shift accumulator 3) allows the setting or resetting of this toggle accordingly. Thus if the digits to be compared are the same, lead LSA3 "0" will be negative allowing the least significant digit toggle of accumulator 3 to be reset.

The output from gate G85, when this gate is opened, also sets toggle TFS, $$G85-G89.TP2(a)-G90-TFS \quad (B4)$$

Figure 13:
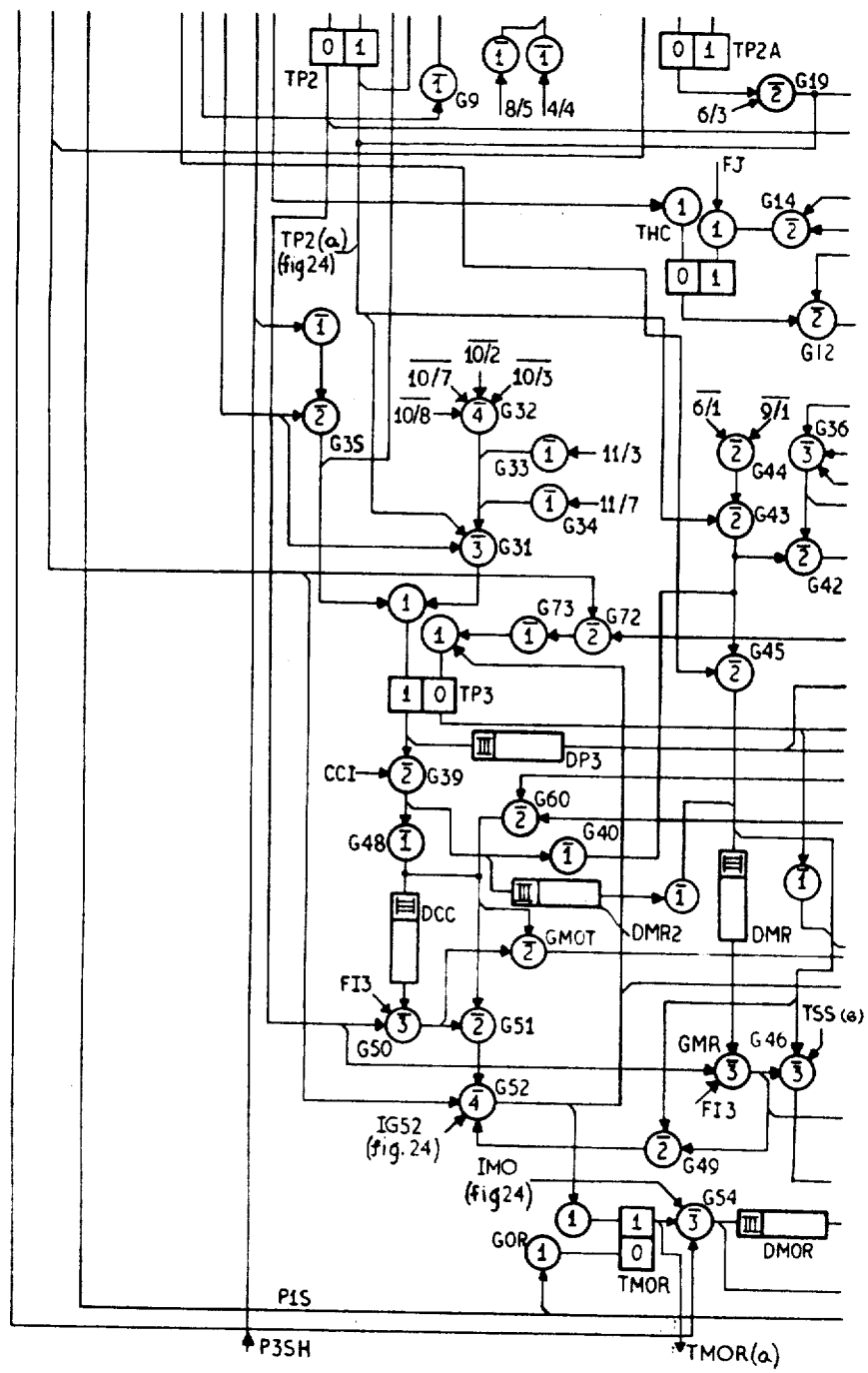

When toggle TFS is set, a "0" signal is produced on lead AI which inhibits the generation of the "add" signal at gate G2A in FIG. 14 and "forces" the production of a subtract signal by opening gate GIS in FIG. 13.

Thus toggle TFS will be set at the end of this phase if the most significant digits of the divisor and the dividend are the same. This condition is used in the next but one micro-order.

The arithmetic processer will perform, in the present phase, an addition between the dividend and the divisor, but this is of no importance as the output of the processer is not used.

Micro-instruction 9/3 causes a left shift operation to take place in accumulator 3.

D3(c) *Phase 3.*—Step on. Note micro-instruction 10/7 is the "select arithmetic" micro-instruction used to gain access to the additional logic shown in FIG. 19A.

D4 Micro-order 25

Micro-programme store output at address 25:
```
Phase 1------------------------------- 8888
Phase 2------------------------------- 38838
Phase 3-------------------------------   882
```

D4(a) *Phase 1.*—Idle.

D4(b) *Phase 2.*—Micro-instructions 5/3 and 8/3 cause a one bit left shift operation to take place in accumulator 1, using the arithmetic processer. This operation shifts the divisor up one place in accumulator 1.

D4(c) *Phase 3.*—Step on to next micro-order.

D5 Micro-order 26

Micro-programme store output at address 26:
```
Phase 1------------------------------- 3741
Phase 2------------------------------- 35833
Phase 3-------------------------------   853
```

D5(a) *Phase 1.*—The selected micro-instructions for this phase reduce, by one, the iteration count in order register OR25–30 using the index processer.

D5(b) *Phase 2.*—Toggle TD in FIG. 19A is still set as this toggle is only reset by a select next main order SNMO signal and toggle TFS is also set, as given in expression B4, if the signs of the dividend and divisor were the same from micro-order 24. The selection of micro-instructions 5/3 and 6/5 transfers the dividend and the divisor from accumulators 1 and 2 respectively to the inputs of the arithmetic processer. Gate GIS in FIG. 13 will be opened, if toggle TFS was reset in the micro-order 24 phase 2 causing an addition to take place.

Micro-instruction 8/3 controls the transfer of the resultant of the arithmetic operation (ACC1±ACC2) with an inherent one bit left shift to overwrite into accumulator 1.

The additional logic is again employed to control the generation of the next bit of the quotient. A comparison this time must be made between the most significant bit of the divisor in accumulator 2 and the most significant bit of the result of the addition or subtraction which appears in accumulator 1. Signal OF5, and its inverse $\overline{OF5}$, are the signals used to indicate the relationship between these two bits. Signal OF5, when "1," indicates that the two bits under consideration are the same while signal $\overline{OF5}$, when "1," indicates that the two bits are different.

The operations required according to the relationship between the most significant digits are: (i) digits the same, force "0" into the least significant digit of accumulator 3 and set subtract for the next micro-order; (ii) digits differ, force "1" into the least significant digit of accumulator 3 and set add for the next micro-order. The following expressions show the functions performed by the logic shown in FIG. 19A to satisfy the required operations.

$$OF5.8/3.9/3.TD(a) - G91 - G89.\overline{TP2}(a) - G90 - TFS \quad (B5)$$

The L.S.D. of ACC3 will be "1" as gate G86 is held opened thus lead LSA3 "1" will be negative and lead LSA3 "0" will be positive when the micro-instruction 9/3 "left shift accumulator 3" signal is given.

$$\overline{OF5}.8/3.TD(a) - G95 - \underline{G86} \quad (B6)$$

The L.S.D. of ACC3 will be made "0'" by the left shift accumulator 3 signal as lead LSA3 "1" will be positive (via gate G87) while LSA3 "0" will be negative.

$$\overline{OF5}.8/3.9/3.TD(a) - G92 - \underline{G93} - TP2(b) - G94 - \overline{TFS} \quad (B7)$$

Toggle TFS is set or reset at the end of this phase ready to control the operation of the arithmetic processer in the next micro-order.

D5(c) *Phase 3.*—In phase 1 of this micro-order the iteration count was reduced by 1. The operation of this phase is concerned with testing the iteration for zero. The selection of micro-instructions 11/5 allows the setting of toggle TJ6 in FIG. 16A if the index processer output bits 1–6 are not equal to zero. Micro-instruction 12/3 causes a repeat micro-order (R–MO) if the jump test is fulfilled (i.e., the iteration count does not equal zero) or a step on to next-micro order (SO) if the iteration count is zero. Thus the present micro-order is repeated building up the quotient in accumulator 3 until the iteration count is reduced to zero.

D6 *Micro-order 27*

Micro-programme store output at address 27:
Phase 1 _____ 8888
Phase 2 _____ 58818
Phase 3 _____ 881

D6(a) *Phase 1.*—Idle.

D6(b) *Phase 2.*—Micro-instructions 5/5 and 8/1 simply control the transfer of accumulator 3 to overwrite the data in accumulator 1 via the arithmetic processer.

D6(c) *Phase 3.*—Select next main order.

Micro-order 27 ends the division routine and the selection of the next main order in the current computer programme causes the reset of the division. Toggle TD in FIG. 19A allows the use of the quotient of the division process as the programmer requires.

IX. SR. SQUARE ROOT

A typical main order for a simple fixed point, full length arithmetic square root operation will be of the following form when read from the programme store into the order register in the index unit.

O.R. Bits 1–8 M-address of first micro-order in the square-root routine in the micro-programme store.

9 and 10—Indexing bits.

Bit 11—Store selection bit for store address A.

Bit 12—Store selection bit for store address B.

Bits 13–24—Store address A (the store address of the data to be used as the radicand).

Bits 25–30—Iteration count.

Bits 31–33—The square-root code (001).

Bits 34–36—All 0's.

Bits 37–48—Store address B (the store address to be used to write back the resultant square root of the radicand).

The first micro-order of the micro-programme routine allocated to the square-root operation is defined by the M-address section of the order word and for example this M-address may have a decimal value of 30.

SR1 *Micro-order 30*

Micro-programme store output at address 30:
Phase 1 _____ 2883
Phase 2 _____ 81884
Phase 3 _____ 882

SR1(a) *Phase 1.*—The selection of micro-instructions 1/2 and 4/3 control the reading of the store address A (the radicand address) from order registers OR 13–24 to address the relevant store, in accordance with the value of bit 11, for a read/rewrite operation.

SR1(b) *Phase 2.*—Micro-instructions 6/1 and 9/4 when selected cause the radicand to be read from the store, addressed in phase 1, and placed in accumulator 2 with an inherent one bit left shift, to remove the sign bit, via the arithmetic processer.

SR1(c) *Phase 3.*—Step on to next micro-order.

SR2 *Micro-order 31*

Micro-programme store output at address 31:
Phase 1 _____ 6786
Phase 2 _____ 88816
Phase 3 _____ 782

SR2(a) *Phase 1.*—Micro-instruction 1/6 controls the transfers of the M-address, order register bits 1–8, to the index processer operand input. Micro-instruction 2/7 controls the addition of one to the M address and micro-instruction 4/6 transfers the output of the index processer (M-address 31+1) to the micro-jump register.

SR2(b) *Phase 2.*—The selection of micro-instructions 8/1 and 9/6 simply transfers the output of the arithmetic processer to accumulators 1 and 3. The output from the arithmetic processer will be all 0's thus the above operation has the effect of zeroising accumulators 1 and 3.

SR2(c) *Phase 3.*—The selection of micro-instruction 10/7, the "select arithmetic" micro-instruction, allows the setting of toggle TSR in FIG. 19A at the end of phase 1.

$$TP1(b).10/7 - G80 - G81 - G96 - TSR \quad (C1)$$

As shown for the control of the multiplication and division toggles TM and TD the setting of the order register toggles for bits 31–33 of the order word ensure that only toggle TSR is set of the arithmetic toggles in FIG. 19A.

Micro-instruction 10/7 also allows the setting of toggle TFS in FIG. 19A to set subtract for the next but one micro-order of the square-root routine at the end of phase 2.

33

$10/7.TSR(a)-G97-\overline{G89}.TP2(a)-G90-TFS$ (C2)

The selection of micro-instruction 12/2 causes the opening of gate G12/2C, in FIG. 14, as no jump is designated by the phase 3 micro-instructions. The opening of this gate causes a step on to next micro-order (SO) operation to be performed.

SR3 *Micro-order 32*

Micro-programme store output at address 32:

| Phase 1 | 8888 |
|---|---|
| Phase 2 | 88883 |
| Phase 3 | 282 |

SR3(a) *Phase 1.*—Idle.

SR3(b) *Phase 2.*—Micro-instruction 9/3 when selected causes a one bit left shift of accumulator 3 (the partial resultant) to take place. Lead LSA3 "1" will at this stage be in a negative condition and, therefore, "1" is shifted into the least significant digit of accumulator 3. At this time gate GDS is held closed by the inverted set output from toggle TSR (see expression C2). Gates G95 and G85 will both be closed thus gate G86 is opened holding lead LSA3 "0" condition and lead LSA3 "1" at a "1" condition via inverter G87.

SR3(c) *Phase 3.*—The selection of micro-instruction 10/2 causes a double or two bit left shift transfer of accumulator 3 (which is at this time holding the radicand shifted up one bit) into accumulator 1. This may simply be performed by connecting the outputs of accumulator 1 via a set of gates controlled by micro-instruction 10/2 to the input gates of accumulator 1, all skipped to the left by two digits.

The selection of micro-instruction 12/2 with no jump designated causes a step on to next micro-order operation to be performed.

SR4 *Micro-order 33*

Micro-programme store output at address 33:

| Phase 1 | 3741 |
|---|---|
| Phase 2 | 36818 |
| Phase 3 | 852 |

SR4(a) *Phase 1.*—The selected micro-instructions in this phase cause a reduction of one to be made to the iteration count in the same manner as shown in section M3(a) for multiplication.

SR4(b) *Phase 2.*—Micro-instructions 5/3 and 6/6 control the transfer of accumulator 1 (the shifted radicand) and accumulator 3 (the partial resultant) to the operand and operator inputs of the arithmetic processer. Toggle TSF is still set in FIG. 19A, therefore, a subtraction of the partial resultant from the shifted radicand takes place.

The additional logic in FIG. 19A is used to control the formation of the two least significant bits of the partial resultant according to the value of the most significant digit of the resultant of the subtraction performed in this phase. The square-root process requires 01 to be written into the two least significant digits of accumulator 3 if the resultant of the above subtraction gives a negative result (i.e., bit 48 of the arithmetic processer output is a 1) or 10 if the result is positive (i.e., bit 48=0). This is performed under the control of signals A3SC, R48, and $\overline{R48}$. Signal A3SC is produced at the end of phase 3, when toggle TP2, FIG. 13, is reset, when gate G98 (FIG. 19A) is opened.

$\overline{TP2}(b).TSR(a)-G98-A3SC$ (C3)

Signal A3SC is used to control the least significant subsection (bits 1–4) of accumulator 3 and bits 1 and 2 are subjected to the required setting according to the value of R48, the 48th output bit of the arithmetic processer. This logic is not shown as it may conveniently be housed in accumulator 3 and is of simple straight forward configuration.

The square root process also requires a "set add" condition to be generated for the next but one micro-order if the sign bit of the arithmetic processer output is a "1" and a "set subtract" condition if this bit is "0." These conditions are achieved, at the end of phase 2 by the setting (subtract) or resetting (add) of toggle TSF.

$TSR(a).5/3-G99$ $-\overline{G100}.\overline{R48}-G101-\underline{G89}.\overline{TP2}(a)-TFS$ (C4)

$-\overline{G100}.R48-G102-\underline{G93}.\overline{TP2}(a)-\overline{TFS}$ (C5)

Micro-instruction 8/1 causes the result of the subtraction performed in this phase to be transferred to accumulator 1.

SR4(c) *Phase 3.*—Micro-instruction 11/5 when selected allows toggle TJ6, in FIG. 16A, to set if the output of the index processer bit 1–6 in phase 1 is not equal to zero. This process checks the iteration count for zero. The selection of micro-instruction 12/2 allows a jump to the micro-order whose address is stored in the micro-jump register if the jump test is fulfilled or a step on to next micro-order operation if the jump test is unfulfilled.

It will be remembered that micro-order M-address 32 was placed in the micro-jump register in phase 1 of micro-order 31 (see section SR2(a)) and, therefore, the micro-programme for square-root enters at this point, a loop causing micro-orders 32 and 33 to be repeated in turn until the iteration count reaches zero. It is usual to provide a half length resultant when performing a 48 bit square-root operation and, therefore, the iteration count written by the programmer, will be 24 causing twenty-four operations to take place before the iteration count reaches zero.

SR5 *Micro-order 34*

Micro-programme store output at address 34:

| Phase 1. | 4884 |
|---|---|
| Phase 2 | 58881 |
| Phase 3 | 881 |

SR5(a) *Phase 1.*—Micro-instructions 1/4 and 4/4 control the addressing of the relevant store, according to the value of bit 12 of the order register (via the index processer, which is required to accept in phase 2 the resultant root of the square-root operation.

SR5(b) *Phase 2.*—Micro-instructions 5/5 and 9/1 control the transfer of the resultant root from accumulator 1 to the store selected in phase 1, by way of the arithmetic processer.

SR5(c) *Phase 3.*—A select next main order operation is specified by micro-instruction 12/1 and this causes the reset of toggle TSR, in FIG. 19A to indicate the end of the square root routine.

X. 0. OVERFLOW

Toggle TOF is used to indicate overflow on full length, half length and floating point arithmetic operations.

01 *Full length arithmetic.*—Overflow will be experienced when bits 48 and 49 of the output of the arithmetic processer are different, i.e., when R49/R48. This condition is defined in the output switch of the arithmetic processer and is fed as a "1" state signal on lead OF1 to FIG. 19B to set toggle TOF.

$OF1.\overline{TSU}(b)-G112-\underline{G109}.GOFC-TOF$ (F1)

02 *Half length arithmetic.*—Overflow will be experienced when bit 24 changes its sign and this is indicated by a "1" state signal OF2.

$OF2.THL(a)-G113-\underline{G109}.GOFC-TOF$ (F2)

Expression F1 may also apply if two pairs of half length words are being processed simultaneously. Toggle THL, whose set condition is included in expression F2, is set when bit 35 of the order register is a "1" and micro-instruction 10/7 is selected. Toggle THL also produces signal SPS which is used to split the processer in half for the half length operations.

03 *Floating point arithmetic.*—Overflow may be experienced from the mantissa (bits 9–48), in which case expression F1 applies, or the exponent (i.e., bits 1–8). Signal OF3 when a "1" indicates an exponent overflow.

$$OF3.\overline{TSC}(b).TFL(a)$$
$$-G114-G109.GOFC-TOF \quad (F3)$$

Toggle TFL is the floating point arithmetic indication toggle which will be set by a 1 in bit 34 of the order register.

XI. SZ STANDARDISATION

This order is used in association with floating point arithmetic operations (see next section FLP) and is used to assemble the floating point resultant, which may for example be stored in accumulator 1, in standard form. Standard form is defined in this computer system as being such that the mantissa of the floating point number is shifted up (i.e., to the left) until the most significant "1" of the mantissa of a positive numbers or "0" of a negative number is in bit 47 of the resultant. The value of the exponent must be reduced by 1 for each successive one bit shift up.

A typical main order for a standardisation operation may be of the following form when read from the programme store into the order register.

O.R. Bits 1–8—M-address of first micro-order of the micro-programme routine allocated to standardisation in the micro-programme store.
Bits 9 and 10—Indexing bits.
Bits 11 and 12—Both 0's.
Bits 13–24—Store address A.
Bits 25–30—All 0's.
Bits 31–33—Standardisation code (011).
Bit 34—"1"—Indicating floating point arithmetic operation.
Bits 35 and 36—Both 0's.
Bits 37–48—Mantissa subsection code bits 37 and 38, "0," bits 39–48 all 1's.

The mantissa subsection code is used to allow the transfer of the mantissa without the exponent and its makeup and effects will be considered in more detail in the subsection (SZ2) dealing with the second micro-order of this routine.

The first micro-order of the standardisation routine is specified by the M-address and for ease of description it will be assumed that this may have a decimal value of 60.

SZ1 *Micro-order 60*

Micro-programme store output at address 60:
Phase 1 _____ 8888
Phase 2 _____ 88866
Phase 3 _____ 782

SZ1(a) *Phase 1.*—Idle.

SZ1(b) *Phase 2.*—The selection of micro-instructions 8/6 and 9/6 allows the zeroisation of accumulators 2 and 3 to take place. The selection of the phase 3 micro-instruction 10/7 allows the setting of the standardisation toggle TSZ, the floating point toggle TFL and the set arithmetic toggle TSA at the end of phase 1 when toggle TP1 is reset.

$$TP1(b).10/7 - G80 - G81.\overline{OR31}.OR32.OR33$$
$$-G115-TSZ \quad (X1)$$
$$-G81.OR34-G116-TFL \quad (X2)$$
$$-G81.G117-TSA \quad (X3)$$

SZ1(c) *Phase 3.*—Step on to next micro-order.

SZ2 *Micro-order 61*

Micro-programme store output at address 61:
Phase 1 _____ 8888
Phase 2 _____ 38486
Phase 3 _____ 846

SZ2(a) *Phase 1.*—Idle.

SZ2(b) *Phase 2.*—Micro-instruction 5/3 controls the transfer of accumulator 1 (the exponent bits 1–8 and the mantissa bits 9–48 of the floating point number) to the operand input of the arithmetic processer. Micro-instruction 7/4, the "subsections do not amend" micro-instruction, when selected allows the use of the merge gates G1M1–G1M12 and G0M1–G0M12 and the merge control gates GMC1–GMC12, shown in FIGS. 15B and 16B of the control unit, together with the subsection code in order register bits OR37–OR48 to control the operation of the four bit sub-sections, twelve in all, of accumulator 3. The sub-section code in order register bits 37–48 is of the following form 00 1111111111. Thus, in FIGS. 15B and 16B gates G1M1 and G1M2 and G0M1 and G0M2 will be opened by the "0" conditions from the reset sides of order register toggles OR37 and 38. The merge control output leads 1M3–1M12 and 0M3–0M12 from the merge control circuit will, therefore, be in the "0" state while leads 1M1 and 1M2 and 0M1 and 0M2 will be in the "1" state.

The merge control output leads are fed to all the accumulators, the order register and the index registers 1–3 and they control the numerically equivalent sub-sections in each of these 48 bit registering equipments. One pair of merge control output leads is used for each subsection, for example leads 1M1 and 0M1 control the first sub-section (bits 1–4) of the register equipments. Lead 1M1 controls one of the input gates on the set or "1" side of each of the four toggles in sub-section 1 while lead 0M1 controls the input gates on the "0" or reset side of these toggles. The 1M and 0M leads are fed to these toggle input gates via inverters and are thus used to prime the relevant input gates when they are in the "0" state at the output of the control unit. When the 1M and 0M leads are in the "1" state the registering equipment toggle input gates are inhibited. Thus, in the case in point, the sub-section code, specified by order register bits 37–48, allows the output of the arithmetic processer to be applied to accumulator 3, under the control of micro-instruction 9/6, with the first two sub-sections inhibited. Accumulator 3 was made zero in phase 2 of the previous micro-order thus, at the end of this present phase, accumulator 3 contains the mantissa of the floating point number only. Sub-sections 1 and 2, the exponent sub-sections will be zero.

When the mantissa is read into accumulator 3 a comparison of the values of bits 47 and 48 in the additional logic FIGS. 19A and 19B is performed. If these bits are different the number is in standard form, however, if they are the same standardisation is required. Signal $\overline{FLP2}$ is produced (positive) if standardisation is required.

$$\left.\begin{array}{l}A347.A348.TSZ-G118\\\overline{A347}.\overline{A348}.TSZ-G119\end{array}\right\}\overline{FLP2} \quad (F4)$$

Figure 17:
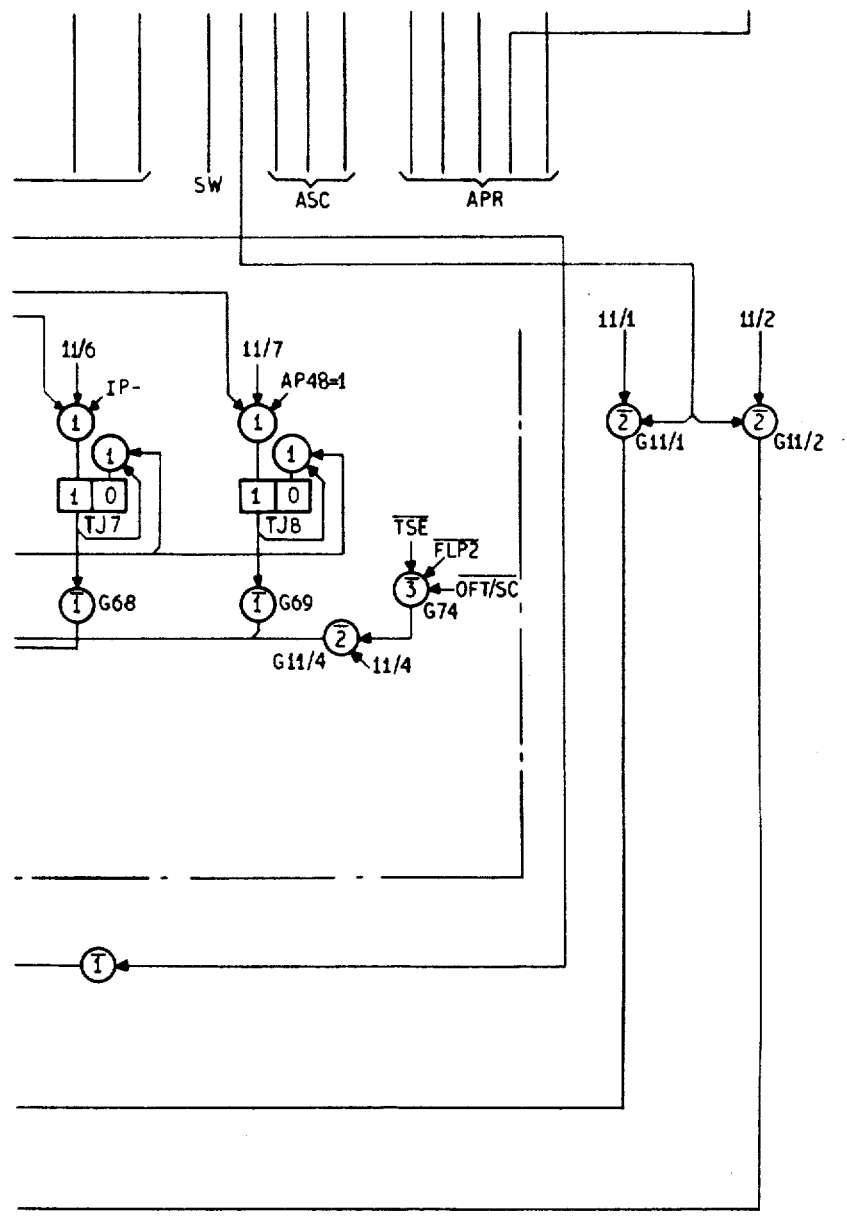

SZ2(c) *Phase 3.*—The selection of micro-instructions 11/4 and 12/6 allow a step on to next micro-order operation to be performed if signal $\overline{FLP2}$ is in the "0" state as gate G74 is closed allowing gate G11/4 to open in FIG. 17. If signal $\overline{FLP2}$ is in the "1" state standardisation is not required and an unfulfilled jump operation controlled by micro-instruction 12/6 is performed (i.e., select next main ORDER).

SZ3 *Micro-order 62*

Micro-programme store output at address 62:
Phase 1 _____ 8585
Phase 2 _____ 58888
Phase 3 _____ 436

SZ3(a) *Phase 1.*—The selection of micro-instructions 2/5 and 4/5 allow the transfer of a wired-in subsection code for the exponent of a floating point number to the order register bits 37–48 by way of the index processer. This wired-in word is controlled by signal FLP produced when toggle TFL is set in FIG. 19B, and micro-instruction 2/5 is selected. This code will be 11 0000000000 and it is over-written into the order register bits 37–48 to allow the transfer of the exponent only to accumulator 2 in the next micro-order.

SZ3(b) *Phase 2.*—Micro-instruction 6/5 allows the transfer of the mantissa, in accumulator 3, to the operand input of the arithmetic processer. This operation is performed so that the output of the arithmetic processer can be tested for zero, after the mantissa +0 operation is complete.

Figure 15A:
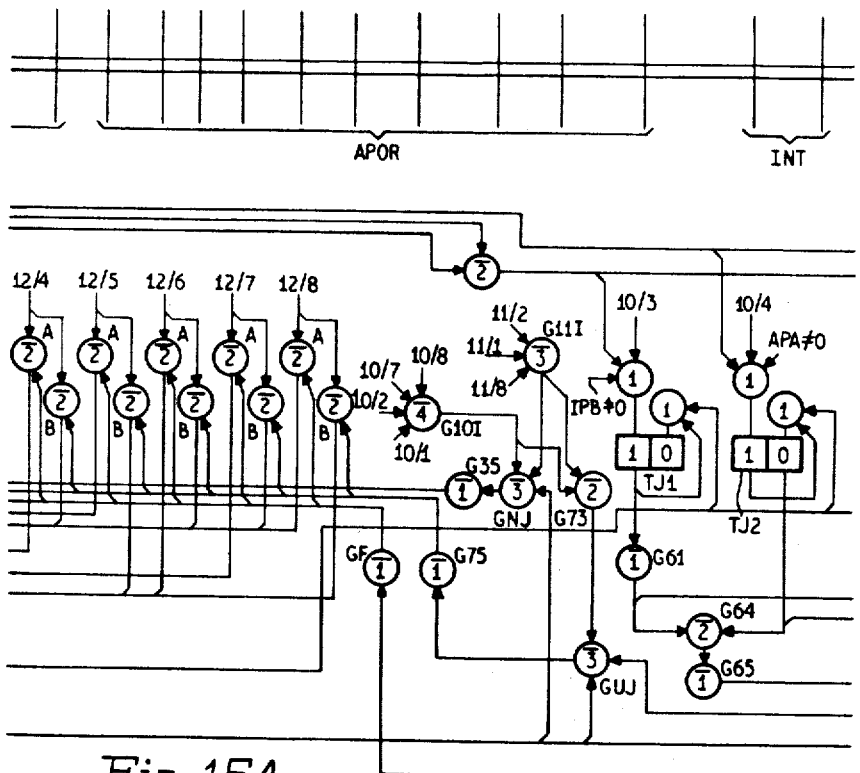

SZ3(c) *Phase 3.*—If the mantissa is zero, toggles TJ2 and TJ5 in FIGS. 15A and 16A will be reset and micro-instruction 12/6 will cause a select next main order operation to be performed. If the mantissa is not zero, either or both of these toggles will be set under the control of micro-instructions 10/4 and 11/3 allowing a step on to next micro-order operation to be performed under the control of micro-instruction 12/6.

SZ4 *Micro-order 63*

Micro-programme store output at store address 63:

| | |
|---|---|
| Phase 1 | 8888 |
| Phase 2 | 38468 |
| Phase 3 | 882 |

SZ4(a) *Phase 1.*—Idle.

SZ4(b) *Phase 2.*—Micro-instruction 5/3 transfers the floating point number in accumulator 1 to the arithmetic processer operand input and a +0 operation is performed. The selection of micro-instruction 8/6 routes the output of the arithmetic processer to accumulator 2, however, the selection of micro-instruction 7/4 causes this transfer to be performed under the control of the subsection code in order register bits 37–48. This code is 11 0000000000, the exponent code, and, therefore, gates G1M1, G1M2, G0M1 and G0M2 only are opened in FIG. 15B. The opening of these gates allows only the input gates of the sub-sections 1 and 2 of accumulator 2 to be primed causing the transfer of the exponent only into this accumulator.

SZ4(c) *Phase 3*

Step on to next micro-order.

SZ5 *Micro-order 64*

Micro-programme store output at address 64:

| | |
|---|---|
| Phase 1 | 8888 |
| Phase 2 | 48263 |
| Phase 3 | 843 |

SZ(a) *Phase 1.*—Idle.

SZ5(b) *Phase 2.*—Micro-instructions 5/4 and 6/2 control the transfer of the exponent to the arithmetic processer and the subtraction of 1 from the exponent value. Micro-instruction 8/6 controls the overwriting of the newly formed exponent into accumulator 2 while micro-instruction 9/3 causes a one bit left shift to be performed on the mantissa in accumulator 3.

The additional logic in FIGS. 19A and 19B again performs the comparison operation using bits 47 and 48 of accumulator 3. Signal $\overline{FLO2}$ is produced as shown in expressions F4 and F5 in section SZ2(b) if the mantissa is not yet in standard form.

SZ5(c) *Phase 3.*—Micro-instructions 11/4 and 12/3 cause a repeat micro-order operation to be performed if signal $\overline{FLP2}$ is in the "0" state or a step-on to next micro-order if in the "1" state.

This micro-order 64 will be repeated until the mantissa has been shifted up a sufficient number of times to be in standard form. The standard form of the mantissa will be recognised when bit A347/A348. The exponent is reduced by one for each left shift performed on the mantissa, thus the exponent of the standardised mantissa (accumulator 3) will be formed in accumulator 2.

SZ6 *Micro-order 65*

Micro-programme store output at address 65:

| | |
|---|---|
| Phase 1 | 8888 |
| Phase 2 | 58818 |
| Phase 3 | 882 |

SZ6(a) *Phase 1.*—Idle.

SZ6(b) *Phase 2.*—Micro-instructions 5/5 and 8/1 control the overwriting of the standardised mantissa in accumulator 3 into bits 9–48 of accumulator 1.

SZ6(c) *Phase 3.*—Step on to next micro-order.

SZ7 *Micro-order 66*

Micro-programme store output at address 66:

| | |
|---|---|
| Phase 1 | 8717 |
| Phase 2 | 48418 |
| Phase 3 | 875 |

SZ7(a) *Phase 1.*—Micro-orders 2/7, 3/1, and 4/7 cause-1 to be overwritten into order register, bits 1–12, using the index processer. The significance of this operation will be understood when the phase 3 operation of this micro-order is described.

SZ7(b) *Phase 2.*—Micro-instructions 5/4, 7/4 and 8/1 control the transfer of the exponent from accumulator 2 to join the standardised mantissa in accumulator 1 to form the standardised floating point number. The sub-section code (order register bits 37–48) is again used to effectively inhibit the output bits 9–48 of the arithmetic processer. This operation is required as the exponent may have overflowed (i.e., it may be a negative number) and ones will therefore be present in some of bits 9–48 of accumulator 2. A test for this overflow condition is performed in this phase under the control of the phase 3 micro-instruction 12/7.

SZ7(c) *Phase 3.*—If toggle TJ8 is set in FIG. 17 indicating the overflow condition, micro-instruction 12/5 causes a jump to the address stored in order register bits 13–24 to be performed. This address may be used to specify an order used to stop the machine and indicate to the programmer the overflow condition.

If toggle TJ8 is not set, micro-instruction 12/5 causes a step to the next micro-order operation to be performed. This operation is performed by adding 1 to the M-address. It was mentioned previously that the M-address was made all 1's in phase 1 of this micro-order thus the addition of one causes all 0's to be formed in the M-address section of the order register. Micro-address 00 (decimal) is used to specify select next main order and the output of the micro-programme store at address 00 will be 8888 8888 881.

The select next main order condition resets the additional logic toggles TSZ, TFL and TSA, as signal MA0 is switched to the "1" state, to end the standardisation routine.

XII. FL FLOATING POINT ARITHMETIC

It was mentioned previously that the forty-eight bit word may be used as a fixed or floating point operand or operator and, in the case of a floating point word, bits 1–8 define the exponent and bits 9–48 the mantissa. All floating point operations require a number of main-programme orders. The initial orders, in the case of addition and subtraction, deal with the comparison of the exponents and the shifting of the mantissa to bring both operands into the same binary significance (i.e., equal exponents). The subsequent orders perform the required arithmetic manipulations and tests for overflow.

XIII. 1FLA FLOATING POINT ADDITION

A typical first main order for a floating point addition operation will be of the following form when read from the store.

O.R. bits 1–8—M-address of first micro-order of the F.L.P. addition routine in the micro-programme store.

Bits 9 and 10—Indexing bits.
Bit 11—Store selection bit for store address A.
Bit 12—Store selection bit for store address B.
Bits 13–24—Store address A (the address of the data word to be used as the operand).
Bits 25–33—All 0's.
Bit 34—"1" (indicating floating point).
Bits 35 and 36—Both 0's.
Bits 37–48—Store address B (the address of the operator data word).

The data words to be used as operand and operator will be floating point data words and will be of the form $a2^x$, where $x$ is the exponent and $a$ is the mantissa, for the operand and $b2^y$, where $y$ is the exponent and $b$ is the mantissa for the operator.

The first micro-order of the micro-programme required to perform this first order is defined by the M-address in the order word. This M-address may conveniently define an address of decimal significance 70 in the micro-programme store.

1FLA1 Micro-order 70

Micro-programme store output at address 70:
- Phase 1 _____ 8882
- Phase 2 _____ 78881
- Phase 3 _____ 882

1FLA1(a) *Phase 1.*—Micro-instruction 4/2 causes the output of the index processor, which is all 0's, to address the store and cause a read operation at store address zero. The signifiicance of this operation will be appreciated later.

1FLA1(b) *Phase 2.*—Micro-instructions 5/7 and 9/1 control the writing of the contents of the index registers into the store. This information will be written at address zero in the store as this address was primed with a read operation in phase 1. It is necessary to store the contents of the index registers at this point as they will be required for additional storage throughout this and the following floating point add to and subtraction orders.

1FLA1(c) *Phase 3.*—Step on to next micro order.

1FLA2 Micro-order 71

Micro-programme store output at address 71:
- Phase 1 _____ 4868
- Phase 2 _____ 88815
- Phase 3 _____ 782

1FLA2(a) *Phase 1.*—The selection of micro-instructions 1/4 and 3/6 cause the contents of order register bits 37–48 (store address B) together with bit 12 to be transferred to index register 2 (bits 71–32).

1FLA2(b) *Phase 2.*—Micro-instructions 8/1 and 9/5 cause zero to be placed in accumulators 1 and 2.

1FLA(b) *Phase 3.*—Micro-instruction 10/7 causes toggle TFL in FIG. 19B to set at the end of phase 1.

$$TP1(b).10/7 - G80 - G81 - G116 - TFL \quad (H1)$$

Micro-instructions 12/2 with no jump designated causes a step on to next micro-order operation to be performed.

1FLA3 Micro-order 72

Micro-programme store output at address 72:
- Phase 1 _____ 8585
- Phase 2 _____ 88888
- Phase 3 _____ 882

Figure 8:
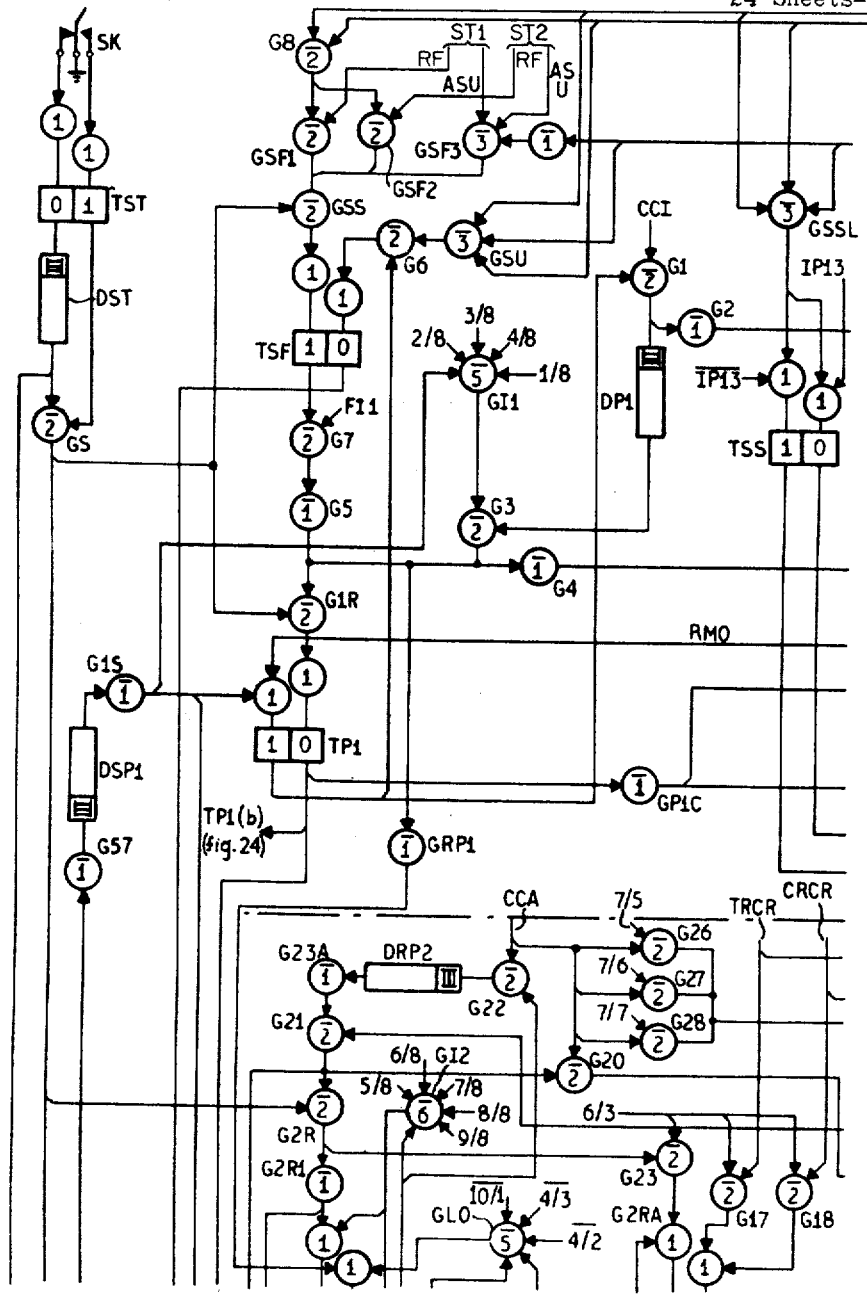

1FLA3(a) *Phase 1.*—The selection of micro-instruction 2/5 with toggle TFL set causes a gating signal to be produced in FIG. 8 to allow a wired-in "exponent sub-section" code to be transferred via the index processor to order-register bits 37–48, under the control of micro-instruction 4/5. This sub-section code is of the form 110000000000 and is used in the next two micro-orders in phase 2 to control, by way of the merge control gates in FIGS. 16B and 17, the reading from store into accumulators 1 and 2 of the exponents only of the data words.

1FLA3(b) *Phase 2.*—Idle.

1FLA3(c) *Phase 3.*—Step on to next micro-order.

1FLA4 Micro-order 73

Micro-programme store output at address 73:
- Phase 1 _____ 2873
- Phase 2 _____ 81418
- Phase 3 _____ 882

1FLA4(a) *Phase 1.*—Micro-instructions 1/2, 3/7 and 4/3 cause the relevant store to be addressed at store address A (the A data word to be used as the operand) and a store read/rewrite operation to take place.

Figure 15B:
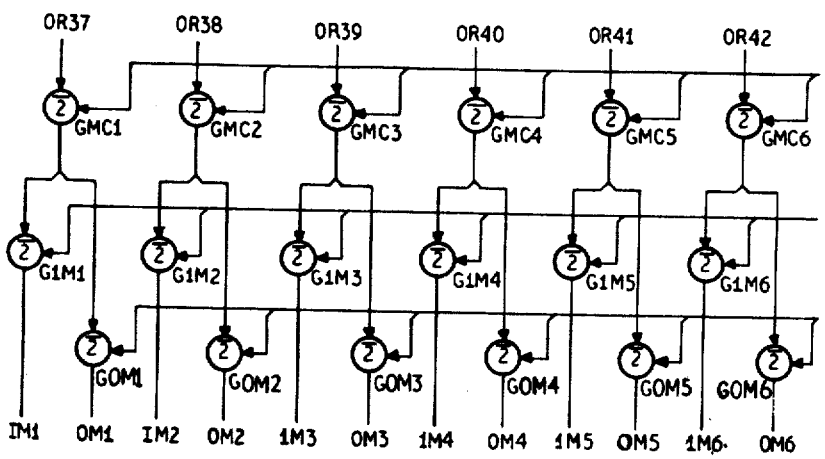

1FLA4(b) *Phase 2.*—The output from the store is presented to the arithmetic processor under the control of micro-instruction 6/1, however, due to the selection of micro-instruction 7/4 and the merge control gates in FIGS. 15B and 16B only the exponent ($x$) is fed to accumulator 1 under the control of micro-instruction 8/1.

1FLA4(c) *Phase 3.*—Step on to next micro-order.

1FLA5 Micro-order 74

Micro-programme store output at address 74:
- Phase 1 _____ 8383
- Phase 2 _____ 81468
- Phase 3 _____ 882

1FLA5(a) *Phase 1.*—Micro-instructions 2/3 and 4/3 control the addressing of the relevant store with the store address B data which was temporarily stored in index register 2 (bits IR17–32).

1FLA5(b) *Phase 2.*—The selected micro-instruction in this phase controls the reading of the address B data word exponent ($y$) into accumulator 2.

1FLA5(c) *Phase 3.*—Step on to next micro-order.

1FLA6 Micro-order 75

Micro-programme store output at address 75:
- Phase 1 _____ 8858
- Phase 2 _____ 44386
- Phase 3 _____ 878

1FLA6(a) *Phase 1.*—Micro-instruction 3/5 causes the zeroising of index register 1 (IR bits 1–16) to take place.

1FLA6(b) *Phase 2.*—Micro-instructions 5/4 and 6/4 control the transfer of the exponents $x$ and $y$ from accumulators 1 and 2 respectively to the arithmetic processor. Micro-instruction 7/3 causes a subtraction of exponent $x$ from exponent $y$ to take place and micro-instruction 9/6 causes the resultant $(y-x)$ to be placed in accumulator 3.

1FLA6(c) *Phase 3.*—Micro-instruction 11/7 when selected allows toggle TJ8 in FIG. 17 to set if the result of the phase 2 operation is negative. This will indicate that exponent $x$ is greater than exponent $y$.

The selection of micro-instruction 12/8 in this phase causes a select next main order operation to be performed if $x$ is greater than $y$ or a step to next micro-order if $y$ is greater than $x$. The next main order will be floating point addition main order 2.

1FLA7 Micro-order 76

Micro-programme store output at address 76:
- Phase 1 _____ 1728
- Phase 2 _____ 58888
- Phase 3 _____ 438

1FLA7(a) *Phase 1.*—The micro-instructions selected in this phase cause one to be added to the next main order number in the current programme order register PCR (bits 1–16).

1FLA7(b) *Phase 2.*—Micro-instruction 5/5 causes the resultant of the previous micro-order phase 2 subtraction (y−x) to be presented to the arithmetic processer and a test for zero is performed.

1FLA7(c) *Phase 3*.—Toggle TJ2 in FIG. 15 will be set at the end of phase 2 if the resultant y−x is not zero, allowing a select next main order operation to take place under the control of micro-instruction 12/8. This will cause the selection of main order 3 of the main orders used for floating point addition as exponent y is larger than exponent x.

If toggle TJ2 is not set, a step on to next micro-order is performed as the exponents x and y are equal.

1FLA8 *Micro-order 77*

Micro-programme store output at address 77:
```
Phase 1 _____ 8185
Phase 2 _____ 88816
Phase 3 _____ 882
```

1FLA8(a) *Phase 1*.—Micro-instruction 2/1 together with signal FLP from FIG. 19B allows a signal to be produced in FIG. 8 to control the gating of a wired-in mantissa sub-section code into the index-processer. This mantissa sub-section code is of the form 001111111111. Micro-instruction 4/5 causes the code to be overwritten into order register bits 37–48.

1FLA8(b) *Phase 2*.—Zeroisation of accumulators 1 and 3 takes place in this phase.

1FLA8(c) *Phase 3*.—Step on.

1FLA9 *Micro-order 78*

Micro-programme store output at address 78:
```
Phase 1 _____ 8683
Phase 2 _____ 81418
Phase 3 _____ 882
```

1FLA9(a) *Phase 1*.—The selected micro-instructions 2/6 and 4/3 control the addressing of the relevant store for a read/rewrite operation by the store A address which is at this time held in index register 3 (IR bits 33–48), see section 1FLA4.

1FLA9(b) *Phase 2*.—The selected micro-instructions in this phase cause the mantissa output section of the store to be applied to accumulator 1. Micro-instruction 7/4 controls the mantissa sub-section selection.

1FLA9(c) *Phase 3*.—Step on.

1FLA10 *Micro-order 79*

Micro-programme store output at address 79:
```
Phase 1 _____ 8383
Phase 2 _____ 81486
Phase 3 _____ 882
```

1FLA10(a) *Phase 1*.—The selected micro-instructions 2/3 and 4/3 control the addressing of the relevant store for a read/rewrite operation by the store B address which is at this time in index register 2 (I.R. bits 17–32) see section 1FLA2.

1FLA10(b) *Phase 2*.—The selected micro-instructions in this phase cause the mantissa b to be applied to accumulator 3.

1FLA10(c) *Phase 3*.—Step on.

1FLA11 *Micro-order 80*

Micro-programme store output at address 80:
```
Phase 1 _____ 1728
Phase 2 _____ 8888
Phase 3 _____ 882
```

1FLA11(a) *Phase 1*.—The selected micro-instructions in this phase cause one to be added to the programme number stored in the current programme order register (bits 1–16). This register is at this time storing floating point addition order number 2, see section 1FLA7, and, therefore, this operation forms floating point addition main order 3 in this register.

1FLA11(b) *Phase 2*.—Idle.

1FLA11(b) *Phase 3*.—Step on.

1FLA12 *Micro-order 81*

Micro-programme store output at address 81:
```
Phase 1 _____ 8883
Phase 2 _____ 81858
Phase 3 _____ 881
```

1FLA12(a) *Phase 1*.—The selection of micro-instruction 4/3 allows a store read/rewrite operation to take place at address zero, the address at which the indexing data was stored at the start of this main programme order, see section 1FLA1.

1FLA12(b) *Phase 2*.—The micro-instructions in this phase allow the indexing information read from the store in phase 1 to be restored to the index registers.

1FLA12(c) *Phase 3*.—Select next main order. This will be floating point addition main programme order 4.

This ends the operation performed by the floating point addition main order 1 and it can be seen that there are three points of exit from the micro-routine specified by this order.

The first point of exit is when it is sensed that exponent x is larger than y and floating point addition main order 2 is entered. Accumulator 1 holds exponent x, accumulator 2 holds exponent y and accumulator 3 holds y−x, see section 1FLA6.

The second point of exit is when it is sensed that the exponent of y is larger than x and in this case floating point addition main order 3 is entered. Accumulator 1 holds exponent x, accumulator 2 holds exponent y and accumulator 3 holds y−x, see section 1FLA7.

The third and final point of exit is when it is sensed that the exponents x and y are equal and in this case floating point addition main order 4 is entered. Accumulator 1 holds the matissa a, accumulator 3 holds the mantissa b and accumulator 2 holds the common exponent.

2FLA *Floating point addition main order 2*.—This order is entered from micro-order 75 of main order 1 above if the modulus of the exponent x is greater than that of exponent y.

Accumulator 1 contains exponent x, accumulator 2 contains exponent y and accumulator 3 contains exponent y−x which is negative.

Index register 1 (bits 1–16) contains zero, index register 2 (bits IR 17–32) contains the store address B of the floating point data word ($b2^y$) and index register 3 (bits I.R. 33–48) contains the store address A of data word ($a2^x$).

The order word read from the programme store will be of the following format.

Order register Bits 1–8 M-address of first micro-address of floating point addition second order routine in microprogramme store.

Bits 9 and 10—Both 0's.
Bits 11 and 12—Both 0's.
Bits 13–24—Binary representation of decimal number 38.
Bits 25–33—Binary representation of 81.
Bit 34—"1" indicating floating point operation.
Bits 35–36—Both 0's.
Bits 37–48—Binary representation of 88.

The significance of the various binary code representations of decimal numbers in the above order word will be appreciated as the following section for the floating point addition main order 2 is disclosed.

The object of this main order is to arrange the data words so that their exponents are equal.

The M-address of the order word may be, for ease of description, allocated a decimal significance of 82.

2FLA1 *Micro-order 82*

Micro-programme store output at address 82:
```
Phase 1 _____ 4886
Phase 2 _____ 35386
Phase 3 _____ 782
```

2FLA1(a) *Phase 1*.—The selected micro-instructions in this phase cause the binary number of order register bits 37–48 to be transferred to the micro-jump register. Thus the micro-jump register now contains order number 88.

2FLA1(b) *Phase 2.*—Micro-instructions selected in this phase cause a subtraction operation between the exponents $x$ and $y$. This main-order was entered because $(x-y)$ thus $y$ must be subtracted from $x$ to form the positive exponent difference between the two data words. The magnitude of this difference will define the number of places the $b$ mantissa has to be shifted down to bring the exponents into line. This exponent difference value $(x-y)$ is placed in accumulator 3.

2FLA1(c) *Phase 3.*—The selection of micro-instruction 10/7 allows the setting of toggle TFL as shown in expression H1 above. Micro-instruction 12/2 causes a step on to next micro-order operation to be performed.

2FLA2 *Micro-order 83*

Micro-programme store output at address 83:
```
Phase 1 _____ 8585
Phase 2 _____ 38868
Phase 3 _____   882
```

2FLA2(a) *Phase 1.*—The setting of toggle TFL in the previous micro-order together with micro-instructions 2/5 and 4/5 allows the gating of the system wired in exponent sub-section code into order register bits 37–48.

2FLA2(b) *Phase 2.*—The selected micro-instructions in this phase allow the transfer of exponent $x$ from accumulator 1 to accumulator 2.

2FLA2(c) *Phase 3.*—Step on.

2FLA3 *Micro-order 84*

Micro-programme store output at address 84:
```
Phase 1 _____ 1728
Phase 2 _____ 58458
Phase 3 _____  882
```

2FLA3(a) *Phase 1.*—The selected micro-instructions in this phase cause one to be addded to the current main order number in current programme order register (bits 1–16). This register will now hold floating point addition order number 3.

2FLA3(b) *Phase 2.*—The difference between the exponents is transferred in this phase from accumulator 3 to the index registers (bits 1–48). The exponents subsection selection code (OR bits 37–48) is used to prevent modification of the index registers 2 and 3 (bits 17–48) causing the exponent difference $(x-y)$ to be placed in index register 1 (1–16) in the first eight bits.

2FLA(c) *Phase 3.*—Step on.

2FLA4 *Micro-order 85*

Micro-programme store output at address 85:
```
Phase 1 _____ 2418
Phase 2 _____ 88886
Phase 3 _____  862
```

2FLA4(a) *Phase 1.*—The selected micro-instruction in this phase causes the contents of index register bit 1 to be subtracted from the contents of order register bits 13–24. The resultant output of the index processor is monitored and if it is negative toggle TJ7 in FIG. 17 to set under the control of micro-instruction 11/6 (phase 3 of this instruction) at the end of this phase.

2FLA4(b) *Phase 2.*—Micro-instruction 9/6 causes the zeroising of accumulator 3.

2FLA4(c) *Phase 3.*—The selection of micro-instruction 12/2 causes a jump to the micro-order specified by the micro-jump register if toggle TJ7 is set. This by-passes the rest of the addition operations as the difference between the exponents is more than 38 and the forty bit mantissa $b$ requires more than 38 bit shifts down thus reducing it to zero and the exponent requires an equivalent number of shifts up. This indicates that data word $a2^x$ is very much larger than word $b2^y$ and thus $b2^y$ can be ignored. The micro-order specified by the micro-jump register is micro-order 88 and this will be dealt with later.

If the difference between the exponents are less than 38, a step-on to next micro-order is performed.

2FLA5 *Micro-order 86*

Micro-programme store output at address 86:
```
Phase 1 _____ 8383
Phase 2 _____ 81886
Phase 3 _____   882
```

2FLA5(a) *Phase 1.*—The selected micro-instructions 2/3 and 4/3 cause the relevant store to be addressed for a read/rewrite operation at the address in index register 2, the original order 1 store address B.

2FLA5(b) *Phase 2.*—This phase controls the reading of data word B ($b2^y$) from the phase 1 selected store into accumulator 3.

2FLA5(c) *Phase 3.*—Step on.

2FLA6 *Micro-order 87*

Micro-programme store output at address 87:
```
Phase 1 _____ 7251
Phase 2 _____ 88882
Phase 3 _____   853
```

2FLA6(a) *Phase 1.*—The selected micro-instructions in this phase cause one to be subtracted from the exponent difference value in index register 1.

2FLA6(b) *Phase 2.*—Micro-instruction 9/2 causes a one-bit right shift operation of the data word $b2^y$ in accumulator 3 to take place with sign generation. Signal FLP, produced by the set condition of toggle TFL, ensures that the most significant toggle of accumulator 3 remains in its original set or reset condition depending upon the negative or positive sign respectively of the mantissa $b$.

2FLA6(c) *Phase 3.*—Micro-instruction 11/5 allows toggle TJ6 to set, at the end of phase 1, when the index processor bits are not equal to zero. Micro-instruction 12/5 causes a repeat-micro-order operation to take place if toggle TJ6 in FIG. 16 is set or a step on to next micro-order if toggle TJ6 is reset.

When toggle TJ6 is reset this indicates that the mantissa $b$ has been shifted a sufficient number of places to make the exponents $x$ and $y$ equal.

2FLA7 *Micro-order 88*

Micro-programme store output at address 88:
```
Phase 1 _____ 3886
Phase 2 _____ 88486
Phase 3 _____   882
```

2FLA7(a) *Phase 1.*—Micro-instructions 1/3 and 4/6 control the transfer of the contents of order register bits 25–36 to the micro-jump register. This register is only eight bits long, and, therefore, only order register bits 25–32 will be transferred. With reference to the first section of this main-order description it can be seen that order register bits 25–33 contain the binary equivalent of decimal number 81.

2FLA7(b) *Phase 2.*—Micro-instructions 7/4 and 9/6 control the zeroising of bits 1–8 of accumulator 3.

2FLA7(c) *Phase 3.*—Step on.

2FLA8 *Micro-order 89*

Micro-programme store output at address 89:
```
Phase 1 _____ 8185
Phase 2 _____ 88818
Phase 3 _____   882
```

2FLA8(a) *Phase 1.*—Micro-instruction 2/1 together with signal FLP from FIG. 19 causes the wired in mantissa subsection code to be presented to the index processer. Micro-instruction 4/5 controls the overwriting of the mantissa sub-section code into order register bits 37–48.

2FLA8(b) *Phase 2.*—Micro-instruction 8/1 causes the zeroising of accumulator 1 to take place.

2FLA8 *Phase 3.*—Step on.

2FLA9 *Micro-order 90*

Micro-programme store output at address 90:

| | |
|---|---:|
| Phase 1 | 8683 |
| Phase 2 | 81418 |
| Phase 3 | 357 |

2FLA9(a) *Phase 1.*—The selected micro-instructions in this phase cause a read/rewrite operation to take place in the relevant store at store address A (i.e., data word $a2^x$).

2FLA9(b) *Phase 2.*—The selected micro-instruction in the phase allows the mantissa $a$ only of the store output to be placed in accumulator 1.

2FLA9(c) *Phase 3.*—A jump to micro-order 81 is performed in this phase thus ending the floating point addition main order 2.

To recapitulate, this main order 2 has been used to shift mantissa $b$ down so that exponents $x$ and $y$ are equal. The order is ended with mantissa $a$ in accumulator 1 and mantissa $b$ in accumulator 3 and the common exponent in accumulator 2. If the difference between the exponents is larger than 38 this accumulator 3 will be zero as the numerical value of data word $b2^y$ is insignificant compared with data word $a2^x$. The micro-jump to micro-order 81 allows the reassembly of the indexing information into the index register and a jump to floating point addition main order 4 to take place as described in section 1FLA12.

3FLA *Floating point addition main order 3.*—This order is entered from micro-order 76 of main order 1 (section 1FLA7) when it is sensed that exponent $y$ is greater than exponent $x$.

Accumulator 1 contains exponent $x$, accumulator 2 contains exponent $y$ and accumulator 3 contains the exponent difference which is positive.

Index register 1 (bits 1–16) contains zero, index register 2 (bits IR17–32) contains the store address B of the floating point data word ($b2^y$) and index register 3 (bits I.R. 33–48) contains the store address A of data word $a2^x$.

The order word read from the programme store will be of the following format.

Order register bits 1–8—M-address 91.
Bits 9–12—All 0's.
Bits 13–24—Binary representation of decimal number 38.
Bits 25–33—Binary representation of 81.
Bit 34—"1" indicating floating point operation.
Bits 35–36—Both 0's.
Bits 37–48—Binary representation of 96.

The object of this main order is the same as that of floating point addition main order 2, i.e., to arrange the data words with equal exponents.

3FLA1 *Micro-order 91*

Micro-programme store output at address 91:

| | |
|---|---:|
| Phase 1 | 4886 |
| Phase 2 | 8888 |
| Phase 3 | 782 |

3FLA1(a) *Phase 1.*—Micro-instructions 1/4 and 4/6 control the transfer of micro-order address 96 from order register bits 37–48 to the micro-jump register.

3FLA1(b) *Phase 2.*—Idle.

3FLA1(c) *Phase 3.*—Micro-instruction 10/7 causes toggle TFL (in FIG. 19B) to set as shown in expression H1 above. Micro-instruction 12/2 causes a step-on to the next micro-order operation.

3FLA2 *Micro-order 92*

Micro-programme store output at address 92:

| | |
|---|---:|
| Phase 1 | 8585 |
| Phase 2 | 58458 |
| Phase 3 | 882 |

3FLA2(a) *Phase 1.*—The setting of toggle TFL in the previous micro-order together with micro-instructions 2/5 and 4/5 allows the gating in of the system wired in exponent sub-section code into the order register, bits 37–48.

3FLA2(b) *Phase 2.*—The exponent difference ($y-x$) is transferred from accumulator 3 to the index register bits 1–48, however the exponent sub-section code in order register bits 37–48 together with micro-instruction 7/4 and the merge control gates allows only those gates associated with index register bits 1–8 to be opened, thus preserving the store address data in the other bits of the index register.

3FLA2(c) *Phase 3.*—Step on.

3FLA3 *Micro-order 93*

Micro-programme store output at address 93:

| | |
|---|---:|
| Phase 1 | 2418 |
| Phase 2 | 88886 |
| Phase 3 | 862 |

3FLA3(a) *Phase 1.*—The micro-instructions in this phase cause the difference between the exponents to be substracted from 38.

3FLA3(b) *Phase 2.*—Zeroise accumulator 3.

3FLA3(c) *Phase 3.*—The result of the phase 1 operation $(38-(y-x))$ is monitored and if this operation produces a negative result toggle TJ7 in FIG. 17 is set and a jump to micro-order 96 (specified by the micro-jump register) is produced as the numerical value of data word $a2^x$ is so small compared with data word $b2^y$ that it may be considered zero. If toggle TJ7 is not set, a step-on operation is performed.

3FLA4 *Micro-order 94*

Micro-programme store output at address 94:

| | |
|---|---:|
| Phase 1 | 8683 |
| Phase 2 | 81886 |
| Phase 3 | 882 |

3FLA4(a) *Phase 1.*—Micro-instructions 2/6 and 4/3 cause the relevant store to be addressed for a read/rewrite operation at the address in index register 3, the original order 1 store address A.

3FLA4(b) *Phase 2.*—This phase controls the reading of data word A ($a2^x$) from the phase 1 selected store into accumulator 3.

3FLA4(c) *Phase 3.*—Step on.

3FLA5 *Micro-order 95*

Micro-programme store output at address 95:

| | |
|---|---:|
| Phase 1 | 7251 |
| Phase 2 | 88882 |
| Phase 3 | 853 |

3FLA5(a) *Phase 1.*—One is subtracted from the exponent difference ($y-x$) in index register 1 in this phase.

3FLA5(b) *Phase 2.*—A one bit shift down (right) with sign generation is performed in the phase on accumulator 3 which is storing the data word $a2^x$. The sign generation is controlled as in section 2FLA6(b) above by signal FLP.

3FLA5(c) *Phase 3.*—A test for index processer output equal to zero is performed in this phase using toggle TJ6. If it is not zero a repeat micro-order operation is performed; if it is zero a step-on operation ensues.

The repeat micro-order loop will continue until mantissa $a$ has been shifted down sufficiently to cause coincidence between the exponent values.

3FLA6 *Micro-order 96*

Micro-programme store output at address 96:

| | |
|---|---:|
| Phase 1 | 8185 |
| Phase 2 | 58818 |
| Phase 3 | 882 |

3FLA6(a) *Phase 1.*—This phase controls the over writing of the gated-in mantissa sub-section code (micro-instruction 2/1 and signal FLP) to order register bits 37–48.

3FLA6(b) *Phase 2.*—This phase controls the transfer of the shifted down data word $a2^x$ from accumulator 3 to accumulator 1.

3FLA6(c) *Phase 3.*—Step on.

3FLA7 *Micro-order 97*

Micro-programme store output at address 97:

| | |
|---|---|
| Phase 1 | 3886 |
| Phase 2 | 88886 |
| Phase 3 | 882 |

3FLA7(a) *Phase 1.*—This phase controls the transfer of M-address 81 from order register bits 25–33 to the micro-jump register.

3FLA7(b) *Phase 2.*—Accumulator 3 is zeroised in this phase.

3FLA7(c) *Phase 3.*—Step on.

3FLA8 *Micro-order 98*

Micro-programme store output at address 98:

| | |
|---|---|
| Phase 1 | 8383 |
| Phase 2 | 81486 |
| Phase 3 | 357 |

3FLA8(a) *Phase 1.*—The selected micro-instructions in this phase cause a read/rewrite operation to take place in the relevant store at store address B (i.e., data word $b2^y$).

3FLA8(b) *Phase 2.*—This phase controls the reading of the mantissa only of the output of the selected store into accumulator 3.

3FLA8(c) *Phase 3.*—A jump to micro-order 81 in floating point addition main-order 1 (see section 1FLA12) is performed in this phase. This ends the floating point addition main order 3.

At the end of this order the mantissa $a$ is in accumulator 1, the mantissa $b$ is in accumulator 3 and the common exponent is in accumulator 2.

4FLA *Floating point addition main order 4.*—This order is entered from micro-instruction 81 in all cases and with the exponents of the two data words equal except when one data word is very much larger (greater than $2^{38}$ times) than the other, then the smaller data word is zero. The purpose of this order is to perform the actual addition function.

Accumulator 1 contains the mantissa $a$ accumulator 3 the mantissa $b$ and accumulator 2 the common exponent.

The order word read from the programme store will be of the following form:

Order register bits 1–8—M-address 99.
Bits 9 and 10—Indexing bits.
Bits 11 and 12—Both 0's.
Bits 13–24—Binary representation of decimal 101.
Bits 25–36—All 0's except bit 34 (F.L.P. indication).
Bits 37–48—Exponent sub-section code 110000000000.

4FLA1 *Micro-order 99*

Micro-programme store output at address 99:

| | |
|---|---|
| Phase 1 | 2886 |
| Phase 2 | 36818 |
| Phase 3 | 842 |

4FLA1(a) *Phase 1.*—Micro-instructions 1/2 and 4/6 cause M-address 101 to be set into the micro-jump register.

4FLA1(b) *Phase 2.*—The selected micro-instructions in this phase cause the addition of mantissa $a$ and $b$ to take place the resultant sum being placed in accumulator 1.

4FLA1(c) *Phase 3.*—A test for overflow is performed in this phase using the additional logic in FIGS. 19A and 19B. Toggle TOF will be set if overflow occurs.

$$\overline{TSC}.OF1 - G112 - G109.GOFC - TOF \quad (H2)$$

The production of signal $\overline{OFT/SC}$ allows gate G11/4 to open in FIG. 17 causing a fulfilled jump condition.

Micro-instruction 12/2 causes a micro-jump to micro-order 101 (the micro-jump register stored number) when overflow occurs or a step-on to next micro-order when overflow does not occur.

4FLA2 *Micro-order 100*

Micro-programme store output at address 100:

| | |
|---|---|
| Phase 1 | 1728 |
| Phase 2 | 48418 |
| Phase 3 | 881 |

4FLA2(a) *Phase 1.*—One is added to the current main order number in index register 4 in this phase.

4FLA2(b) *Phase 2.*—The common exponent stored in accumulator 2 is overwritten into accumulator 1 in subsections 1 and 2 using the exponent subsection code in order register bits 37–48 and micro-instruction 7/4 to control the merge control gates GMC1–12 in FIGS. 15B and 16B.

4FLA2(c) *Phase 3.*—Select next main order. This will be the next but one main order in the current computer programme due to the phase 1 operation performed in this micro-order. Hence floating point addition main order 5 is by-passed as overflow has not occurred in the addition operation. The resultant floating point word is stored in accumulator 1.

4FLA3 *Micro-order 101.*—This micro-order is entered from micro-order 99 if overflow occurs and is used to gain access to floating point main order 5.

Micro-programme store output at address 101:

| | |
|---|---|
| Phase 1 | 8888 |
| Phase 2 | 36828 |
| Phase 3 | 881 |

4FLA3(a) *Phase 1.*—Idle.

4FLA3(b) *Phase 2.*—An addition of the mantissas $a$ and $b$ is performed in this phase and the resultant is over written into accumulator 1 with an inherent one bit shift down.

4FLA3(c) *Phase 3.*—Select next main order. This will be main order 5 of the floating point addition orders as phase 1 of this micro-order is idle.

5FLA *Floating point addition main order 5.*—This order is entered from micro-order 101 when overflow of the resultant mantissa has been sensed.

The object of this order is to rescale the resultant if possible or stop the programme and indicate to the programmer that the data words used in the addition operation must be recalled.

The order word read from the programme store will be of the following form:

Order register bits 1–8—M-address decimal 102.
Bits 9 and 10—Indexing bits.
Bits 11 and 12—Both 0's.
Bits 13–24—Address of fault indicating interrupt order.
Bits 25–33—Binary representation of decimal 104.
Bit 34—"1" indicating floating point.
Bits 35 and 36—Both 0's.
Bits 37–48—Exponent subsection code 110000000000.

Accumulator 3 contains mantissa $b$, accumulator 2 contains the common exponent and accumulator 1 contains the resultant mantissa shifted down one place.

5FLA1 *Micro-order 102*

Micro-programme store output at address 102:

| | |
|---|---|
| Phase 1 | 3886 |
| Phase 2 | 48168 |
| Phase 3 | 742 |

5FLA1(a) *Phase 1.*—A transfer of M-address 104 order register bits 25–33 to the micro-jump register is performed in this phase.

5FLA1(b) *Phase 2.*—An addition of one to the exponent in accumulator 2 is performed in this phase to compensate for the overflow condition sensed in the previous order and the one bit shift down applied to the resultant mantissa.

5FLA1(c) *Phase 3.*—Overflow is again sensed from this phase with respect to the exponent and, if overflow has occurred a jump to micro-order 104 is performed. If overflow of the exponent has not occurred a step on operation is performed.

5FLA2 *Micro-order 103*

Micro-programme store output at address 103:

| Phase | |
|---|---|
| Phase 1 | 8888 |
| Phase 2 | 48418 |
| Phase 3 | 881 |

5FLA2(a) *Phase 1.*—Idle.

5FLA2(b) *Phase 2.*—The corrected exponent is added into accumulator 1 in this phase to form the overflow corrected resultant.

5FLA2(c) *Phase 3.*—Select next main order. The next main order selected will be the same as that selected by micro-order 100 of the previous floating point addition main order.

5FLA3 *Micro-order 104.*—This micro-order is entered when exponent overflow has occurred after the correction operation of micro-order 102.

Micro-programme store output at address 104:

| Phase | |
|---|---|
| Phase 1 | 2721 |
| Phase 2 | 8888 |
| Phase 3 | 881 |

5FLA3(a) *Phase 1.*—This phase micro-instruction controls the overwriting of the fault interrupt main order address mius one from order register bits 13–14 into index register 4.

5FLA3(b) *Phase 2.*—Idle.

5FLA3(c) *Phase 3.*—Select next main order (i.e., the fault interrupt main order).

The end of this main order or main order 4 according to the overflow conditions ends the main order routine for floating point addition.

FLS *Floating point subtraction.*—Main orders 1, 2 and 3 together with main order 5 for this operation will be identical to those shown above for the addition process. Main order 4 obviously differs as a subtraction between the floating point data words as required.

4FLS *Floating point subtraction main order 4.*—This order is entered from micro-instruction 81 of main order 1 in all cases and with the exponents of the two data words equal except when one data word is very much larger, greater than $2^{38}$ times, than the other then the smaller data word is zero. The purpose of this order is to perform the actual subtraction function.

Upon entry into this order, accumulator 1 contains mantissa $a$, accumulator 3 contains mantissa $b$ and accumulator 2 the common exponent.

The only difference between this main order and the main order 4 for addition is the subtraction operation which is controlled by the additional selection of micro instruction 7/3 in micro-orders 105 and 107 which are otherwise directly equatable to micro-orders 99 and 101. No description will be given, therefore, of these micro-orders, the following table showing the micro-instruction used.

| M-address | Phase 1 | Phase 2 | Phase 3 |
|---|---|---|---|
| 105 | 2886 | 36318 | 842 |
| 106 | 1728 | 48418 | 881 |
| 107 | 8888 | 36328 | 881 |

XIV. FLM FLOATING POINT MULTIPLICATION

This arithmetic process requires four main orders the first of which deals with the extraction from store of the mantissas $a$ and $b$. The second main order deals with the multiplication of the two mantissas. The third main order extracts the exponents $x$ and $y$ from store and the fourth main order deals with the forming of the resultant exponent and overflow correction and detection.

1FLM *Floating point multiplication main order 1.*—This main order will be three micro-orders long and they will perform a similar function to micro-orders 50–52 described in sections M1–3 previously. The mantissa subsection code is required, however, to allow only the mantissa passage to the accumulators.

The main order read from the programme store will be of the following form.

Order register bits 1–8—M-address 108.
Bits 9 and 10—Indexing bits.
Bits 11 and 12—Store Selection bits.
Bits 13–24—Store address A (multiplier).
Bits 25–36—Store address B (multiplicand).
Bits 37–48—Mantissa sub-section code.

The micro-instruction produced for each micro order in the routine are shown in the table below.

| Micro-order | Micro Instructions | | |
|---|---|---|---|
| | Phase 1 | Phase 2 | Phase 3 |
| 108 | 8888 | 88814 | 882 |
| 109 | 2883 | 81418 | 882 |
| 110 | 3883 | 81468 | 881 |

At the end of this order mantissa $a$ will be in accumulator 1 and mantissa $b$ will be in accumulator 3.

2FLM *Floating point multiplication main order 2.*—This main order controls a simple multiplication process using the floating point data word mantissas as operands. This operation is the same as the fixed point multiplication and may, therefore, use micro-orders 52–57 as described in section M3 to M8 previously. The main order simply specifies M address 52, the multiplication code and an iteration count of 48. The mantissa product will be in accumulator 1 at the end of the process.

3FLM *Floating point multiplication main order 3.*—This main order will employ three micro-orders and they perform a similar function to those used in floating point multiplication main order 1. The exponents subsection code is required, however, to allow only the exponents passage to the accumulators. Accumulators 2 and 3 are used for the exponents.

The main order read from the programme store is similar to that used for main order 1 the difference being in the M-address and in order register bits 37–48. These bits will hold the M-address 111 and the exponent subsection code respectively in main-order 3.

The micro-instructions produced for each micro-order in the routine are shown in the table below.

| Micro-order | Micro-instructions | | |
|---|---|---|---|
| | Phase 1 | Phase 2 | Phase 3 |
| 111 | 8888 | 88866 | 882 |
| 112 | 2883 | 81486 | 882 |
| 113 | 3883 | 81468 | 881 |

At the end of this order exponent $x$ will be in accumulator 3 and exponent $y$ will be in accumulator 2.

4FLM *Floating point multiplication main order 4.*—This main order is concerned with the forming of the resultant exponent.

The order when read from the programme store will be of the following form:

Order register bits 1–8—M-address 114.
Bits 9–12—Indexing and store selection bits.
Bits 13–24—Address of fault indicating interrupt order.
Bits 25–30—M-address 116.
Bits 31–33—Code 110 the division code.
Bits 34—"1" to indicate floating point.
Bits 35 and 36—Both zero.
Bits 37–48—The exponent sub-section code 110000000000.

4FLM1 *Micro-order 114*

Micro-programme store output at address 114:

| | |
|---|---:|
| Phase 1 | 8888 |
| Phase 2 | 58386 |
| Phase 3 | 782 |

4FLM1(a) *Phase 1.*—Idle.

4FLM1(b) *Phase 2.*—This phase is used to provide for off-set exponent correction. The exponent of a floating point number is in the decimal range 0 to 256 (8 bit binary exponent number using a weight of 128). Thus the system is organised so that the programmer is effectively allowed an exponent range of −128 to +128. To find the true exponent value, 128 must, therefore, be subtracted from the sum of the exponents. Obviously it suffices to subtract 128 from one exponent only before they are added. This operation is performed in this phase. Micro-instruction 5/5 controls the transfer of exponent $x$ from accumulator 3 to the arithmetic processer operand input. Signal C128 produced in FIG. 19A from gate C120 controls the gating of the wired in binary equivalent of decimal number 128 to the operator input of the arithmetic processer. The division code was specified by order register bits 31-33. This causes toggle TD to set together with toggle TFL to generate signal C128.

Micro-instruction 7/3 causes 128 to be subtracted from exponent $x$ and the resultant placed in accumulator 3.

4FLM2 *Micro-order 115*

Micro-programme store output at address 115:

| | |
|---|---:|
| Phase 1 | 3886 |
| Phase 2 | 55418 |
| Phase 3 | 847 |

4FLM2(a) *Phase 1.*—This phase controls the transfer of M-address 116 from order-register bits 25-30 to the micro-jump register.

4FLM2(b) *Phase 2.*—The two exponents are added in the phase and the resultant exponent is added in to accumulator 1 to form the resultant exponent and mantissa, control being exercised by the exponent sub-section code (order register bits 37-48).

4FLM2(c) *Phase 3.*—If overflow occurs a jump to the micro-order specified by micro-jump register is performed in this phase, or if no overflow occurs a select next main order operation is performed.

This ends the floating point multiplication operation the resultant being formed in accumulator 1. Micro-instruction 116 which is included in this main order routine is used to jump to an order which will stop the computer and indicate to the programmer that the data words require rescaling. The main order address in order register bits 13-24 is used for this operation and the output from the micro-programme store at address 116 will be:

| | |
|---|---:|
| Phase 1 | 2721 |
| Phase 2 | 88888 |
| Phase 3 | 881 |

XV. FLD FLOATING POINT DIVISION

This process is performed by five main orders and it is necessary for the division to be in standard form. The first main order deals with the extraction of the mantissas $a$ and $b$ from store. The second main order causes a one bit shift down (right) to be performed on mantissa $b$, the divisor. The third main order deals with the actual division of the mantissas $(a-b)$. The fourth main order deals with the forming of the resulant exponents.

1FLD *Floating point division main-order 1.*—This main order is of the same form as main-order 1 for floating point multiplication (see section 1FLM) and micro-orders 108-110 will be used. Order register bits 13-24 specify the store address of the dividend and order register bits 25-36 specify the store address of the divisor. The mantissa sub-section code is again written into order register bits 37-48. At the end of this main order the divisor mantissa $b$ will be in accumulator 2 and the dividend mantissa $a$ will be in accumulator 1.

2FLD *Floating point division main-order 2.*—This main order is only one micro-order long and this micro-order causes a one bit right shift to be performed on the dividend mantissa $a$ in accumulator 1.

The main order will be of the following form when read from the programme store:

Order register bits 1-8—M-address 117.
Bit 25—"1."
All other order register bits 0.

2 FLD1 *Micro-order 117*

Micro-programme store output at address 117:

| | |
|---|---:|
| Phase 1 | 3741 |
| Phase 2 | 38828 |
| Phase 3 | 354 |

2FLD1(a) *Phase 1.*—The selected micro-instructions in this phase cause 1 to be subtracted from the contents of order-register bits 25-36 and the result of this subtraction is placed back in order register bits 25-36. The decimal value of bits 25-36 of the order-register was one so that this phase 1 operation causes zero to be written back into these bits.

2FLD1(b) *Phase 2.*—Micro-instructions 5/3 and 8/2 cause the contents of accumulator 1 (mantissa $a$) to be circulated through the arithmetic processer and back to accumulator 1 with an inherent one bit right shift. This ensures that the mantissa of the dividend is smaller than the divisor as the divisor is in standard form.

2FLD1(c) *Phase 3.*—Micro-instructions 10/3 and 11/5 allow toggles TJ1 (FIG. 15A) and/or TJ6 (FIG. 16A) to set if the output of the index processer is not zero. Micro-instruction 12/4 allows a repeat micro-order operation to take place if either or both of these toggles are set. If, as is the case after the phase 1 operation, neither of these jump test toggles are set a select next main order operation is performed.

3FLD *Floating point division main order 3.*—The operations required to perform this main order are simply a normal division operation using the mantissas $a$ and $b$ as the dividend and divisor respectively. The division is performed by using micro-orders 22-27 (see sections D1-D6 inclusive). At the end of the division process the quotient mantissa will be in accumulator 1.

4FLD *Floating point division main order 4.*—This order deals with the extraction of the exponents from store and it uses the same micro-orders as used in floating point multiplication main order 3. The data word store addresses are specified by order register bits 13-24 and 25-36 respectively. The exponent sub-section code is specified by bits 37-48 and the M-address will be 141.

At the end of the order exponent $x$ will be in accumulator 3 and exponent $y$ in accumulator 2.

5FLD *Floating point division main-order 5.*—This order when read from the programme store will be of the following form:

Order register bits 1-8—M-address 118.
Bits 9 and 10—Indexing bits.
Bits 11 and 12—Store selection bits.
Bits 13-24—Address of fault indicating interrupt orders.
Bits 25-30—M-address 116.
Bits 31-33—Code 110 (the division code).
Bit 34—"1" To indicate floating point.
Bits 35-36—Both zero.
Bits 37-48—The exponent sub-section code.

5FLD1 *Micro-order 118*

Micro-programme store output at address 118:

| | |
|---|---:|
| Phase 1 | 8888 |
| Phase 2 | 16186 |
| Phase 3 | 782 |

5FLD(a) *Phase 1.*—Idle.

5FLD(b) *Phase 2.*—This phase is used to provide for off-set exponents correction and entails the addition of 128 to the exponent $x$ in accumulator 3. Gate G120 FIG. 19A is again opened to generate signal C128 which controls the feeding of number 128 to the arithmetic processer.

5FLD1(c) *Phase 3.*—Set arithmetic and step on.

5FLD1 *Micro-instructions 119*

Micro-programme store output at address 119:

| | |
|---|---|
| Phase 1 | 8888 |
| Phase 2 | 55386 |
| Phase 3 | 882 |

5FLD2(a) *Phase 1.*—Idle.

5FLD2(b) *Phase 2.*—The two exponents are subtracted in this phase $(x+128) - y$ and the resultant exponent placed in accumulator 3.

5FLD2(c) *Phase 3.*—Step on.

5FLD3 *Micro-order 120*

Micro-programme store output at address 120:

| | |
|---|---|
| Phase 1 | 3886 |
| Phase 2 | 58418 |
| Phase 3 | 847 |

5FLD3(a) *Phase 1.*—This phase controls the transfer of M-address 116 from order register bits 25-30 to the micro-jump register.

5FLD3(b) *Phase 2.*—This phase controls the adding of the resultant exponent into accumulator 1 to form the resultant quotient of the floating point division. The exponent sub-section code is used in this process.

5FLD3(c) *Phase 3.*—If overflow occurs a jump to the micro-order specified by the micro-jump register is performed or if no overflow occurs a select next main order operation is performed.

This ends the floating point division operations, the resultant quotient being formed in accumulator 1. Micro-instruction 116 is included in this order, as it was in floating point multiplication main order 4 (see section 4FLM2(c)), to stop the computer and indicate to the programmer that rescaling is required.

This ends a typical set of orders for arithmetic calculations. The following table shows the use of the micro-orders described above.

*Micro-programme store allocation*

| Address (decimal) | Process |
|---|---|
| 000 | Select next main order. |
| 01–09 | Addition (fixed point). |
| 10–19 | Subtraction (fixed point). |
| 20–27 | Division. |
| 30–34 | Square root (—″—). |
| 50–51 | Multiplication. |
| 60–66 | Standardisation. |
| 70–104 | Addition (floating point). |
| 105–107 | Subtraction (floating point). |
| 108–116 | Multiplication (floating point). |
| 117 | Right shift accumulator 2. |
| 118–120 | Division (floating point). |

Obviously, changes may be made in the actual format of micro-orders within each order and it will be obvious to those skilled in the art that modifications may be made to the actual orders performed. The addition of any further arithmetic orders (for example, round-off) may simply be performed by assigning extra micro-programme addresses for the start of additional routines and the required strapping of the outputs of the store performed in the strapping field SF in the micro-programme store shown in FIG. 3.

The addition of extra main orders may also be accomplished to perform logical operations, e.g., shift operations, main order jump operations, fault indicating interrupt operations etc. Two such logical operation orders are merging and rotations.

XVI. MG MERGING

Micro-instructions 11/1 and 11/2 allow merging of ones or noughts into any of the sub-sections to take place into any of the registers, under the control of order register bits 37–38.

XVII. R ROTATION

Micro-instruction 9/7 allows the rotation of accumulator 3 by $2^{24}$ and by use of such micro-instructions as 8/4 and 9/5 sub-section rotation may be performed again with sub-section isolation, under control of order register bits 37–48, if required.

It was mentioned previously that the computer is particularly applicable for use within an integrated data processing system of the type disclosed in our copending application No. 21,877, 1963. The computer must, therefore, be capable of extending demands to the random data highway control equipment together with message orders for the control of the exchange of data over the random data highway.

XVIII. H. HIGHWAY OPERATION

The operations are performed under the control of logical operations (FIGS. 20–22) and micro-orders to allow the asynchronous computer to be associated with a synchronous system.

The computer either sends data to or receives data from other equipments as directed by the data highway control. Four different types of data transfer are accommodated within the random data highway operation and these are as follows:

(a) 36 bit sections of data to be sent or received, the transfers being initiated by the computer.

(b) 24 bit sections of data to be sent or received, the transfers being initiated by the computer.

(c) 36 bit sections of data to be sent or received, the transfers being initiated by other equipments.

(d) 24 bit sections of data to be sent or received, the transfers being initiated by other equipments.

In the case of (a) and (b) the computer is in the active state and in the case of (c) and (d) the computer is in the idle state. In all cases upon the completion of a highway message the computer will select the next main order.

XIX. RH—RANDOM DATA HIGHWAY OPERATIONS

Two types of highway are provided, a clock highway and a random data highway. The following description will be concentrated on the random data highway arrangement there being three such random highways in a projected system.

XX. RHO—COMPUTER ORIGINATED RANDOM DATA HIGHWAY OPERATION

Consideration will firstly be given to case (a) above (i.e., a random data highway transfer is required initiated by the computer under consideration).

The computer programme at some stage will contain a random data highway message main order and this will be of the following form.

Order register bits 1–8—M-address 130.
Bits 9–12—Indexing and store selection bits.
Bits 13–24—Main order address for clock highway operation.
Bits 25–34—All 0's.
Bits 35 and 36—Both 1's.
Bits 37–48—Store address of message order.

The basic operation of the random data highway system is to receive a "message demand" signal from a calling computer, allocate this demand to one of the three highways cause the transmission of the message order from the calling computer to the highway control and control the direction of the required transfers over the allocated highway. The message order contains basic information on the required other equipment and library addressing information to obtain further control data for the message transfers. The store locations subsequent to the message order are arranged to store the information concerned in the required transfer.

ARHO1 *Micro-instruction 130*

Micro-programme store output at address 130:

| | |
|---|---|
| Phase 1 | 4771 |
| Phase 2 | 87888 |
| Phase 3 | 685 |

ARHO1(a) *Phase 1.*—The selected micro-instructions in this phase cause one to be subtracted from the message order address and the resultant to be placed in index register 3. The significance of this operation will be appreciated later.

ARHO1(b) *Phase 2.*—The selection of micro-instruction 6/7 allows the gating in of the clock highway interrupt bit into bit 1 if this interrupt is present. It will be assumed that this interrupt is not present.

ARHO1(c) *Phase 3.*—A test of the clock highway interrupt bit is performed in this phase and a jump to the main order for the clock highway is performed if it is present. Otherwise a step on operation is performed.

ARHO2 *Micro-order 131*

Micro-programme store output at address 131:

| | |
|---|---|
| Phase 1 | 1721 |
| Phase 2 | 88886 |
| Phase 3 | 882 |

ARHO2(a) *Phase 1.*—One is subtracted from the current main-order number in the current programme order store PCR in this phase.

ARHO2(b) *Phase 2.*—Accumulator 3 is zeroised.

ARHO2(c) *Phase 3.*—Step on.

ARHO3 *Micro-order 132*

Micro-programme store output at address 132:

| | |
|---|---|
| Phase 1 | 7672 |
| Phase 2 | 81581 |
| Phase 3 | 843 |

ARHO3(a) *Phase 1.*—The selected micro-instructions in this phase cause one to be added to the contents of index register 3 to reform the message order address. A store read operation takes place in this phase to read the message order. The production of signal W'1'A3.6, which causes one to be written into bit 6 of accumulator 3 is also generated at this time. The significance of this operation will be appreciated later.

ARHO3(b) *Phase 2.*—The highway control logic shown in FIGS. 20–22 is employed to control the progress of this phase.

It was mentioned above that order register bits 35 and 36 will be 1's and this allows the random data highway active toggle THWA to be set by the selection of micro-instruction 7/5 at time period T20.

$$\overline{7/5.6/2} - \overline{GR1} - THWA \quad \text{(R1)}$$

The setting of toggle THWA allows the generation of a demand signal to take place under the control of the random data highway system clock. This clock is operated on a one address principle (i.e., order and action beats). These beats are of equal time durations and for example may be 10 micro-seconds each. Thus a complete cycle takes 20 micro-seconds. Obviously the computer must be synchronised to this clock cycle and, therefore, a number of circuits in FIGS. 20–22 are controlled by timing pulses produced by the circuit arrangements shown in FIG. 23A.

In FIG. 23A signal AB is the random data highway control equipment "action beat" and signal TEM is a pulse of 12 micro-seconds duration between micro-seconds 4 and 16 of the clock cycle. A timing diagram is given in FIG. 23B showing the relationship between the highway equipment clock cycles, signals AB and TEM, and the timing signals T5, T17, T20 and TE used in the computer highway control equipment FIGS. 20–23A.

Timing signal T20 and its complementary signal $\overline{T20}$ is generated constantly. The start of each action beat period (signified by the positive-going change of signal level on lead AB), after inversion by gate GT1, causes gate GT2 to open and produce the positive-going edge of signal $\overline{T20}$ and (via inverter GT4), T20. The negative-going edge of the output of gate GT1 is applied to delay line DT1 to close gate GT2 (via gate GT3) after a 250-nano-seconds delay.

The remaining timing signals are produced only in response to the highway control logic being taken into use. Gate GT5 is closed by the reset side of one of the highway indicating toggles THWI, THWA or THC when set. The closure of gate GT5 allows gate GT6 to open for the duration of the TEM pulse from the highway control equipment. This pulse is of twelve micro-seconds duration starting four micro-seconds after the start of an action beat period (AB). The positive, or "0" state going edge, output from gate GT6 is inverted by gate GT7 and applied to set toggle TT (via gate GT8) and to delay line DT2. This delay line has a delay duration of 250 nano-seconds and its "1" state going edge is used to reset toggle TT after inversion by gate GT9. Thus toggle TT is set for a duration of 250 nano-seconds after the start of the TEM pulse. Delays will be experienced through the various gating elements, and, therefore this toggle generated pulse does not start in synchronism with signal TEM. The output of toggle TT is used as the T5 pulse. Signal TE is a replica of signal TEM and is only produced when gate GT5 is closed.

At the end of the TEM pulse gate GT10 is opened and this gate will remain opened for a 250 nano-second duration determined by delay line DT2. The output of gate GT10 is inverted by gate GT11 and used to produce timing signal T17.

The setting of toggle THWA (see expression R1 above), allows the opening of gate GR2 in FIG. 21 to produce the message demand signal MD.

$$TE.THWA(a).\underline{GSEA}.\overline{TAL(b)}.7/5 - GR2 - \underline{GR3}$$
$$-GR4 - MD \quad \text{(R2)}$$

The demand signal MD is extended to the highway control equipment and the highway allocation process takes place.

Toggle TMD is reset at the end of time T5 and set at the end of time T17 to control the timing configuration of the message demand.

Figure 9:
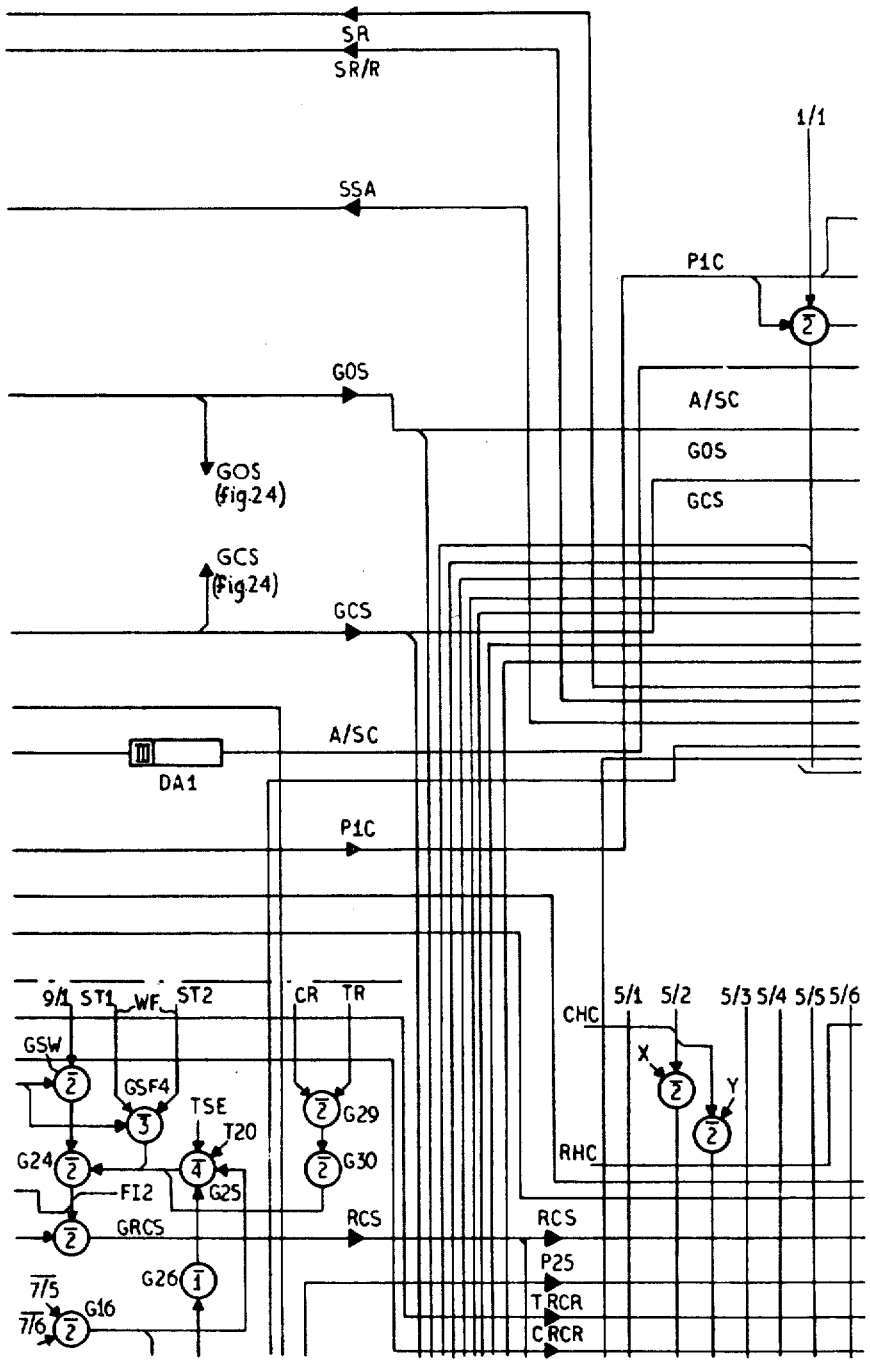
Figure 10A:
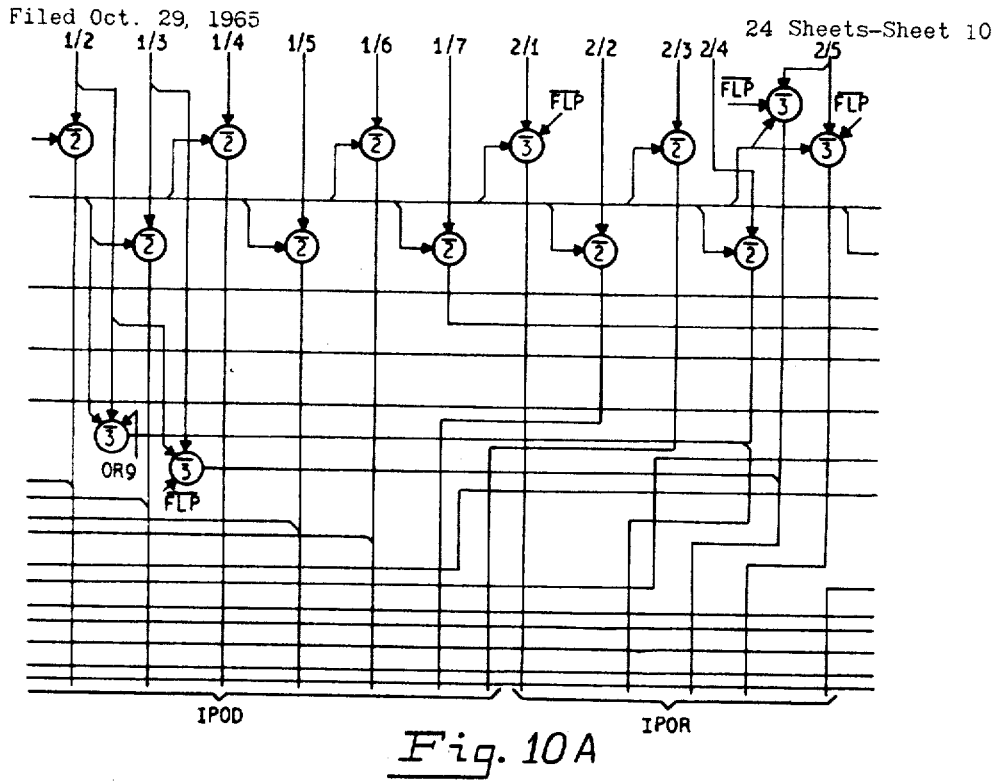
Figure 10B:
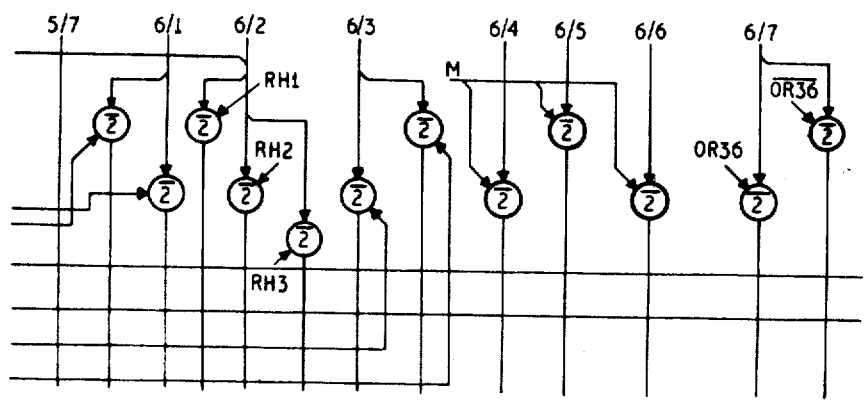
Figure 11A:
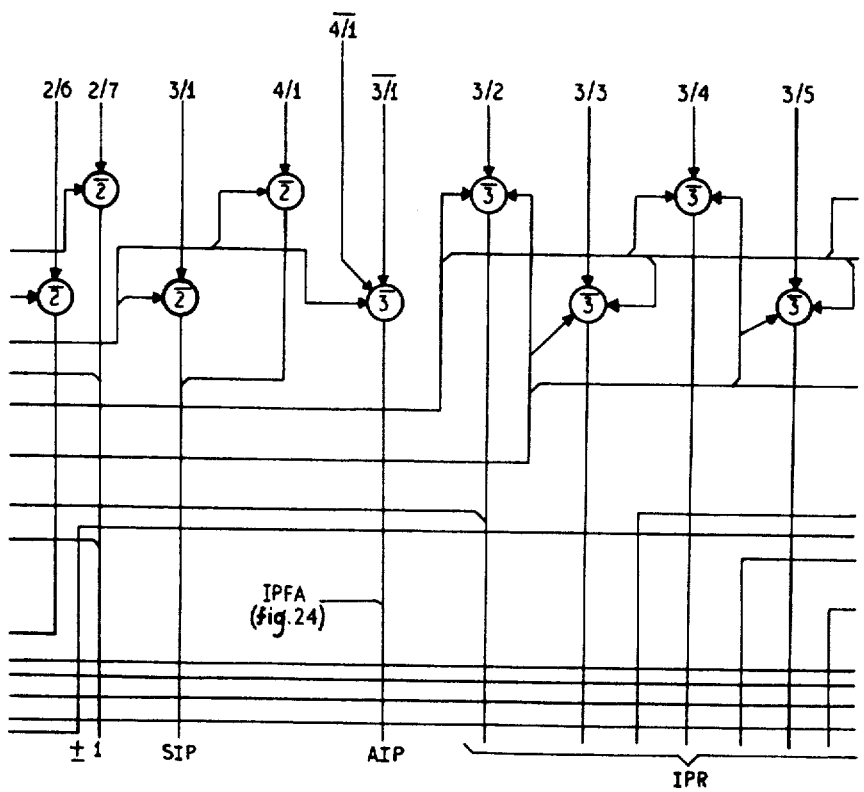
Figure 11B:
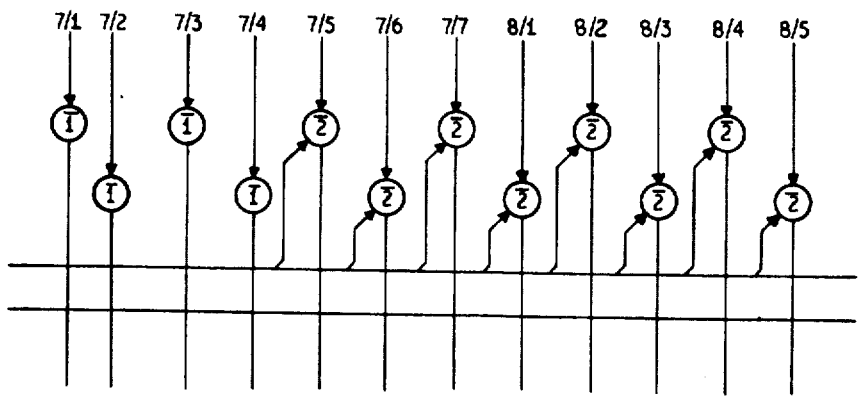
Figure 12A:
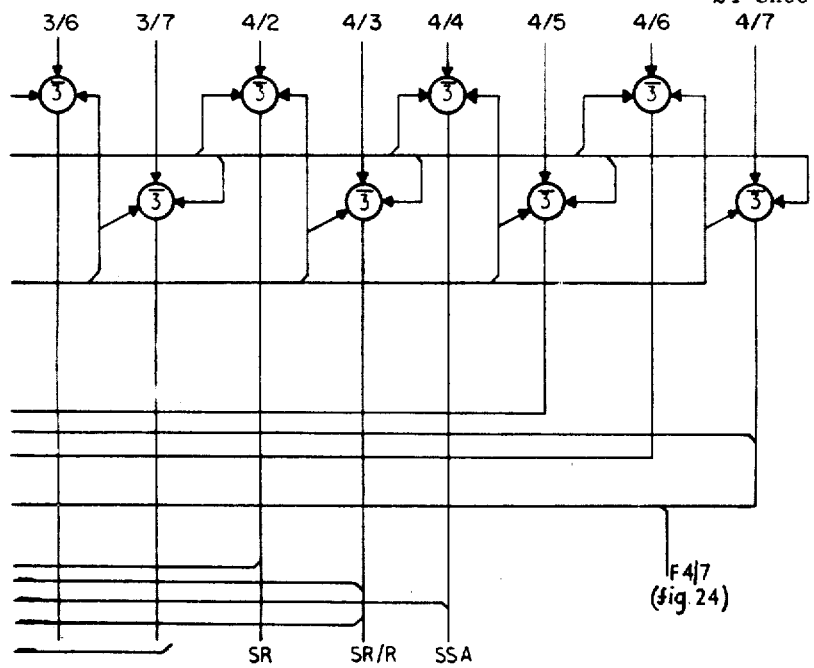
Figure 12B:
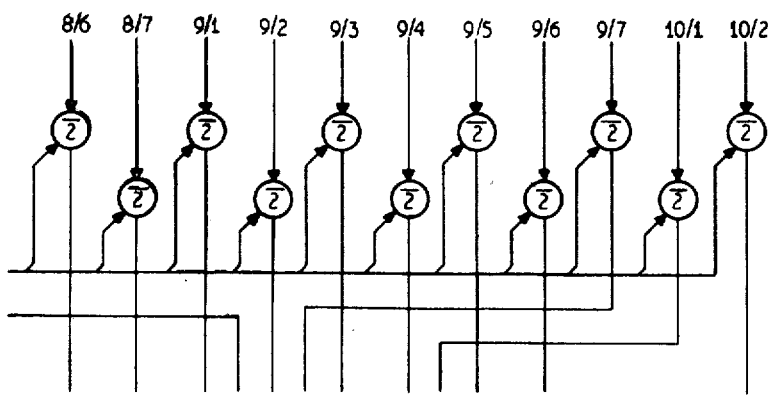

The selection of micro-instruction 7/5 closes gate G16 in FIG. 9 causing the setting of the highway synchronisation toggle THC FIG. 13 to be made dependent upon gate G15 in FIG. 14. Signal MHI (FIG. 14) will be in the "0" state at this time, as neither of micro-instruction 6/2 and 5/2 are selected. The control equipment waits until the SE (sender equipment) code which corresponds to the system number of the calling computer is extended from the highway control equipment. This operation indicates that the computer has been allocated a highway and a "0" state indication will be provided on the relevant one of the leads SE to allow the setting of one of the highway allocated toggles TH1–3 (FIGS. 20 and 21) at the end of the current timing signal T5. Assuming random data highway 2 has been allocated, toggle TH2 will be set. The setting of toggle TH2 inhibits the set side input gates of toggles TH1 and TH3.

The reception of the SE signal also causes the closure of gate GSE. The closing of gate GSE allows the setting of the TSE toggle and the TAL toggle in FIG. 21 at the end of timing signal T5.

$$\underline{GSE}.THWA(a) - GSEA - \underline{GSSE} - SSE \quad \text{(R3)}$$
$$-\underline{GSSE}.T5 - TSE \quad \text{(R4)}$$
$$-\underline{GAL}.T5 - TAL \quad \text{(R5)}$$

The production of signal SSE at this stage allows the setting of toggle THC in the control unit (FIG. 13) under the control of the T5 timing pulse on gate G15. The opening of gate GSEA in FIG. 20 also terminates the message demand signal at time T17 allowing toggle TMD to remain set. The arithmetic processor, therefore, passes the message order read from the store to the selected random data highway.

The setting of toggle TSE causes a "forced overflow/size comparison" toggle set condition to be generated by gate G74 in FIG. 17 of the control unit. This toggle TSE when set, also controls the generation of the select signal SLS at the end of this phase for the relevant highway. This SLS signal gates the message order into the control equipment.

$$TSE(a).\overline{TP2(b)}.7/5 - GR6 - \underline{GR7}.TH2(a) - GSL2 \quad (R6)$$

ARHO3 (c) *Phase 3.*—The selection of micro-instruction 11/4 allows a repeat-micro order operation to be performed as an overflow/size comparison condition has been "forced" due to the setting of toggle TSE. The generation of a repeat-micro-order condition, signal RM–O, causes the reset of toggle TSE at the end of this phase.

At the end of this phase micro-order 132 is repeated, however, toggles THWA, MAL, TMD and TH2 remain set.

ARHO3/1(a) *Phase 1 of Micro-order 132 repeat.*—The operations in this phase are the same as those shown in section RHO3(a). Store address $X+1$ will be formed in this phase, where address X is the address of the message order.

ARHO3/1(b) *Phase 2 of repeated micro-order 132.*—The highway control logic of FIGS. 20–22 is again used to control the execution of this phase.

The computer is awaiting the extension of the RE or SE code from the highway control equipment for the control of the first data message transfer. If no such code is extended in the order beat period a forced right shift operation is performed on accumulator 3.

$$GAL - \underline{GR8}.TAL(a).\overline{TMS}(b).THWA(a).T5$$
$$-GR9 - F9/2 \quad (R6a)$$

ARHO3/1(bi) *No RE or SE code received.*—This operation will be repeated for each succeeding unemployed order beat period until the "1" written into bit 6 of accumulator 3, in the first phase 1 operation of micro-order 132, is shifted into the bit 1 position. This will occur 100 micro-seconds after the original demand signal was extended, and is indicated by a "1" state signal $A3B1=1$. The sensing of this condition causes the computer to clear down and start the set-up of a demand over again.

$$\overline{TMS}(b).A3B1 = 1 - GR10 - \underline{GR11}.T17 - TRD \quad (R7)$$

The setting of toggle TRD, the redemand required toggle, causes a signal FJ to be produced which after inversion (not shown) causes a "1" state signal on lead IP–for use in setting toggle TJ7 in FIG. 17 in a subsequent micro-order. Phase two is also ended and phase 3 started, by the setting of this toggle TRD and the generation of signal P3SH.

$$7/5 - \underline{GR12}.TRD(a) - GR13 - \underline{GR14}.TP2(a)$$
$$-GR15 - P3SH \quad (R8)$$

Signal P3SH causes toggle TP2 to be reset in FIG. 13 and toggle TP3 to set in FIG. 13 to start phase 3. The operation of phase 3 will be discussed later.

ARHO3/1(bii) *SE code received from highway.*—When the calling computer's message order specifies another equipment to which data is to be transferred, the highway control equipment extends the SE code of the computer. This causes the setting of toggle TSE as shown in expression R4 above, and the phase 2 control logic is operated as before in section ARHO3(b) allowing the output of the store to be fed via the arithmetic processor to the highway and rewritten back into store.

ARHO3/1(biii) *RE code received from highway.*—When the calling computer message order specifies another equipment from which data is to be transferred, the highway control equipment extends the allocation number of the computer system as the RE code. The "0" state condition on the RE lead from the highway allows the setting of toggle TRE by closing gate GRE at the end of pulse T5.

$$THWA(a).\underline{GRE} - GREA - \underline{GSRE}.T5 - TRE \quad (R9)$$

The setting of toggle TRE causes the generation of signal FJ2, which after inversion (not shown) produces a "1" state signal on lead $AP1=1$ for use in a subsequent phase 3 operation. The reception of the RE code causes the reset of toggle TP2 to end phase 2 and the setting of toggle TP3 to start phase 3 by means of signal P3SH and the setting of the message start toggle TMS.

$$GREA - \underline{GR16}.T5.7/5.\underline{GR18} - GR17 - \underline{GR14}.TP2(a)$$
$$-GR15 - P3SH \quad (R10)$$

Gate GR18 is held closed as toggle TMS is reset at this time, and therefore, gate GR24 is open. Toggle TMS is set at the end of the T5 pulse.

$$GREA - \underline{GAL}.\underline{GR7}.T5 - TMS \quad (R11)$$

Gate GR7 is held closed by Toggle TAL which is set.

This ends the operation of phase 3 of the repeated micro-order 132 and it will be seen that exit from this phase may be either on a repeat micro-order operation (SE code received), or a step-on to next micro-order (RE code or no code received).

In the case of a repeat micro-order the next store location will be used either to receive data or transmit data as the data message transfer demands according to the RE or SE code extended by the highway control.

In the case of an extended RE code the next micro-order must handle the reception of the incoming data to the computer.

ARHO4 *Micro-order 133*

Micro-programme store output at address 133:

Phase 1 _____ 6716
Phase 2 _____ 82881
Phase 3 _____ 682

This micro-order is entered either (i) because an RE code is present and it was sensed in the previous micro-order or (ii) because no code was received within a 100 micro-second test period in the previous micro-order.

ARHO4(a) *Phase 1.*—The selected micro-instructions in this phase cause one to be subtracted from the M-address and the resultant (M-address $133-1$) to be placed in the micro-jump register.

ARHO4(b) *Phase 2.*—The object of the phase 2 operations is to allow the highway access to write into the store location which was addressed in phase 1 of the previous micro-order if the RE code is present.

The selection of micro-instruction 6/2 allows the conditioning of the output gates from highway 2 to take place as signal RH2 is present due to the set condition of toggle TH2 in the highway control logic FIG. 20. Toggles TAL, TRE, TMS and THWA will also be set in the highway control logic.

The selection of micro-instruction 6/2 also causes signal MHI to switch to the "1" state as gate GR19 (FIG. 22) is closed. This condition together with the set condition of toggle TRE allows the opening of gate G13 at the end of the pulse at time T17 to set the highway synchronisation toggle THC in the control unit (FIG. 13) to cause the generation of the add signal to the arithmetic processor. The "0" state signal HWI (gate GR12) will have inhibited the normal add signal generation process.

The generation of the add signal allows the information presented to the arithmetic processer, under the control of micro-instruction 6/2 and signal RH2, to be written into the selected store location (micro-instrution 9/1).

The above part of this section describes the reception of the RE code controlled data from the highway system. Consideration must now be given to the operation of this phase if no RE or SE codes were sensed in the 100 microsecond test period of previous micro-order. In this case the present phase 2 will be entered with toggles TAL, THWA and TH2 set together with toggle TRD. In this case signal P3SH in FIG. 22 is generated to cause the end of phase 2 and the start of phase 3 before the generation of the add signal.

$$6/2-\underline{GR12}.TRD(a)-GR13$$

$$6/2-\underline{GR20}.TAL(a).\overline{TRE}(b)-GR20-$$
$$\underline{GR14}.TP2(a)-GR15-P3SH \quad (R12)$$

Phase 2 is ended, therefore, with the operation of the arithmetic processer to feed the highway received data to the store (toggle TRE set) or before the arithmetic processer can be activated (toggle TRE reset).

ARHO4(c) *Phase 3.*—Micro-instruction 10/6 causes a jump to the micro-order stored in the micro-jump register if the jump test toggle TJ4 is set or a step on to next micro-order if this toggle is reset. Toggle TJ4 will be set in phase 2 of the current micro-order if toggle TRE is set as the set condition of this toggle generates signal FJ2 which causes a "1" state signal on lead $API=1$ in FIG. 16A. The phase 1 operation of the current micro-order, formed M-address 132 in the micro-jump register, thus if toggle TJ4 is set micro-order 132 (see sections RHO3) is performed at the end of this phase. This allows the transmission (micro-order 132) or the reception (micro-order 133) of the next and subsequent highway data transfers to take place. If reception is required the phase 2 of micro-order 132 is ended and phase 3 started by the generation of signal P3SH in FIG. 22 in the following manner as toggle TMS, the message start toggle, is set in FIG. 21.

$$7/5.\underline{GSEA}-GR21-\underline{GR22}.T5.TMS(a)-$$
$$\underline{GR23}-\underline{GR14}.TP2(a)-GR15-P3SH \quad (R13)$$

If the test jump toggle TJ4 in FIG. 16A is not set, a step on to the next micro-order is performed as no RE or SE code has been sensed in micro-order 132. This will either be due to (a) no code at all sent from the highway control because access to the other equipment, required for the highway transfer, cannot be established or (b) the data transfers in the highway message are completed.

ARHO5 *Micro-order 134*

Micro-programme store output at address 134:
Phase 1 _____ 7671
Phase 2 _____ 81881
Phase 3 _____ 868

ARHO5(a) *Phase 1.*—The selected micro-instructions in this phase cause one to be subtracted from the contents of index register 3. The significance of these operations will be understood in the section on phase 3 to follow.

ARHO5(b) *Phase 2.*—In this phase the selected micro-instructions simply control transfer of the output of the store to the arithmetic processer and write this data back into the store. This operation is performed so that the data read from store, if any, on the second entry into micro-order 132 is written back to store. This is required, as the phase 2 of this micro-order and micro-order 133 will be ended prematurely (signal P3SH) if no RE or SE code is received within 100 micro-seconds of the setting of toggle TAL, the highway allocated toggle, and, therefore, the store location addressed by a read only operation must be written back. This operation is performed by the normal store write operation (micro-instruction 9/1) using the arithmetic processer output. The operation of the arithmetic processer is the same as for a normal phase 2 operation as signal HWI in FIG. 14 on G11 is in the "1" state. This "1" state condition is due to the fact that gate GR12 in FIG. 22 of the highway control logic is opened as none of the micro-instructions 5/2, 6/2, 7/5 or 7/6 are selected.

ARHO5(c) *Phase 3.*—As mentioned previously the current micro-order is entered either because (i) the random data highway message is complete or (ii) because the other equipment required for the transfer is incompatible. This means that this phase will be commenced with toggles TAL, TMD, THWA, TMS and TH2 set for case (i) and with these toggles and toggle TRD set in case (ii). In both cases toggles TRE and TSE will be reset.

Toggle TRD when set, causes an "0" condition output to be produced on lead FJ which is used to set toggle TJ7 in FIG. 17 to allow micro-instruction 12/6 to control a "select next main order" operation if toggle TJ7 is set or a "step on" operation if toggle TJ7 is not set.

The select next main order operation simply starts the entire operation over again as the current main order number stored in the current programme order store PCR was reduced by one in phase 1 of micro-order 131 (see section RHO2(a)) thus the selection of the next main order in fact selects the current main order.

It should be noted that toggle TRD may also be set if a clock highway interrupt (signal CHI) is received after the start of the message demand and before highway allocation occurs.

$$TAL(b).CHI-GCI-\underline{GR11}-TRD \quad (R14)$$

The occurrence of the clock highway interrupt causes a jump back to start the current main order over again where the clock highway interrupt test is again made in micro-order 130 (see section ARHO1).

If toggle TRD is not set indicating that the highway operation is completed a step on to next micro-order operation is performed under the control of micro-instruction 11/6.

ARHO6 *Micro-order 135*

Micro-programme store output at address 135:
Phase 1 _____ 1728
Phase 2 _____ 88888
Phase 3 _____ 881

ARHO6(a) *Phase 1.*—The selected micro-instructions in this phase cause 1 to be added to the contents of current programme order store PCR to reform the current main order number.

ARHO6(b) *Phase 2.*—Idle.

ARHO6(c) *Phase 3.*—Select next main order. This causes the resetting of all the toggles in the highway control logic signal RHT and ends the routine for a computer—originated 36 bit highway message.

XXI. BRHO COMPUTER-ORIGINATED 24 BIT SECTION HIGHWAY TRANSFERS

Brief consideration will now be given to case (b) in section H above.

The facility for the reception of 24 bit sections of data over the random data highway is of particular use in filling the computer with programme.

The order causes 24 bit sections of data to be read into the computer and assembled into 48 bit sections and then stored sequentially. Sum check operations are performed on the incoming sections of data to check for transmission faults.

This main order must be preceded by an interrupt test main order to test for a clock highway interrupt.

The main order when read from the programme store is of the following form.

Order register bits 1–8—M-address.
Bits 9–12—Indexing and store selection bits.

Bits 13–24—Address of message order.
Bits 25–34—Iteration count of the number of 48 bit sections.
Bits 35 and 36—Both 1's.
Bits 37–48—Sub-section code 111111000000.

A typical routine of micro-orders, with their selected micro-instructions, is shown in the table below for the 24 bit main order routine.

| M-address | Micro-instruction | | |
|---|---|---|---|
| | Phase 1 | Phase 2 | Phase 3 |
| 143 | 1771 | 88815 | 882 |
| 144 | 7621 | 88888 | 882 |
| 145 | 2883 | 81588 | 868 |
| 146 | 6886 | 82466 | 868 |
| 147 | 8888 | 44817 | 882 |
| 148 | 8888 | 82466 | 882 |
| 149 | 2732 | 58881 | 882 |
| 150 | 3741 | 44818 | 352 |
| 151 | 7628 | 82468 | 881 |

If no clock highway interrupt is present during the previous order the computer starts this main order. It commences by sending the message demand signal until an allocation is obtained from the highway control equipment in the same manner as described above in detail for the 36 bit data sections in section ARHO. If an interrupt occurs up to the highway allocation stage, a jump back to the start of the previous main order is performed where the test is again made and a jump to the clock highway main order performed. The incompatibility test of 100 micro-secs. is again performed in this case and the order starts again if the RE code is not received within this time.

The main order controls the writing of the incoming data into a sequence of store locations following the message order. An addition is also performed of all the incoming 24 bit sections and the result, ignoring overflow is placed in accumulator 1. The process continues until the iteration count is zero when the next incoming section is transferred to accumulator 2. The final section is the sum check.

Thus, the computer steps on to the next main order leaving the data in a sequence of stores following the message order location, the sum check of the incoming section is in accumulator 1 and the transmitted sum check is in accumulator 2.

It is advantageous at this stage to show that the above routine may be used, prefixed by three special micro-orders shown below, as a computer start-up routine.

| Micro-orders | Phase 1 | Phase 2 | Phase 3 |
|---|---|---|---|
| 140 | 2882 | 78881 | 882 |
| 141 | 1882 | 68881 | 882 |
| 142 | 1712 | 88881 | 882 |

The operation of this routine is such that a wired-in message order gated through the index register and a wired-in order in the order register allows the programme to be transferred to the computer in 24 bit sections where it is assembled into 48 bit sections. On completion of the message the computer commences the first order of the newly read in programme.

XXII. RHI OTHER EQUIPMENT ORIGINATED RANDOM DATA HIGHWAY OPERATION

The main orders under this type of system are identical to those for the computer-originated operations above except that bit 35 of the order word will be 0.

Thus when the highway control logic in FIGS. 20–22 is taken into use toggle THWI is set (FIG. 20) at the end of timing pulse T20.

$$\overline{6/2.7/5} - GR1.OR36.\overline{OR35}.T20 - THWI \quad (R15)$$

The computer stands idle on either a 36 bit section or a 24 bit section order waiting for an SE or RE code. In this case the message demand is not required, thus the highway data is inserted or extracted from the address given in the order register and the subsequent addresses. The first RE or SE code sets toggle TAL (FIG. 21) and the operations are the same as detailed above for the computer-originated operations with slight adjustments for the setting of toggle THWI instead of THWA.

In the same manner as for the computer-originated operations the order will continue until the iteration count expires (24 bit section messages) or there is neither SE or RE codes present (36 bit section messages).

Clock highway interrupt arrangements are again provided. A normal programme will include at set intervals a highway order of this type to allow other equipment access to the computer when required.

XXIII. CH CLOCK HIGHWAY OPERATION

These are similar to the random highway operations except that the clock highway takes preference. The computer can either send data to or receive data from other equipment as directed by the clock highway control. Toggles TCH 1 and TCHS are used in FIG. 21 to define which of the two highways is to be employed and toggle TCH is set to control the operations.

XXIV. I INTERRUPTS

Interrupt facilities are provided in the computer system to allow, for example, input and output routines to be performed in association with local peripheral equipment, for example, tape readers and card punches. The interrupt main order is also used to test for clock highway interrupts and in this case a programme will contain such main orders at specified intervals.

Each peripheral equipment is allocated a twelve bit linear code (i.e., one "1" at a particular position) and it is arranged that this bit will be in the "1" state when the equipment is in the idle condition or requires access to the computer. In the three cases above the interrupt codes may be of the following form:

(i) Clock highway interrupt, 100000000000.
(ii) Tape reader, 010000000000.
(iii) Card punch, 001000000000.

Cases (i) and (ii) indicates that the clock highway and tape reader require access to the computer while case (iii) indicates that the card punch is ready to receive information from the computer.

The main order for an interrupt will be of the following form when read from the programme store.

Order register bits 1–8—M-address 152.
Bits 9–12—Index and store selection bits.
Bits 13–24—Main order address of routine to be followed if interrupt present.
Bits 25–36—All 0's.
Bits 37–48—Address of interrupt mask.

I1 *Micro-order 152*

Micro-programme store output at address 152:
  Phase 1 _____ 8888
  Phase 2 _____ 87886
  Phase 3 _____ 436

I1(a) *Phase 1*.—Idle.

I1(b) *Phase 2*.—Micro-instruction 6/7 causes the interrupt pattern of the associated peripheral equipment to be presented to the arithmetic processer. This pattern will consist of ones in the bits allocated to the peripheral equipment for all equipments which are free or require access to the computer. Micro-instruction 9/6 causes the output of the arithmetic processer, the interrupt pattern, to be transferred to accumulator 3.

I1(c) *Phase 3*.—The selected micro-instructions in this phase cause a test to be performed on the output of the arithmetic processer to define if it is equal to zero. If it is equal to zero this indicates that none of the peripheral equipments are free or require access to the computer.

63

A select next main order operation is performed if this is the case and the computer carries on with its programme.

If the output of the arithmetic processer is not equal to zero a step on to the next micro-order is performed.

I2 Micro-order 153

Micro-programme store output at address 153:
```
Phase 1 _____  4883
Phase 2 _____ 81886
Phase 3 _____   882
```

I2(a) *Phase 1.*—A store read/rewrite operation is performed at the store address defined by order register bits 37–48 for this phase. This operation causes the interrupt mask pattern relevant to the main order specified peripheral equipment to be read from store. For example, if it is required to print out information from the computer on to a card punch the interrupt mask will be of the form shown above in case (iii).

I2(b) *Phase 2.*—The selected micro-instructions in this phase together with micro-instructions 11/2 cause the interrupt mask to be merged with the interrupt pattern in accumulator 3. This operation is performed by a noughts merge, thus all ones in accumulator 3 will be changed to noughts except those which are fed by a one and a one exists in that particular bit of accumulator 3. Thus the interrupt mask will be fed into accumulator 3 assuming that accumulator 3 contains a "1" in the corresponding "1" bit of the mask. If this bit in accumulator 3 is a "0" this will not be changed by the merge operation and, therefore accumulator 3 will be zeroised.

I2(c) *Phase 3.*—Step on.

I3 Micro-order 154

Micro-programme store output at address 154:
```
Phase 1 _____  8888
Phase 2 _____ 58888
Phase 3 _____   436
```

I3(a) *Phase 1.*—Idle.

I3(b) *Phase 2.*—Micro-instruction 5/5 controls the presentation of the result of the previous interrupt mask and interrupt pattern merging to the arithmetic processer.

I3(c) *Phase 3.*—A test for the output of the arithmetic processer equal to zero is performed in this phase. If it is zero a select next main order operation is performed as this indicates the peripheral equipment is not "calling" or is busy, thus, the main programme is resumed.

If the output of the arithmetic processer is not equal to zero a step on next micro-order operation is performed.

I4 Micro-order 155

Micro-programme store output at address 155:
```
Phase 1 _____  8888
Phase 2 _____ 58888
Phase 3 _____   431
```

I4(a) *Phase 1.*—Idle.

I4(b) *Phase 2.*—The interrupt mask is presented to the arithmetic processer in this phase.

I4(c) *Phase 3.*—A main programme jump to the main order address stored in order register bits 13–24 is performed in this phase. This micro-order 155 is only entered when the interrupt test has been successful thus the object of this micro-order is to jump the main programme to the order which controls the use of the peripheral equipment.

XXV. PO. PERIPHERAL EQUIPMENT OPERATION

This may be divided into two sections (a) input to computer and (b) output from computer.

PO(a) *Input routine.*—The main order for the control of this operation follows the detection of a demand from an input device in the interrupt order routine. At the end of this routine a jump is made if the interrupt is successful (i.e., peripheral device demanding) to the address of the main order used to control that device. This main order will be the input main order.

The order word used for the programme store will be of the following form:

Order register bits 1–8—M-address 156.
Bits 9–12—Indexing and store selection bits.
Bits 13–24—First address in the store into which the input information is to be fed.
Bits 25–36—All 0's.
Bits 37–48—Sub-section code.

PO(a) Micro-order 156

Micro-programme store output at address 156:
```
Phase 1 _____  2882
Phase 2 _____ 83461
Phase 3 _____   881
```

PO(a)1(a) *Phase 1.*—Micro-instructions 1/2 and 4/2 cause the relevant store to be addressed at an address defined by order register bits 13–24 for a read only operation.

PO(a)1(b) *Phase 2.*—The selected micro-instructions in this phase allow the data at the buffer store associated with the inputting peripheral equipment to be gated on to a common 48 bit bus-bar which feeds the arithmetic processer. The required peripheral equipment is selected by the "1" in the interrupt mask in accumulator 3 under the control of micro-instruction 6/3. The buffer store may be arranged to store a number of characters read for example from a punched tape or it may be arranged to store only one character at a time (e.g., 8 bits). The sub-section code is used to control the transfer. The transfer of a fully forty-eight bit word for the peripheral equipment involve a number (e.g., six) main-orders transferring eight bits at a time. The sub-section code in each main order will control a more significant block of eight bits for each transfer. The data is written into store at the phase 1 addressed location and into accumulator 2.

PO(a)1(c) *Phase 3.*—Select next main order.

PO(b) *Output routine.*—This operation is very similar to that described above for input. In this case the output data is stored in accumulator 2 and the interrupt mask in accumulator 3 again selects the required peripheral device. The output data is transferred over the common bus-bar to the required peripheral device buffer store.

From the above peripheral operation it will be appreciated that the computer may act as a free standing device or as a part of random and clock data highway system.

XXVI. ADT AUTONOMOUS DATA TRANSFER OPERATION

The logic shown in FIG. 24, together with registers MR and SR shown in FIG. 1, is used to allow an external data interrupt from a particular peripheral device shown as OLPE in FIG. 1 to be accepted by the computer. The addition of this facility allows "real-time" and "on line" operation to be performed as far as the particular peripheral device OLPE is concerned.

The requirements for an "on-line" and "real time" computer system are that the current programme should be interrupted when the particular peripheral device OLPE requires access to the computer. The on line peripheral equipment OLPE will simply transmit data to or extract data from the computer's main store. The on line peripheral equipment OLPE, FIG. 1 will generate an external data interrupt signal D1, which is active in the autonomous data transfer control logic ADTL in the control unit CU, when that equipment requires to interrupt the current computer programme.

Basically the operation of the autonomous data transfer control logic causes the handling of the external data interrupt in the following manner. The interrupt is accepted at the point of selection of the next micro-order in the current micro-routine. The control logic ADTL controls the transfer of the M-address of the current micro-order into register MR. This is controlled by a signal MAM opening input gates associated with the eight bit toggle register MR which is located in the index unit IU shown in FIGS. 1 and 5. The control logic now causes the replacement of the current M-address in the order register OR with a wired-in M-address from address generator WMAB under the control of signal WMA. The wired-in M-address controls the transfer of the external data from the interrupting on line peripheral device OLPE to an address, in one of the stores ST1 or ST2, specified by information held in the special register SR. This information is passed over lead SR1 to the index processer IP and the output of the index processer IP is used to address one of the stores ST1 or ST2. The external data from the on line peripheral unit is now accepted via the arithmetic unit AU over the "any external input path" and is passed to the address store location. The control logic ADTL now generates signal MRIP which causes the contents of register MR to be transferred via the index processer to the M-address section of the order register thus returning the computer to the interrupted programme at the interrupted micro-order.

The operation of the external data interrupt system will be better understood from the following description of the operation of the autonomous data transfer control logic shown in FIG. 24.

It will be appreciated that an external data interrupt, indicated by the switching of lead DI to the "1" state, may be received at any time, however, this condition is ignored until signal RCS, the data processing device "micro-instruction controlled gate opening" signal (see expression 17 in section B(6) of the description on the control unit above) is produced. The "0" state going edge of this signal is used to close GX1 and this condition causes the setting of toggle TAD1 to indicate that an external (or real time) data interrupt has been experienced.

$$DI.\overline{RCS}-\underline{GX1}-GX2-TAD1 \quad (\text{x1})$$

The setting of toggle TAD1 causes a signal IMO to be generated, by opening gate GX3, which is used to inhibit the automatic start of phase 1 of the next micro-order in the current micro-routine. The completion of the phase 3 of the current micro-order would normally cause the next micro-order phase 1 to be started, however, the sensing of the external data interrupt is arranged to divert the current micro-routine into a micro-routine which will handle the reception and storage of the external data. Signal IMO is used to inhibit the production of signals P1S; OMSG and MS (see expression 45-48 in section C1(a) above) by holding gate G54 in FIG. 13 closed. The set condition of toggle TAD1 also produces signal IOP which inhibits the outputs of the operation code toggles in FIGS. 19A and 19B by opening gate GIOP which will close AND gates GM, GD, GSR, GSC, GSZ, GFL, GHL and GSA.

The real time data interrupt equipment row awaits until toggle TMOR (FIG. 13) in the phase 3 control logic for the data processing device is set (see expression 42 in section C1(a)). The pulse which sets this toggle TMOR also causes the reset of the phase 3 toggle TP3 and the micro-instruction toggles as shown in expression 43 and 44. Signal IMO is still present as gate GX3 in the drawing is still open thus, the effect of setting toggle TMOR is not felt by the phase 3 logic. The "1" state output from toggle TMOR is, in this case, used in the autonomous data transfer logic and is shown in the drawing as signal TMOR(a). The "1" state condition of this signal causes the production of signal WMA and, after a short delay, governed by delay line DX1, signals IPFA and MAM.

$$TMOR(a).TAD1(a).\overline{TAD3}(b)-GX4-WMA \quad (X2)$$

$$TMOR(a)-DX1.TAD1(a)-GX5-IPFA \quad (X3)$$

$$-GX6-\underline{GX7}-GX8-MAM \quad (X4)$$

Signal WMA causes a system wired-in M-address to be presented from address generator WMAB in FIGS. 1 and 5 to the operand input of the index processer. This wired in M-address defines an address in the micro-programme store which is allocated to the external data interrupt operation and may conveniently be given the decimal designation of 200.

The address generator WMAB may conveniently consist of sixteen AND gates having two inputs each. One of the inputs to each AND gate will be signal WMA while the other inputs will be permanent bias conditions such that, when signal WMA is generated, the conditions on the sixteen output leads two for each bit from the address generator WMAB will assume a condition equivalent to the decimal designation 200. Signal MAM causes the current micro-routine micro-order M-address to be transferred from the order register (bits 1-8) into an additional register, called the M register, which is eight bits long and is used only on external data interrupts. This signal will simply open the input gated to eight toggles forming the register allowing those toggles to assume the same conditons as those held by the M-address section of the order register for the current interrupted micro-order. The generation of signal IPFA causes the generation of an ADD signal for the index processer by activating lead AIP in FIG. 11A, thus causing zero to be added to the wired-in M-address 200.

The logic now waits for the addition process in the index processer, activated by signal IPFA, to be complete. The completion of this process is indicated by a "1" state signal on lead CCI and this causes the generation of signal F4/7 according to the following expression:

$$CCI.TAD(a)GX9-\underline{GX10}.\overline{TP3}(b)$$
$$.\overline{TP1}(b)\underline{GX11}-GX12-F4/7 \quad (X5)$$

Signal F4/7 causes a "forced" micro-instruction 4/7 to be generated (in FIG. 12A) causing the output of the index processer to be overwritten into the order register bits 1-8. Thus M-address 200, the address of the micro-programme store at which the external data interrupt micro-order is stored, is placed in the M-address section of the order register.

Signal F4/7 is generated for a duration defined by delay line DX2. The "1" state output from gate GX10 after the DX2 delay, is used to open gate GX11 and thus close gate GX12. The closure of gate GX12 causes the setting of toggles TAD2 and TAD3.

$$\underline{GX12}-GX13-\underline{GX14}-GX15-TAD2 \quad (X6)$$
$$-TAD3 \quad (X7)$$

The setting of toggle TAD2 causes the closure of gate GX3 and thus the end of signal IMO. The ending of signal IMO removes the inhibit from gate G54 (FIG. 13) allowing the generation of the normal end of phase 3, start of phase 1 signals (see expression 45-48 in section C1(a) above).

The control unit thus selects the next micro-order and this micro-order has been replaced by M-address 200 by the external data interrupt logic.

Micro-programme store output at address 200:
 Phase 1_____ 7182
 Phase 2_____ 28881
 Phase 3_____ 353

*Phase 1. Operation.*—Micro-instruction 1/7 together with micro-instruction 2/1 causes one to be added to the store address held in a special register SR which is provided solely to store the store address of the previous external data received. Micro-instruction 4/3 causes a store read operation to take place at the address specified by the output of the index processer. This will in fact be the store location into which the external data causing the interrupt is to be written.

The output of the index processer (register SR contents +1) is also overwritten back into register SR under the control of signal IPRI. This signal is of pulse form and is generated under the control of signal GOS and GCS the phase 1 gate opening and closing signals respectively (see sections A and A1 above). Signal GOS causes the start of signal IRRI and signal GCS ends this signal. Signal IPRI is in the one state for this duration thus the trailing or "0" state going edge is the "active" part.

$$TAX1-\overline{GX16} \tag{X8}$$

$$GOS-\overline{GX17}.\overline{GX16}.GCS-GX18-\overline{GX19}-IPRI \tag{X9}$$

Signal IPRI will be active on the index processer resultant switch IPRS in FIG. 5 causing the output of the index processer to be transferred not only into the required store over leads SAL but also into the special register SR over leads SRL. This operation ends the phase 1 function of the external data interrupt micro-order.

*Phase 2.*—The selected micro-instruction 5/2 and 9/1 in this phase cause the external data to be written into the store location addressed in phase 1. The data is in fact circulated through the arithmetic processer AU. At the start of this phase toggle TAD2 is reset causing the inhibit IMO to be reapplied.

*Phase 3.*—The selected micro-instruction 10/3, 11/5 and 12/3 in this phase are simply arranged to cause a repeat micro-order operation to be performed as the output of the index processer must obviously not be equal to zero. Thus toggles TJ1 and TJ6 in FIGS. 15A and 16A of the parent specification will be set causing signal $\overline{RM-0}$ from FIG. 14 to assume the "1" state causing a nought state pulse of duration defined by delay line DX4 to be generated on lead IG52.

$$\overline{RM-0}.TAD(a).\overline{GX20}-GX21-IG52 \tag{X10}$$

This signal causes the generation of signal RMIT and the reset of toggle TP3 by closing gate G52 (FIG. 13).

The trailing edge of this signal IG52 causes the setting of toggle TMOR, in the phase 3 logic, and, therefore, signal TMOR(a) in FIG. 24 is switched to the "1" state. This signal is used to control the transfer of the contents of the M-register to the index processer by the production of signal MRIP.

$$TMOR(a).TAD1(a).TAD(a)-GX22-MRIP \tag{X11}$$

It will be remembered that at the end of the phase 3 operation of the micro-order being performed when the external data interrupt was experienced, the M-address of the next micro-order in the micro-routine was transferred from the order register to the M register. Signal MRIP together with signal IPFA (see expression X3 above) causes the M-address to be circulated through the index processor. Signal F4/7 is again generated (see expression X5 above) to route the output of the index processer, when the carry complete signal CCI is generated, to order register bits 1–8. Signals WMA and MAM are not generated at this time as toggle TAD3 has been set.

The generation of signal F4/7 by the opening of gate GX12 causes the reset of the M-register under the control of signal RMR as follows:

$$GX12-GX23.TAD(a).TAD3(a)-GX24-RMR \tag{X12}$$

Signal F4/7 is generated under the control of delay line DX2, and at the trailing edge of this "0" state signal, toggles TAD3 and TAD1 are reset.

$$\overline{GX12}-GX23-\overline{GX24}-GX25-\overline{TAD3} \tag{X13}$$

$$-GX26-\overline{TAD1} \tag{X14}$$

The resetting of these toggles causes the release of the autonomous data transfer logic and the computer carries on with the next micro-order in the micro-routine interrupted by the external data demand.

To recapitulate, the operation of the external data interrupt equipment is to interrupt the current micro-order at the point of selection of the next micro-order in the current micro-routine; to transfer the M-address of this micro-order to a special register (the M-register) inhibiting the micro-programme store selection equipment; to transfer into the M-address section of the order register the M-address of the micro-order used to control the transfer of an external data to the store and to free the micro-programme store selection equipment to allow this interrupt micro-order to be selected to perform the addressing of the store with the address +1 stored in a special register (register SR) and to transfer the external data causing the interrupt to this store location and to replace the interrupt micro-order M-address with the M-address originally placed in the M-register. This latter operation allows the computer to continue with the original interrupted micro-routine.

From the above it will be seen that the external data interrupt routine is of one micro-order duration only and, therefore, causes a hesitation of one micro-order only in the current main programme without changing any of the working information in the order register or any of the registers in normal use in the computer.

The external data will consecutively fill a block of storage locations within the computer store ready for a subsequent computer programme. Obviously provision must be made for the programmer to have access to this information. Two main orders are required for this purpose one allowing the programmer access to register SR to write in the address of the first location of the block within the store to be filled and the other allowing access to register SR to read out the address of the last store location filled with received data.

*Main order for writing first store location into register SR.*—The forty-eight order word when read from the programme store will be of the following form.

Order register bits 1–8—M-address 201.
Bits 9–12—All 0's.
Bits 13–24—Address of first store location to be used to store external data.
Bits 25–30—All 0's.
Bits 31–33—External data interrupt code (111).
Bits 34–38—All 0's.

M-address 201 will cause the following micro-instruction forming the required micro-order to be read from the micro-programme store.

Phase 1 _____ 2718
Phase 2 _____ 88888
Phase 3 _____ 781

The actual significance of the active micro-instructions selected will be seen with reference to the micro-instruction lists set out previously.

*Phase 1.*—In this phase the contents of order register bits 13–24, minus one, will be transferred to register SR, via the index processer. The routing of the resultant output from the index processer is controlled by signal IPRI. The phase 3 micro-instruction 10/7 is used to open gate GX28 to cause the generation of this signal.

$$10/7.OR31.OR32.OR33-GX28-\overline{GX16} \tag{X15}$$

The "1" state output of gate GX16 allows expression X9 above to be followed.

The inclusion of order register bits OR31–33 in the "1" state, allows gate GX28 to be opened only when the external data interrupt code is present in bits 31–33 of the order word. The use of micro-instruction 10/7 ensures that address data in order register bits 25–36 on other main orders cannot mimic this code.

*Phase 2.*—Idle.

*Phase 3.*—The selected micro-instruction 12/1 causes a select next main order operation to be performed.

The effect of main order just described is to place the first store location address minus one in register SR. The minus one operation is required as an automatic "register SR contents plus one" operation is performed in phase 1 of the external data interrupt micro-order.

*Main order for gaining access to register SR.*—The order word read from the programme store will be of the following form:

Order register bits 1–8—M-address 202.
Bits 9–30—All 0's.
Bits 31–33—External data interrupt code (111).
Bits 34–48—All 0's.

M-address 202 will cause the following micro-order to be read from the micro-programme store.

Phase 1 _____ 8158
Phase 2 _____ 88888
Phase 3 _____ 781

The effects of these selected micro-instructions are to cause the address stored in register SR to be transferred to the index register IR1 in the index unit of the data processing device where the programmer has access to this address in the normal operation of the computer.

The above description is of one embodiment only and is intended to be in no way limiting to the invention. Alternative arrangements of micro-instructions will readily be appreciated by those skilled in the art and extra and alternative main order routines may easily be compiled.

We claim:

1. A stored programme data processing device comprising a main data processing store, a control unit, a first functional unit, a second functional unit for performing arithmetic operations, an order register, a preprogrammed micro-programme store, means in said first functional unit for addressing said main data processing store to transfer a main programme order word from said main data processing store to said order register, means responsive to the transfer of said main programme order word to said order register for addressing said micro-programme store with a code corresponding to the instruction in said main programme order word, a selection arrangement within said micro-programme store, a plurality of sets of micro-instruction leads, means responsive to the addressing of said selection arrangement by said instruction code for selecting one lead in each of said sets of micro-instruction leads to form a first micro-order of a series of micro-orders forming a micro-programme, means for terminating the operation of the data processing device if more than one and less than one lead is selected in each set of micro-instruction leads, means responsive to the generation of the micro-instruction on a first group of said sets of micro-instruction leads for controlling through said control unit said first functional unit to perform a single function in the execution of the micro-programme order, means responsive to the generation of the micro-instruction on a second group of said sets of micro-instruction leads for controlling through said control unit said second functional unit to perform a single function in the execution of the micro-programme order, means responsive to the generation of the micro-instruction on a third group of said sets of micro-instruction leads for changing through said control unit and said first functional unit the instruction code in said main programme order word stored in said order register to generate the micro-instructions relative to the next micro-order of the micro-programme, and means responsive to the generation of the micro-instruction on said third group of leads relative to the last micro-order of the micro-programme for controlling through said control unit and said first functional unit said first-mentioned means to address said main data processing store to transfer the next main programme order word from said main data processing store to said order register.

2. A stored programme data processing device as claimed in claim 1 and comprising a control unit, first means in said control unit for rendering said three groups of micro-instruction leads effective successively, second means in said control unit for rendering said first and said second group of micro-instruction leads effective simultaneously, third means in said control unit for rendering said second and third group of micro-instruction leads effective simultaneously and fourth means in said control unit for rendering the operation of said second and third means mutually exclusive.

3. A stored programme data processing device as claimed in claim 2 and comprising means in said control unit for determining whether the functional units involved in the operations specified by said first group of micro-instruction leads and by said second group of micro-instruction leads are different and if so said first mentioned means enables the micro-instruction leads of said first and second groups to be effective simultaneously.

4. A stored programme data processing device as claimed in claim 2 and comprising means in said control unit for determining whether the functional units involved in the operation specified by said second group of micro-instruction leads and by said third group of micro-instruction leads are different and if so said first mentioned means enables the micro-instruction leads of said second and third groups to be effective simultaneously.

5. A stored programme data processing device as claimed in claim 1, wherein each group of micro-instructions is divided into a number of subgroups, means being provided responsive to the application of signals to the micro-instruction leads of a sub group for controlling one step in the performance of the function defined by the group of micro-instructions and means are also provided responsive to the application of signals to two of the subgroups of micro-instruction leads in the third group for performing tests for conditional jump conditions, the routing of the micro-instruction leads of a subsequent subgroup of micro-instruction leads being modified as the result of said tests.

6. A stored programme data processing device as claimed in claim 5 and comprising a plurality of switching devices associated with the micro-instruction leads of said subsequent subgroup of micro-instruction leads, means for operating one switching device associated with at least one micro-instruction lead of said subsequent subgroup of micro-instruction leads as determined by the result of the tests for conditional jump conditions, the routing of a micro-instruction lead being different for the operation of different ones of the switching devices associated with the one micro-instruction lead.

7. A stored programme data processing device as claimed in claim 6 and comprising means for terminating the operation of the data processing device if a signal is applied by the micro-programme store to more than one and less than one micro-instruction lead in any subgroup.

8. A stored programme data processing device as claimed in claim 2 and comprising switching means in said control unit responsive to a signal on a particular micro-instruction lead, said switching means in operating applying a signal to at least one different micro-instruction lead.

9. A stored programme data processing device as claimed in claim 1 and including a plurality of leads to which a first number consisting of binary digits is applied, a first and a second gate circuit connected in parallel to each of said leads, a register, a plurality of toggle circuits in said register on which a second number consisting of binary digits is stored, said toggle circuits being equal in number to said leads and having set and reset leads to which a "1" state signal is applied for respectively setting and resetting said toggle circuits, means connecting the outputs of the first gate circuits individually to the set leads of said toggle circuits, means connecting the outputs of said second gate circuits to the reset leads of said toggle circuits, means for closing and opening the first gate circuits, means operative when said first gate circuits are closed for opening said second gate circuits and when said first gate circuits are opened for closing said second gate circuits whereby when said second gate circuits are closed if a toggle circuit is in the set state indicating a stored binary digit "1" it remains in the set state only if the corresponding binary digit applied to the appropriate one of said plurality of leads is also "1" whereas when said first gate circuits are closed and said second gate circuits are open if a toggle circuit is in the reset state indicating a stored binary digit "0" it remains in the reset state only if the corresponding binary digit applied to the appropriate one of said plurality of leads is also "0."

10. A stored programme data processing device as claimed in claim 1 comprising a control circuit for providing access from the computer to a plurality of synchronously-operating peripheral equipments and a timing circuit controlled by clock signals from any one of said peripheral equipments which enables the asynchronous processing device to operate in conjunction with the synchronous peripheral equipment.

11. A stored programme data processing device comprising a main data processing store, a control unit, a first functional unit for performing indexing operations, a second functional unit for performing arithmetic operations, an order register for storing a main programme order word, a preprogrammed micro-programme store for generating control signals for the instructions specified by a main programme order, three groups of micro-instruction leads extending from said micro-programme store to said control unit, means in said control unit responsive to control signals applied to said first group of micro-instruction leads for performing an indexing operation, means in said control unit responsive to control signals applied to said second group of micro-instruction leads and operative following said indexing operation for performing an arithmetic operation, means in said control unit responsive to control signals applied to said third group of micro-instructions and operative following said arithmetic operation for defining the next step in the current micro-programme and the exit from that micro-programme when completed into another micro-gramme, means in said control unit responsive if the control signals applied to said first and second groups of micro-instruction leads indicate that different equipment is involved in the indexing and arithmetic operations for allowing said indexing and arithmetic operations to be performed concurrently, means in said control unit responsive if the control signals applied to said second and third groups of micro-instruction leads indicate that different equipment is involved in the arithmetic and stepping operations for allowing said arithmetic and stepping operations to be performed concurrently and means in said control unit for rendering the operation of said last two mentioned means mutually exclusive.

12. A stored programme data processing device as claimed in claim 11 and comprising switching means in said control unit responsive to a control signal on a particular one of said micro-instruction leads and operative to apply a control signal to at least one different micro-instruction lead.

13. In a stored-programme data processing device, the provision of a first data processing store, an order register, a preprogrammed micro-programme store, means for transferring a main programme order word from said first data processing store to said order register, said order word including a portion which defines an address in said micro-programme store, means responsive to the transfer of a main programme order word from said first data processing store to said order register for extracting said address from said order register for addressing said micro-programme store to select the first micro-order of a micro-programme of micro-orders to be used for the control of said data processing device in the execution of the instruction specified by the main programme order word, means responsive to the completion of a micro-order for replacing said address in said portion of said order register to select the address of the next micro-order, equipment external to said data processing device, a holding register, means in said data processing device responsive to an interrupt signal received from said external equipment during the performance of any micro-order for:

(a) preventing the selection of the next micro-order,
(b) transferring the address of the next micro-order held in said order register to said holding register,
(c) inserting in the order register the address of a further micro-order, means responsive to the insertion of said further address in said portion of said order register for addressing said micro-programme store to select a micro-order which controls said data processing device to enable data to be transferred between said external equipment and said data processing device, means responsive to the completion of said last mentioned micro-order for transferring said address to said portion of said order register.

14. In a stored programme data processing device as claimed in claim 13, the provision of a plurality of groups of micro-instruction leads, means for rendering a last one of said groups of micro-instruction leads operative to define and select the next micro-order, means responsive to the reception of an interrupt signal for preventing said last group of instruction leads being effective in selecting said next micro-order until the address of said further micro-order has replaced the previously defined micro-order in said portion of said order register.

15. In a stored programme data processing device as claimed in claim 13, the provision of an address generator, a wire-in address of said further micro-order in said address generator and means responsive to the reception of an interrupt signal for transferring said wired-in address to said portion of said order register to replace the micro-order therein.

16. In a stored programme data processing device as claimed in claim 13, the provision of a further register, a second store, means controlled by the programme for transferring from said first data processing store to said order register an order word a section of which contains the address in said second store at which data received during a first interrupt is to be stored and means responsive to the performance of the micro-order defined by said order word for inserting said address in said further register.

17. In a stored programme data processing device as claimed in claim 16, the provision of means for adding one to the address contained in said further register following each interrupt.

References Cited

UNITED STATES PATENTS

| | | | |
|---|---|---|---|
| 2,651,458 | 9/1953 | Bennett et al. | 235—61 |
| 3,153,223 | 10/1964 | Ord | 340—172.5 |
| 3,215,987 | 11/1965 | Terzian | 340—172.5 |
| 3,325,788 | 6/1967 | Hackl | 340—172.5 |

PAUL J. HENON, *Primary Examiner.*

R. B. ZACHE, *Assistant Examiner.*